United States Patent
Park et al.

(10) Patent No.: US 10,868,704 B2
(45) Date of Patent: Dec. 15, 2020

(54) METHOD AND DEVICE FOR TRANSMITTING WAKEUP PACKET IN WIRELESS LAN SYSTEM

(71) Applicant: LG ELECTRONICS INC., Seoul (KR)

(72) Inventors: Eunsung Park, Seoul (KR); Dongguk Lim, Seoul (KR); Hangyu Cho, Seoul (KR); Jinsoo Choi, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 42 days.

(21) Appl. No.: 16/346,500

(22) PCT Filed: Sep. 29, 2017

(86) PCT No.: PCT/KR2017/010937
§ 371 (c)(1),
(2) Date: Apr. 30, 2019

(87) PCT Pub. No.: WO2018/080047
PCT Pub. Date: May 3, 2018

(65) Prior Publication Data
US 2019/0260624 A1  Aug. 22, 2019

Related U.S. Application Data

(60) Provisional application No. 62/415,481, filed on Oct. 31, 2016, provisional application No. 62/430,934, (Continued)

(51) Int. Cl.
*H04L 27/26* (2006.01)
*H04W 52/02* (2009.01)
(Continued)

(52) U.S. Cl.
CPC .......... *H04L 27/2634* (2013.01); *H04L 27/04* (2013.01); *H04L 27/26* (2013.01);
(Continued)

(58) Field of Classification Search
CPC ..... H04L 27/2634; H04L 27/04; H04L 27/26; H04W 52/02; H04W 52/0229; Y02D 70/14; Y02D 70/00; Y02D 70/10; Y04W 84/12
(Continued)

(56) References Cited

U.S. PATENT DOCUMENTS

2015/0087255 A1   3/2015  Wentzloff et al.

FOREIGN PATENT DOCUMENTS

KR    1020150113046    10/2015

OTHER PUBLICATIONS

PCT International Application No. PCT/KR2017/010937, International Search Report dated Jan. 3, 2018, 4 pages.
(Continued)

*Primary Examiner* — Yemane Mesfin
*Assistant Examiner* — Intekhaab A Siddiquee
(74) *Attorney, Agent, or Firm* — Lee, Hong, Degerman, Kang & Waimey

(57) ABSTRACT

Proposed are a method and a device for transmitting a wakeup packet in a wireless LAN system. Specifically, a transmission device configures a wakeup packet and transmits the wakeup packet to a reception device. The wakeup packet, to which an OOK scheme is applied, includes a sequence comprising first information and second information. The first information comprises an on-signal, and the second information comprises an off-signal. The on-signal is transferred through a first symbol generated by applying a first sequence to K continuous subcarriers in a 20 MHz band and performing 64-point IFFT thereon. In the K subcarriers
(Continued)

to which the first sequence is applied, coefficients of subcarriers are set to 1 or −1 by a unit of m subcarriers, and coefficients of the remaining subcarriers are set to 0.

12 Claims, 14 Drawing Sheets

Related U.S. Application Data filed on Dec. 7, 2016, provisional application No. 62/449,119, filed on Jan. 23, 2017.

(51) Int. Cl.
  *H04L 27/04* (2006.01)
  *H04W 84/12* (2009.01)
  *H04L 5/00* (2006.01)
  *H04L 27/02* (2006.01)

(52) U.S. Cl.
  CPC ....... *H04W 52/02* (2013.01); *H04W 52/0229* (2013.01); *H04W 84/12* (2013.01); *Y02D 30/70* (2020.08)

(58) Field of Classification Search
  USPC .......................................................... 370/311
  See application file for complete search history.

(56) References Cited

OTHER PUBLICATIONS

Park, M. et al., "LP-WUR (Low-Power Wake-Up Receiver) Follow-Up", doc.: IEEE 802.11-16/0341r0, Mar. 2016, 11 pages.
Seok, Y. et al., "Coexistence Mechanism for Wakeup Radio Signal", doc.: IEEE 802.11-16/1114r0, Aug. 2016, 13 pages.
Park, E. et al., "Performance Investigation on Wake-Up Receiver", doc.: IEEE 802.11-16/0865r0, Jul. 2016, 18 pages.

FIG. 1
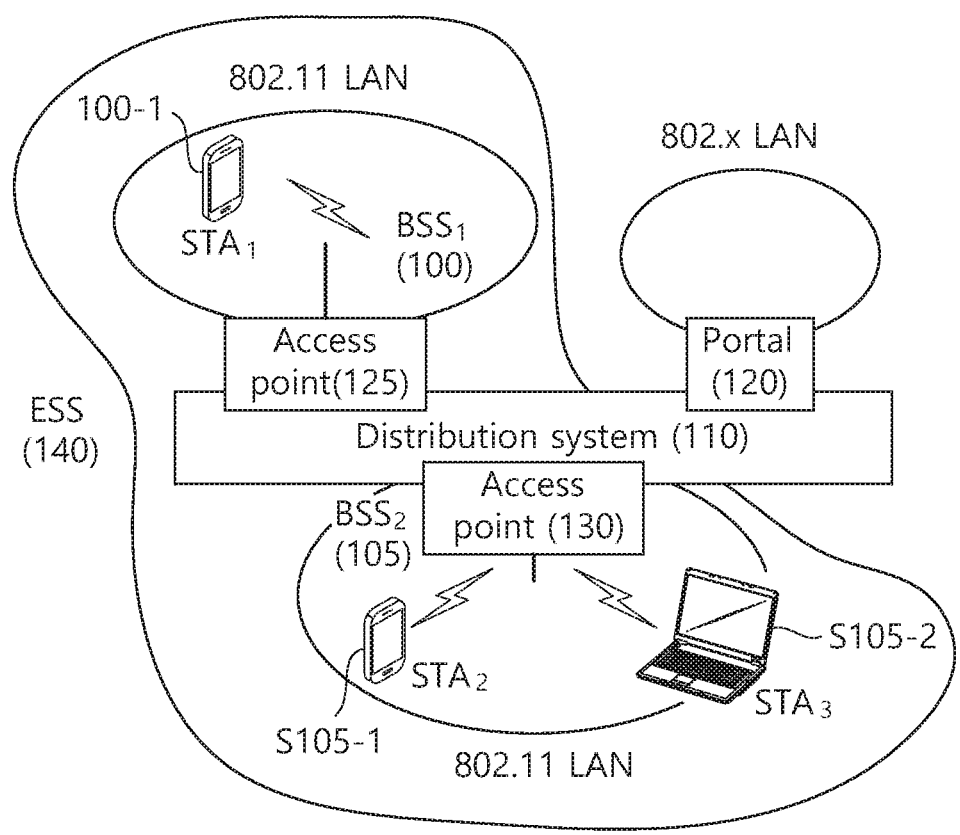
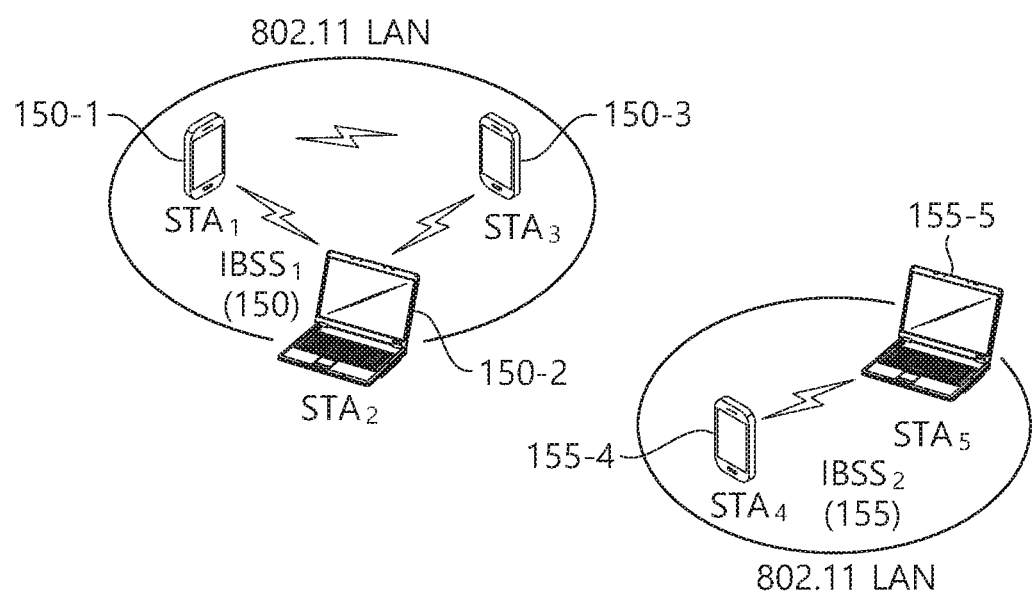

FIG. 11

☐ 4us (CP+3.2us) or 3.2us-length symbol

<Option 1>

| | n number | |
|---|---|---|
| Information 0 | 0 0 ... | 0 |
| Information 1 | 1 1 ... | 1 |

<Option 2>

| | n number | | |
|---|---|---|---|
| Information 0 | 0 1 ... | 1 | or |
| Information 1 | 1 0 ... | 0 | or |

1 0 ... 1 0
0 1 ... 0 1

<Option 3>

| | n number | | |
|---|---|---|---|
| Information 0 | 0 0 ... | 1 1 | or |
| Information 1 | 1 1 ... | 0 0 | or |

1 1 ... 0 0
0 0 ... 1 1

<Option 4>

| | n number | | |
|---|---|---|---|
| Information 0 | 1 1 0 ... | 0 1 | Case where number of Symbol 1 is odd number and number of Symbol 0 is even number (or vice versa) |
| Information 1 | 0 0 1 ... | 1 0 | Case where number of Symbol 0 is odd number and number of Symbol 1 is even number (or vice versa) |

METHOD AND DEVICE FOR TRANSMITTING WAKEUP PACKET IN WIRELESS LAN SYSTEM

CROSS-REFERENCE TO RELATED APPLICATIONS

This application is the National Stage filing under 35 U.S.C. 371 of International Application No. PCT/KR2017/010937, filed on Sep. 29, 2017, which claims the benefit of U.S. Provisional Application No. 62/415,481, filed on Oct. 31, 2016, 62/430,934, filed on Dec. 7, 2016, and 62/449,119, filed on Jan. 23, 2017, the contents of which are all hereby incorporated by reference herein in their entirety.

BACKGROUND OF THE INVENTION

Field of the Invention

The disclosure relates to a method for performing low-power communication in a wireless local area network (WLAN) system and, more particularly, to a method and a device for transmitting a wake-up packet by applying on-off keying (OOK) or a symbol reduction scheme in a WLAN system.

Related Art

Discussion for a next-generation wireless local area network (WLAN) is in progress. In the next-generation WLAN, an object is to 1) improve an institute of electronic and electronics engineers (IEEE) 802.11 physical (PHY) layer and a medium access control (MAC) layer in bands of 2.4 GHz and 5 GHz, 2) increase spectrum efficiency and area throughput, 3) improve performance in actual indoor and outdoor environments such as an environment in which an interference source exists, a dense heterogeneous network environment, and an environment in which a high user load exists, and the like.

An environment which is primarily considered in the next-generation WLAN is a dense environment in which access points (APs) and stations (STAs) are a lot and under the dense environment, improvement of the spectrum efficiency and the area throughput is discussed. Further, in the next-generation WLAN, in addition to the indoor environment, in the outdoor environment which is not considerably considered in the existing WLAN, substantial performance improvement is concerned.

In detail, scenarios such as wireless office, smart home, stadium, Hotspot, and building/apartment are largely concerned in the next-generation WLAN and discussion about improvement of system performance in a dense environment in which the APs and the STAs are a lot is performed based on the corresponding scenarios.

In the next-generation WLAN, improvement of system performance in an overlapping basic service set (OBSS) environment and improvement of outdoor environment performance, and cellular offloading are anticipated to be actively discussed rather than improvement of single link performance in one basic service set (BSS). Directionality of the next-generation means that the next-generation WLAN gradually has a technical scope similar to mobile communication. When a situation is considered, in which the mobile communication and the WLAN technology have been discussed in a small cell and a direct-to-direct (D2D) communication area in recent years, technical and business convergence of the next-generation WLAN and the mobile communication is predicted to be further active.

SUMMARY OF THE INVENTION

The disclosure proposes a method and a device for transmitting a wake-up packet by applying on-off keying (OOK) or a symbol reduction scheme in a wireless local area network (WLAN) system.

An example of this specification proposes a method and device for transmitting a wake-up packet in a wireless LAN system.

The exemplary embodiment of this specification may be performed by the transmitting device. And, a receiving device may correspond to a low-power wake-up receiver, and the transmitting device may correspond to an AP.

First, terms are defined. An on signal may correspond to a signal having an actual power value. An off signal may correspond to a signal having no actual power value. First information may correspond to information 1, and second information may correspond to information 0.

A transmission device configures/generates a wake-up packet.

The transmission device transmits the wake-up packet to a reception device.

The wake-up packet is configured/generated as follows.

The wake-up packet, to which on-off keying (OOK) is applied, includes a sequence including first information and second information.

The first information includes an on signal, and the second information includes an off signal.

The on signal is transferred through a first symbol generated by applying a first sequence to K consecutive subcarriers in a 20 MHz band and performing 64-point inverse fast Fourier transform (IFFT) thereon. That is, the on signal may be transmitted through one symbol generated by performing IFFT on one bit. Here, K is a natural number. The first symbol may correspond to an on symbol.

In the K subcarriers to which the first sequence is applied, coefficients of subcarriers are set to 1 or −1 by a unit of m subcarriers, and coefficients of the remaining subcarriers are set to 0. That is, when m=2, the first sequence may be applied to subcarriers of which a coefficient exists by a unit of two subcarriers. When m=4, the first sequence may be applied to subcarriers of which a coefficient exists by a unit of four subcarriers. When m=8, the first sequence may be applied to subcarriers of which a coefficient exists by a unit of eight subcarriers. m is a natural number and may be an even number for reducing a symbol.

This is to generate an information signal (or symbol) to which a symbol reduction scheme is applied. When the first sequence is applied to the K subcarriers of which a subcarrier coefficient exists by a unit of m subcarriers and IFFT is performed thereon, 3.2 us signals having a period of 3.2 us/m are generated, one of which may be used to configure/generate a 3.2 us/m on signal. The 3.2 us/m on signal may be transmitted through the first symbol. Therefore, the first symbol may have a length of 3.2 us/m excluding a CP. Accordingly, compared to the existing OOK scheme, a symbol length may be reduced and data rate may be increased.

In addition, when m=1, it may be considered that OOK is simply applied; when m=2, it may be considered that Manchester coding is applied. That is, the first information and the second information may be considered to have features of an information signal to which Manchester coding is applied and features of an information signal to which the symbol reduction scheme is applied.

Hereinafter, various examples of the first sequence applied to configure/generate the on signal (or on symbol) according to K and m are proposed. When coefficients of the first sequence inserted in the K subcarriers are all 1, a PAPR value is considerably high. Therefore, the first sequence is defined hereinafter to minimize PAPR according to K and m.

When K is 13 and m is 1, the first sequence may be ±{1,1,1,−1,−1,−1,1,1,−1,1,1,−1,1} or ±{1,−1,1,1,1,−1,1,1,−1,−1,−1,1,1,1,1}, in which OOK is merely applied to a wake-up packet.

When K is 13 and m is 2, the first sequence may be ±{0,1,0,1,0,−1,0,1,0,−1,0,−1,0}, ±{0,−1,0,−1,0,1,0,−1,0,1,0,1,0}, ±{1,0,1,0,1,0,−1,0,−1,0,1,0,−1}, or ±{−1,0,1,0,−1,0,−1,0,1,0,1,0,1}, in which Manchester coding or a symbol reduction scheme using a sequence in which a coefficient exists at intervals of two subcarriers is applied to a wake-up packet.

When K is 13 and m is 4, the first sequence may be ±{1,0,0,0,1,0,0,0,1,0,0,0,−1}, ±{−1,0,0,0,1,0,0,0,1,0,0,0,1}, ±{0,1,0,0,0,1,0,0,0,−1,0,0,0}, ±{0,0,1,0,0,0,1,0,0,0,−1,0,0}, ±{0,0,0,1,0,0,0,1,0,0,0,−1,0}, ±{0,−1,0,0,0,1,0,0,0,1,0,0,0}, ±{0,0,−1,0,0,0,1,0,0,0,1,0,0}, or ±{0,0,0,−1,0,0,0,1,0,0,0,1,0}, in which a symbol reduction scheme using a sequence in which a coefficient exists at intervals of four subcarriers is applied.

When K is 13 and m is 8, the first sequence may be ±{1,0,0,0,0,0,0,0,1,0,0,0,0}, ±{0,1,0,0,0,0,0,0,0,1,0,0,0}, ±{0,0,1,0,0,0,0,0,0,0,1,0,0}, ±{0,0,0,1,0,0,0,0,0,0,0,1,0}, ±{0,0,0,0,1,0,0,0,0,0,0,0,1}, ±{1,0,0,0,0,0,0,0,−1,0,0,0,0}, ±{0,1,0,0,0,0,0,0,0,−1,0,0,0}, ±{0,0,1,0,0,0,0,0,0,0,−1,0,0}, ±{0,0,0,1,0,0,0,0,0,0,0,−1,0}, or ±{0,0,0,0,1,0,0,0,0,0,0,0,−1}, in which a symbol reduction scheme using a sequence in which a coefficient exists at intervals of eight subcarriers is applied.

The on signal (or on symbol) may include K subcarriers located in a central band including a DC subcarrier.

Specifically, when the K subcarriers are allocated in the central band of the 20 MHz band, the DC subcarrier of the K subcarriers may be nullified. In addition, the subcarrier indexes of the K subcarriers may be arranged at one-subcarrier intervals from the lowest subcarrier having −6 to the highest subcarrier having +6.

For example, when K is 13 and m is 1, the first sequence may be ±{1,1,1,−1,−1,−1,0,−1,1,−1,−1,1,−1} or ±{1,−1,1,1,−1,1,0,1,1,1,−1,−1,−1}, in which OOK is merely applied to a wake-up packet and the DC subcarriers is nullified.

When K is 13 and m is 2, the first sequence may be ±{0,1,0,1,0,−1,0,1,0,−1,0,−1,0}, ±{0,−1,0,−1,0,1,0,−1,0,1,0,1,0}, ±{1,0,−1,0,1,0,0,0,−1,0,−1,0,−1}, or ±{1,0,1,0,1,0,0,0,−1,0,1,0,−1}, in which Manchester coding or a symbol reduction scheme using a sequence in which a coefficient exists at intervals of two subcarriers is applied to a wake-up packet and the DC subcarriers is nullified.

The off signal may be transferred through a second symbol generated by applying a second sequence to K consecutive subcarriers in the 20 MHz band and performing 64-point IFFT thereon. The first sequence and the second sequence may be different. In the K subcarriers to which the second sequence is applied, coefficients of all subcarriers may be set to 0.

Also, in the off signal, when the second sequence is applied to the K subcarriers all coefficients of which are set to 0 and IFFT is performed thereon, 3.2 us signals having a period of 3.2 us/m are generated, one of which may be used to configure/generate a 3.2 us/m off signal. The 3.2 us/m off signal may be transmitted through the second symbol. Therefore, the second symbol may have a length of 3.2 us/m excluding a CP.

According to this symbol reduction scheme, a wake-up packet (particularly, a wake-up payload) is configured/generated by reducing a symbol, thereby meeting a high data rate required for low-latency communication.

For example, when m is 4, the data rate of the wake-up payload may be 500 Kbps. When m is 8, the data rate of the wake-up payload may be 1 Mbps. When the symbol reduction scheme is applied, it is possible to more easily achieve a high data rate required for low-latency communication than applying only OOK.

Also, even though a symbol is divided m times, the first information and the second information each correspond to one-bit information.

The K subcarriers may correspond/relate to a subband of the 20 MHz band. For example, assuming that K=13 and 20 MHz is a reference band, even though 64 subcarriers (or bit sequences) can be used, only 13 subcarriers are sampled and are subjected/applied to IFFT, and the 13 subcarriers may correspond to a band of about 4.06 MHz. That is, a particular sequence (first sequence or second sequence) is set only for 13 subcarriers selected as samples, and the remaining subcarriers other than the 13 subcarriers are set to 0. That is, it may be considered that there is power only for 4.06 MHz in the 20 MHz band in a frequency domain.

The subcarrier spacing of each of the K subcarriers may be 312.5 KHz. When m is 4, the first symbol and the second symbol may have a length of 0.8 us. When m is 8, the first symbol and the second symbol may have a length of 0.4 us.

A cyclic prefix (CP) may be inserted at the front of each symbol to reduce or prevent the occurrence of inter-symbol interference (ISI).

For example, the first information and the second information may include a CP. The CP may be inserted at the front of each of the first symbol and the second symbol. When m is 4, the CP may have a length of 0.2 us. When m is 8, the CP may have a length of 0.1 us. This embodiment may be effective when the impact of ISI is exerted in the middle of a signal since the CP is inserted in the middle of the signal.

Further, the transmission device may propose a particular sequence having a particular coefficient to configure/generate an on signal (or on symbol), thereby minimizing PAPR in low-power wake-up communication.

BRIEF DESCRIPTION OF THE DRAWINGS

FIG. 1 is a conceptual view illustrating the structure of a wireless local area network (WLAN).

FIG. 11 illustrates various examples of a symbol repetition method repeating n number of symbols according to an exemplary embodiment of this specification.

DESCRIPTION OF EXEMPLARY EMBODIMENTS

Figure 2:
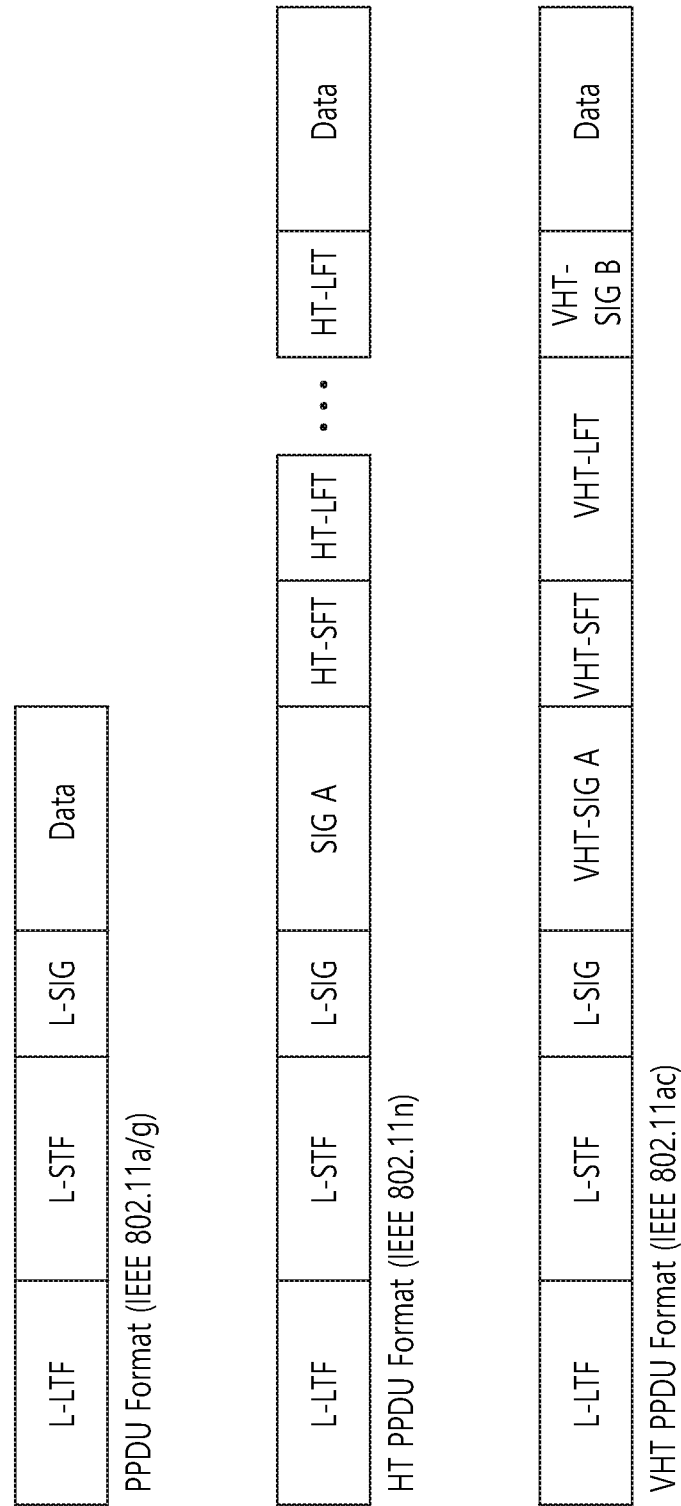
FIG. 2 is a diagram illustrating an example of a PPDU used in an IEEE standard.

FIG. 1 is a conceptual view illustrating the structure of a wireless local area network (WLAN).

An upper part of FIG. 1 illustrates the structure of an infrastructure basic service set (BSS) of institute of electrical and electronic engineers (IEEE) 802.11.

Referring the upper part of FIG. 1, the wireless LAN system may include one or more infrastructure BSSs 100 and 105 (hereinafter, referred to as BSS). The BSSs 100 and 105 as a set of an AP and an STA such as an access point (AP) 125 and a station (STA1) 100-1 which are successfully synchronized to communicate with each other are not concepts indicating a specific region. The BSS 105 may include one or more STAs 105-1 and 105-2 which may be joined to one AP 130.

The BSS may include at least one STA, APs providing a distribution service, and a distribution system (DS) 110 connecting multiple APs.

The distribution system 110 may implement an extended service set (ESS) 140 extended by connecting the multiple BSSs 100 and 105. The ESS 140 may be used as a term indicating one network configured by connecting one or more APs 125 or 230 through the distribution system 110. The AP included in one ESS 140 may have the same service set identification (SSID).

A portal 120 may serve as a bridge which connects the wireless LAN network (IEEE 802.11) and another network (e.g., 802.X).

In the BSS illustrated in the upper part of FIG. 1, a network between the APs 125 and 130 and a network between the APs 125 and 130 and the STAs 100-1, 105-1, and 105-2 may be implemented. However, the network is configured even between the STAs without the APs 125 and 130 to perform communication. A network in which the communication is performed by configuring the network even between the STAs without the APs 125 and 130 is defined as an Ad-Hoc network or an independent basic service set (IBSS).

A lower part of FIG. 1 illustrates a conceptual view illustrating the IBSS.

Referring to the lower part of FIG. 1, the IBSS is a BSS that operates in an Ad-Hoc mode. Since the IBSS does not include the access point (AP), a centralized management entity that performs a management function at the center does not exist. That is, in the IBSS, STAs 150-1, 150-2, 150-3, 155-4, and 155-5 are managed by a distributed manner. In the IBSS, all STAs 150-1, 150-2, 150-3, 155-4, and 155-5 may be constituted by movable STAs and are not permitted to access the DS to constitute a self-contained network.

The STA as a predetermined functional medium that includes a medium access control (MAC) that follows a regulation of an Institute of Electrical and Electronics Engineers (IEEE) 802.11 standard and a physical layer interface for a radio medium may be used as a meaning including all of the APs and the non-AP stations (STAs).

The STA may be called various a name such as a mobile terminal, a wireless device, a wireless transmit/receive unit (WTRU), user equipment (UE), a mobile station (MS), mobile subscriber unit, or just a user.

The term 'user' may be used in various meanings. For example, the term 'user' may be used to mean a STA participating in uplink MU MIMO and/or uplink OFDMA transmission in wireless LAN communication, But is not limited thereto.

FIG. 2 is a diagram illustrating an example of a PPDU used in an IEEE standard.

As illustrated in FIG. 2, various types of PHY protocol data units (PPDUs) may be used in a standard such as IEEE a/g/n/ac, etc. In detail, LTF and STF fields include a training signal, SIG-A and SIG-B include control information for a receiving station, and a data field includes user data corresponding to a PSDU.

In the embodiment, an improved technique is provided, which is associated with a signal (alternatively, a control information field) used for the data field of the PPDU. The signal provided in the embodiment may be applied onto high efficiency PPDU (HE PPDU) according to an IEEE 802.11ax standard. That is, the signal improved in the embodiment may be HE-SIG-A and/or HE-SIG-B included in the HE PPDU. The HE-SIG-A and the HE-SIG-B may be represented even as the SIG-A and SIG-B, respectively. However, the improved signal proposed in the embodiment is not particularly limited to an HE-SIG-A and/or HE-SIG-B standard and may be applied to control/data fields having various names, which include the control information in a wireless communication system transferring the user data.

Figure 3:
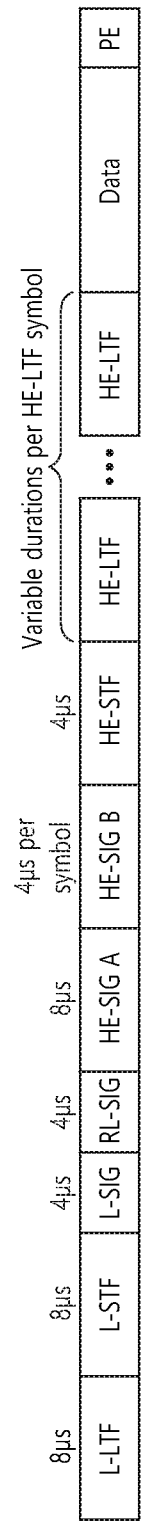
FIG. 3 is a diagram illustrating an example of an HE PDDU.

FIG. 3 is a diagram illustrating an example of an HE PDDU.

The control information field provided in the embodiment may be the HE-SIG-B included in the HE PPDU. The HE PPDU according to FIG. 3 is one example of the PPDU for multiple users and only the PPDU for the multiple users may include the HE-SIG-B and the corresponding HE SIG-B may be omitted in a PPDU for a single user.

As illustrated in FIG. 3, the HE-PPDU for multiple users (MUs) may include a legacy-short training field (L-STF), a legacy-long training field (L-LTF), a legacy-signal (L-SIG), a high efficiency-signal A (HE-SIG A), a high efficiency-signal-B (HE-SIG B), a high efficiency-short training field (HE-STF), a high efficiency-long training field (HE-LTF), a data field (alternatively, an MAC payload), and a packet extension (PE) field. The respective fields may be transmitted during an illustrated time period (that is, 4 or 8 μs).

A PPDU that is used in the IEEE standard is described as a PPDU structure being transmitting mainly within a channel bandwidth of 20 MHz. A PPDU structure that is transmitted within a bandwidth (e.g., 40 MHz, 80 MHz) that is wider than the channel bandwidth of 20 MHz may correspond to a structure applying linear scaling of the PPDU structure being used in the channel bandwidth of 20 MHz.

The PPDU that is used in the IEEE standard is generated based on a 64 Fast Fourier Transform (FFT), and a cyclic prefix (CP) portion may correspond to ¼. In this case, the length of a valid (or effective) symbol section (or FFT section) may be equal to 3.2 us, a CP length may be equal to 0.8 us, and a symbol duration may be equal to 4 us (=3.2 us+0.8 us), which corresponds to/is related with a sum of the length of the valid symbol section and the CP length.

A wireless network is ubiquitous, and the wireless network is generally installed indoors but is also often installed outdoors. The wireless network transmits and receives information by using diverse techniques. For example, although the wireless network will not be limited only to this, two of the most broadly supplied techniques that are used for communication correspond to an IEEE 802.11n standard and an IEEE 802.11ac standard, which follow the IEEE 802.11 standard.

The IEEE 802.11 standard designates a common Medium Access Control (MAC) layer, which provides diverse functions for operating the IEEE 802.11 based wireless LAN (WLAN). The MAC layer controls access of shared radio, and, by using a protocol that enhances communication through a radio medium, the MAC layer manages and maintains communication between IEEE 802.11 stations (e.g., a wireless network card (NIC) of a personal computer (PC), another wireless device or stations (STA), and an access point (AP)).

As the next new product of the 802.11ac, IEEE 802.11ax was proposed in order to enhance efficiency of a WLAN network, most particularly, in high-density regions, such as public hotspots and other high-traffic regions. Additionally, the IEEE 802.11 may also use orthogonal frequency division multiple access (OFDMA). A High Efficiency WLAN study group (HEW SG) within an IEEE 802.11 Work Group considers an enhancement in spectrum efficiency in order to enhance the system throughput/surface in a high-density scenario of an access point (AP) and/or station (STA).

Although small computing devices, such as wearable devices, sensors, mobile devices, and so on, are restricted due to their compact battery capacity, small computing devices support wireless communication techniques, such as Wi-Fi, Bluetooth®, Bluetooth® Low Energy (BLE), and so on, and, then, the small computing devices should exchange data by being connected to other computing devices, such as smart phones, tablets, personal computers, and so on. Since such communication consumes power, it is important to minimize power consumption of such communication. One of the most ideal strategies for minimizing power consumption is to maintain data transmission and reception without excessively increasing delay (or latency) and to turn off the power for communication blocks as frequently as possible. More specifically, a communication block is transmitted immediately before data reception, and the communication block is turned on only when data that needs to be woken up exists, and, during the rest of the time, the power of the communication block is turned off.

Hereinafter, a Low-Power Wake-Up Receiver (LP-WUR) will be described in detail.

The communication system (or communication sub-system) that is described in this specification includes a main radio (802.11) and a low-power wake-up receiver.

The main radio is used for the transmission and reception of user data. The main radio is turned off when there is no data or packet that is to be transmitted. The low-power wake-up receiver wakes up the main radio when there is a packet that is to be received. At this point, the user data is transmitted and received by the main radio.

The low-power wake-up receiver is not used (or provide) for the user data. The low-power wake-up receiver corresponds to/is related with a receiver for simply waking up the main radio. More specifically, the low-power wake-up receiver does not include a transmitter. The low-power wake-up receiver is activated while the main radio is turned off. During its activated state, the low-power wake-up receiver aims to achieve its target power consumption of less than 1 mW. Additionally, the low-power wake-up receiver uses a narrow band of less than 5 MHz. Furthermore, a target transmission range of the low-power wake-up receiver is the same as a target transmission range of the legacy 802.11.

Figure 4:
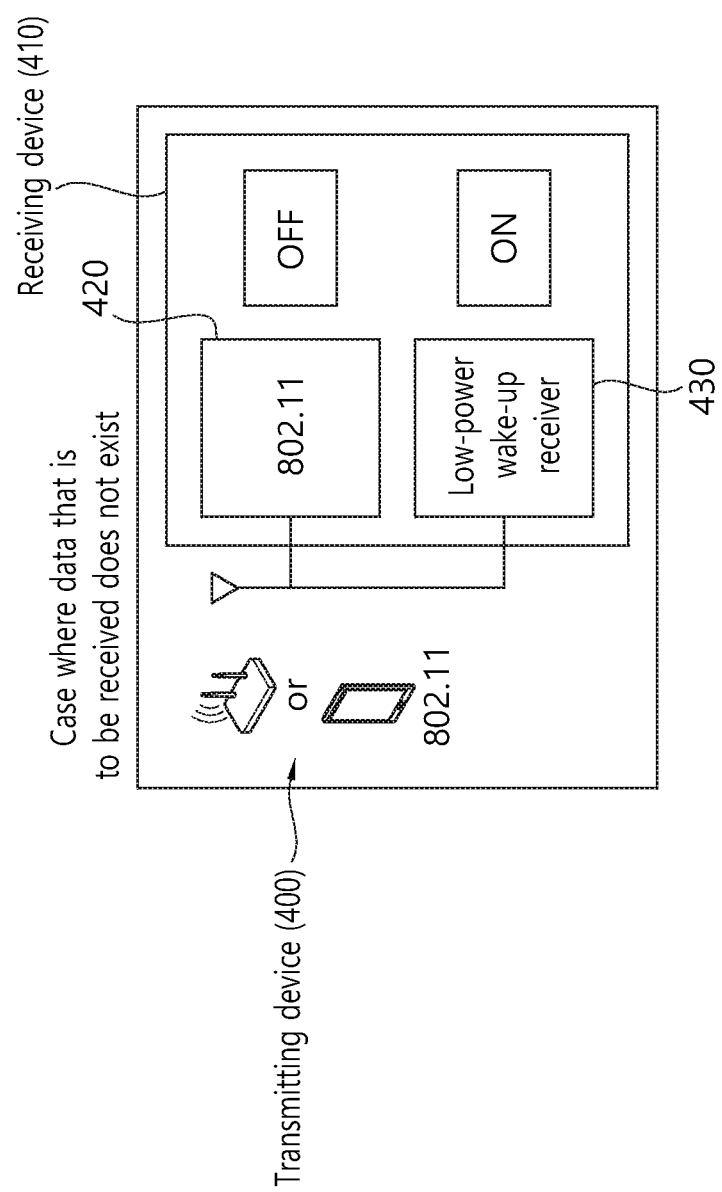
FIG. 4 is a diagram illustrating a low-power wake-up receiver in an environment where data is not received.
Figure 5:
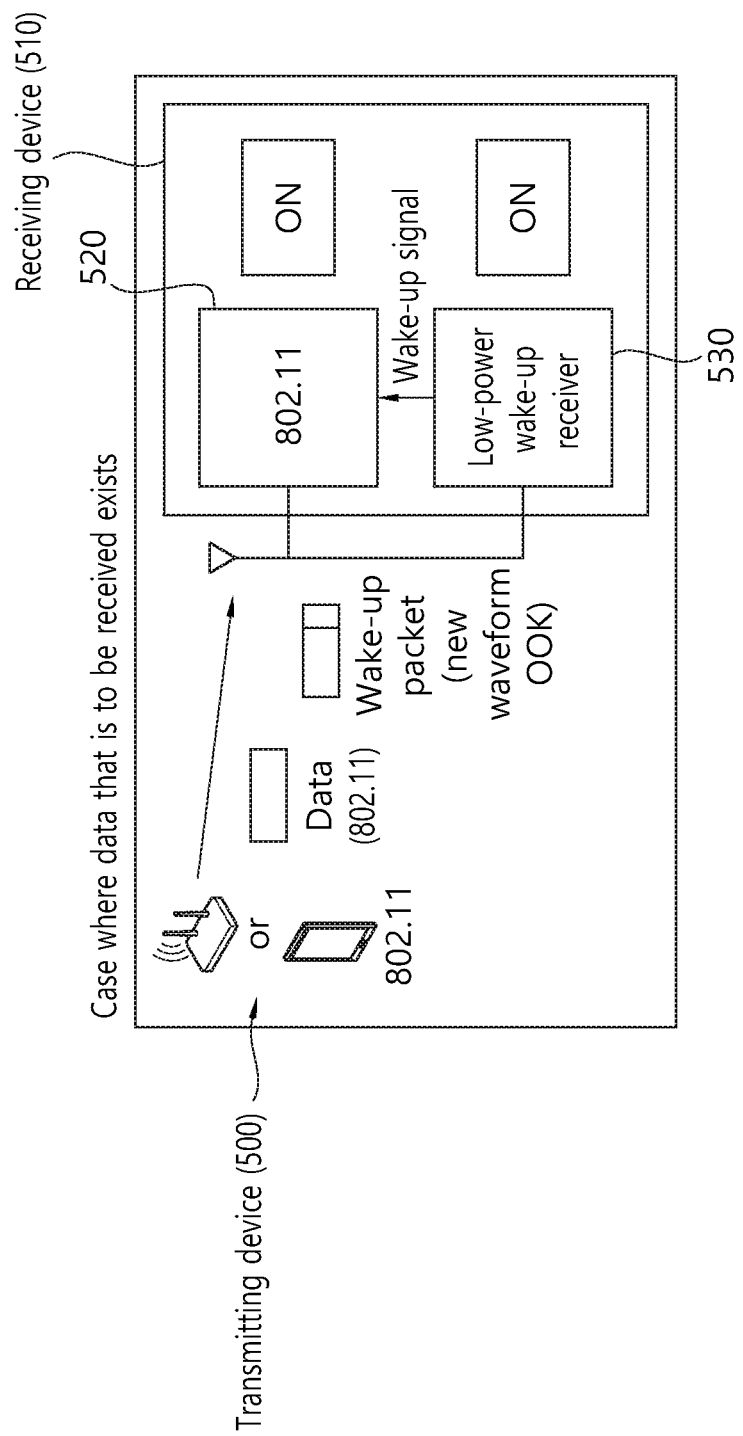
FIG. 5 is a diagram illustrating a low-power wake-up receiver in an environment where data is received.

FIG. 4 is a diagram illustrating a low-power wake-up receiver in an environment where data is not received. FIG. 5 is a diagram illustrating a low-power wake-up receiver in an environment where data is received.

As shown in FIG. 4 and FIG. 5, in case data that is to be transmitted and received exists, one of the methods for implementing the most ideal transmission and reception strategy is to add a low-power wake-up receiver (LP-WUR) that is capable of waking up a main radio, such as Wi-Fi, Bluetooth® radio, Bluetooth® Low Energy (BLE) radio, and so on.

Referring to FIG. 4, the Wi-Fi/BT/BLE radio (420) is turned off, and the low-power wake-up receiver (430) is turned on in a state where data is not received. According to part of the related studies, the power consumption of such low-power wake-up receiver (LP-WUR) may be less than 1 mW.

However, as shown in FIG. 5, if a wake-up packet is received, the low-power wake-up receiver (530) wakes up the entire (or whole) Wi-Fi/BT/BLE radio (520) so that a data packet following the wake-up packet can be accurately received. However, in some cases, actual data or an IEEE 802.11 MAC frame may be included in the wake-up packet. In this case, although the entire Wi-Fi/BT/BLE radio (520) cannot be woken up, the necessary process should be carried out by waking up only part of the Wi-Fi/BT/BLE radio (520). This may result in a considerable amount of power saving.

An exemplary technique that is described in this specification defines a method of a segmented wake-up mode for a Wi-Fi/BT/BLE radio using a low-power wake-up receiver. For example, actual data being included in a wake-up packet may be directly delivered to a memory block without waking up the Wi-Fi/BT/BLE radio.

As another example, in case an IEEE 802.11 MAC frame is included in the wake-up packet, only a MAC processor of the Wi-Fi/BT/BLE wireless device (or radio) needs to be woken up in order to process the IEEE 802.11 MAC frame, which is included in the wake-up packet. More specifically, the power of a PHY module of the Wi-Fi/BT/BLE radio may be turned off or maintained in a low-power mode.

Since a plurality of segmented wake-up modes for a Wi-Fi/BT/BLE radio using a low-power wake-up receiver are defined, when a wake-up packet is received, the power of the Wi-Fi/BT/BLE radio must be turned on. However, according to the exemplary embodiment of this specification, only a necessary (or required) part (or configuration element) of the Wi-Fi/BT/BLE radio may be selectively woken up, thereby saving a larger amount of energy and reducing stand-by (or waiting) time. A large number of solutions using the pow-power wake-up receiver wakes up the entire Wi-Fi/BT/BLE radio when receiving a wake-up packet. According to an exemplary aspect that is discussed in this specification, since only a part (or element) of the Wi-Fi/BT/BLE radio that is required for processing the receiving data is woken up, a considerable amount of energy is saved, and unnecessary stand-by (or waiting) time that is needed for waking up the main radio may be reduced.

Additionally, according to this exemplary embodiment, the low-power wake-up receiver (530) may wake up the main radio (520) based on the wake-up packet that is transmitted from a transmitting device (500).

Furthermore, the transmitting device (500) may be configured to transmit the wake-up packet to a receiving device (510). For example, the transmitting device (500) may instruct the low-power wake-up receiver (530) to wake up the main radio (520).

Figure 6:
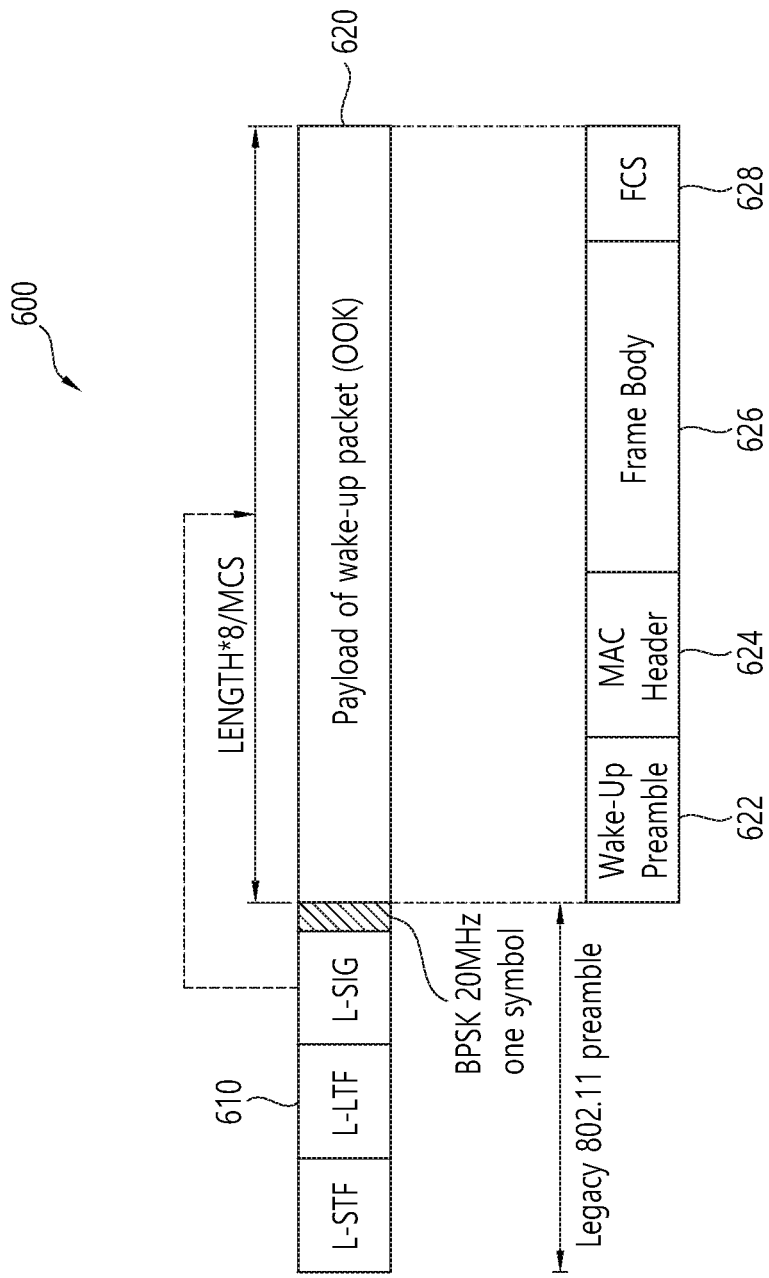
FIG. 6 illustrates an example of a wake-up packet structure according to an exemplary embodiment of this specification.

FIG. 6 illustrates an example of a wake-up packet structure according to an exemplary embodiment of this specification.

A wake-up packet may include one or more legacy preambles. One or more legacy devices may decode or process the legacy preamble(s).

Additionally, the wake-up packet may include a payload after a legacy preamble. The payload may be modulated by using a simple modulation scheme, e.g., an On-Off Keying (OOK) scheme.

Referring to FIG. 6, the transmitting device may be configured to generate and/or transmit a wake-up packet (600). And, the receiving device may be configured to process the received wake-up packet (600).

Additionally, the wake-up packet (600) may include a legacy preamble, which is defined by the IEEE 802.11 specification, or another random preamble (610). And, the wake-up packet (600) may also include a payload (620).

A legacy preamble provides a coexistence with a legacy STA. The legacy preamble (610) for the coexistence uses an L-SIG field for protecting the packet. Through the L-SIG field within the legacy preamble (610), an 802.11 STA may detect a beginning (or a start point) of the legacy preamble (610). And, through the L-SIG field within the legacy preamble (610), the 802.11 STA may know (or acknowledge) an end (or last part) of the packet. Additionally, by adding a symbol that is modulated by using BPSK after the L-SIG, a false alarm of an 802.11n terminal (or device) may be reduced. A symbol (4 us) that is modulated by using BPSK also has a 20 MHz bandwidth, just as the legacy part. The legacy preamble (610) corresponds to/is related with a field for a third party legacy STA (an STA not including an LP-WUR). The legacy preamble (610) is not decoded by the LP-WUR.

The payload (620) may include a wake-up preamble (622). The wake-up preamble (622) may include a sequence of bits that are configured to identify the wake-up packet (600). The wake-up preamble (622) may, for example, include a PN sequence.

Additionally, the payload (620) may include a MAC header (624) including address information of a receiving device, which receives the wake-up packet (600), or an identifier of the receiving device.

Additionally, the payload (620) may include a frame body (626), which may include other information of the wake-up packet. For example, length or size information of the payload may be included in the frame body (626).

Furthermore, the payload (620) may include a frame check sequence (FCS) field (628) including a cyclic redundancy check (CRC) value. For example, the FCS field (628) may include a CRC-8 value or a CRC-16 value of the MAC header (624) and the frame body (626).

Figure 7:
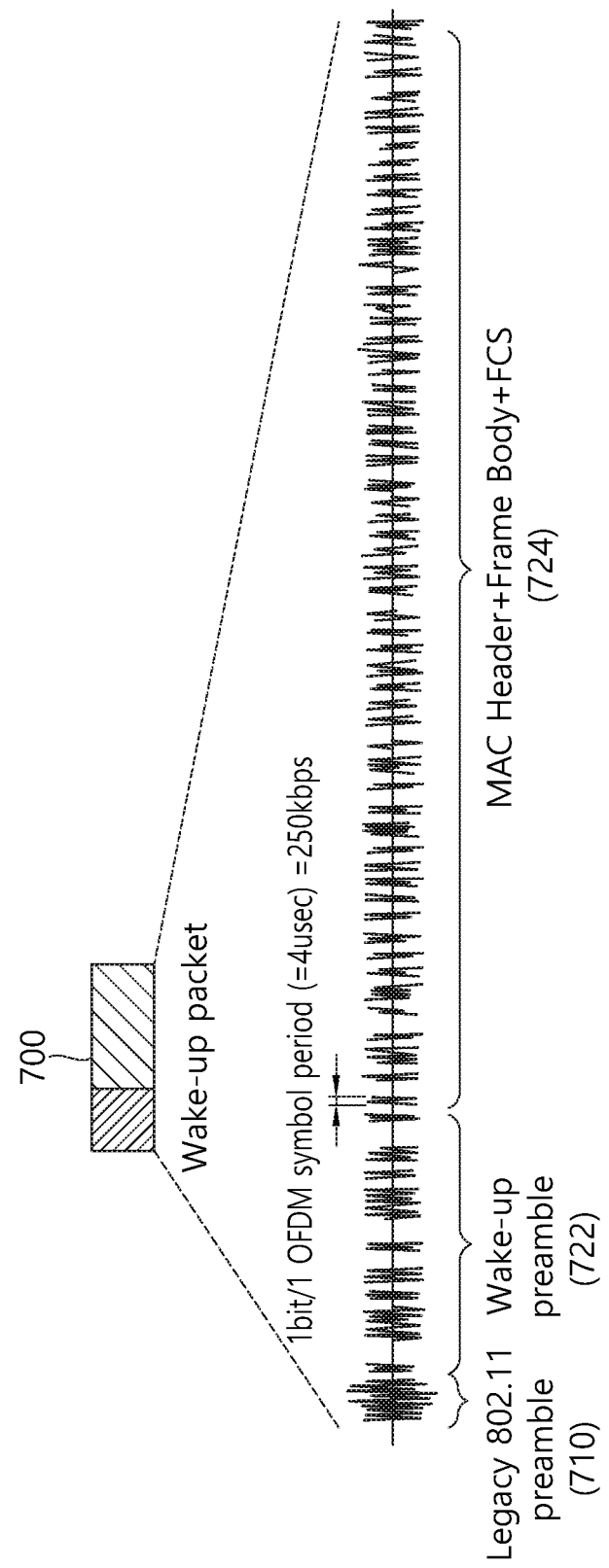
FIG. 7 illustrates a signal waveform of a wake-up packet according to an exemplary embodiment of this specification.

FIG. 7 illustrates a signal waveform of a wake-up packet according to an exemplary embodiment of this specification.

Referring to FIG. 7, a wake-up packet (700) includes a legacy preamble (802.11 preamble (710) and a payload being modulated by OOK. In other words, the wake-up packet (700) is configured of a format in which a legacy preamble and a new LP-WUR signal waveform coexist.

Additionally, the legacy preamble (710) may be modulated in accordance with an OFDM modulation scheme. More specifically, the OOK scheme is not applied to the legacy preamble (710). Conversely, the payload may be modulated in accordance with the OOK scheme. However, a wake-up preamble (722) within the payload may be modulated in accordance with a different modulation scheme.

If the legacy preamble (710) is transmitted within a channel bandwidth of 20 MHz in which 64 FFT is applied, the payload may be transmitted within a channel bandwidth of approximately 4.06 MHz. This will be described in more detail in the following description of an OOK pulse designing method.

Firstly, a modulation method using the OOK scheme and a Manchester coding method will be described in detail.

Figure 8:
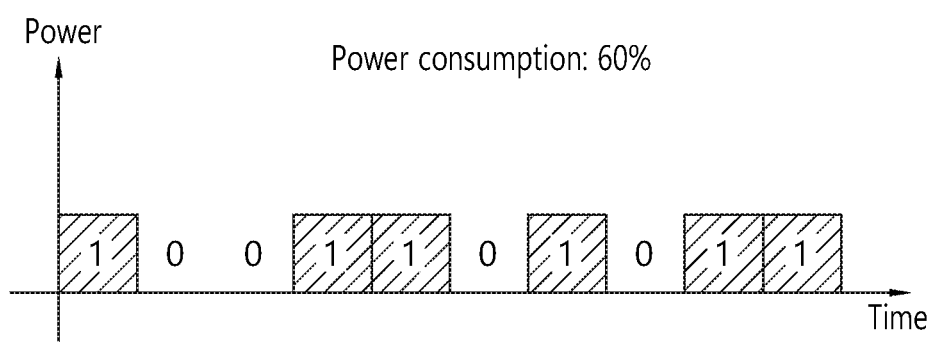
FIG. 8 illustrates a diagram for describing a principle for determining consumed power in accordance with a ratio between bit value 1 and 0 that configure information of a binary sequence format by using the OOK scheme.

FIG. 8 illustrates a diagram for describing a principle for determining consumed power in accordance with a ratio between bit value 1 and 0 that configure information of a binary sequence format by using the OOK scheme.

Referring to FIG. 8, information of a binary sequence format having 1 or 0 as the bit values is expressed in the drawing. By using such bit values of 1 or 0 of the binary sequence format information, an OOK modulation scheme communication may be carried out. More specifically, by considering the bit values of the binary sequence format information, the OOK modulation scheme communication may be carried out. For example, in case of using a light-emitting diode in visible light communication, in case the bit value configuring the binary sequence format information is equal to 1, the light-emitting diode is turned on, and, in case the bit value is equal to 0, the light-emitting diode is turned off. Thus, the light-emitting diode may be turned on and off (i.e., flicker). As the receiving device receives and recovers the data being transmitted in the form of visible light in accordance with the above-described on and off state (or flickering) of the light-emitting diode, the communication using visible light may be carried out. However, since the flickering of the light-emitting diode cannot be recognized by the human eye, people think and feel that the lighting is continuously maintained in the on state.

For simplicity in the description, as shown in FIG. 8, information of a binary sequence format having 10 bit values is used in this specification. Referring to FIG. 8, information of a binary sequence format having a value of '1001101011'. As described above, in case the bit value is equal to 1, the transmitting device is turned on, and, in case the bit value is equal to 0, the transmitting device is turned off. Accordingly, among the 10 bit values, the symbols are turned on in 6 bit values. In this case, given that 100% of the consumed power is used when all of the symbols are turned on in all of the 10 bit values, and, in case a duty cycle shown in FIG. 8 is followed, the consumed power is 60%.

More specifically, it may be said that the consumed power of the transmitter is determined in accordance with a ratio between 1s and 0s configuring the binary sequence format information. In other words, in case there is a constraint condition specifying that the consumed power of the transmitter should be maintained at a specific value, the ratio between the 1s and 0s configuring the binary sequence format information should also be maintained. For example, in case of a lighting device, since the lighting should be maintained at a specific luminance value that is wanted by the users, the ratio between the 1s and 0s configuring the binary sequence format information should also be maintained accordingly.

However, for the wake-up receiver (WUR), since the receiving device is the subject, the transmission power is not significantly important. One of the main reasons for using the OOK is because the amount of consumed power during the decoding of a received signal is considerably small. Before performing the decoding, the difference between the amount of consumed power in the main radio and in the WUR is small. However, as the decoding process is carried out, the difference in the amount of consumed power becomes apparent. The approximate amount of consumed power is as shown below.

The current Wi-Fi power consumption is approximately 100 mW. More specifically, power may be consumed as follows: Resonator+Oscillator+PLL (1500 uW)→LPF (300 uW)→ADC (63 uW)→decoding processing (OFDM receiver) (100 mW).

However, the WUR power consumption is approximately 1 mW. More specifically, power may be consumed as follows: Resonator+Oscillator (600 uW)→LPF (300 uW)→ADC (20 uW)→decoding processing (Envelope detector) (1 uW).

Figure 9:
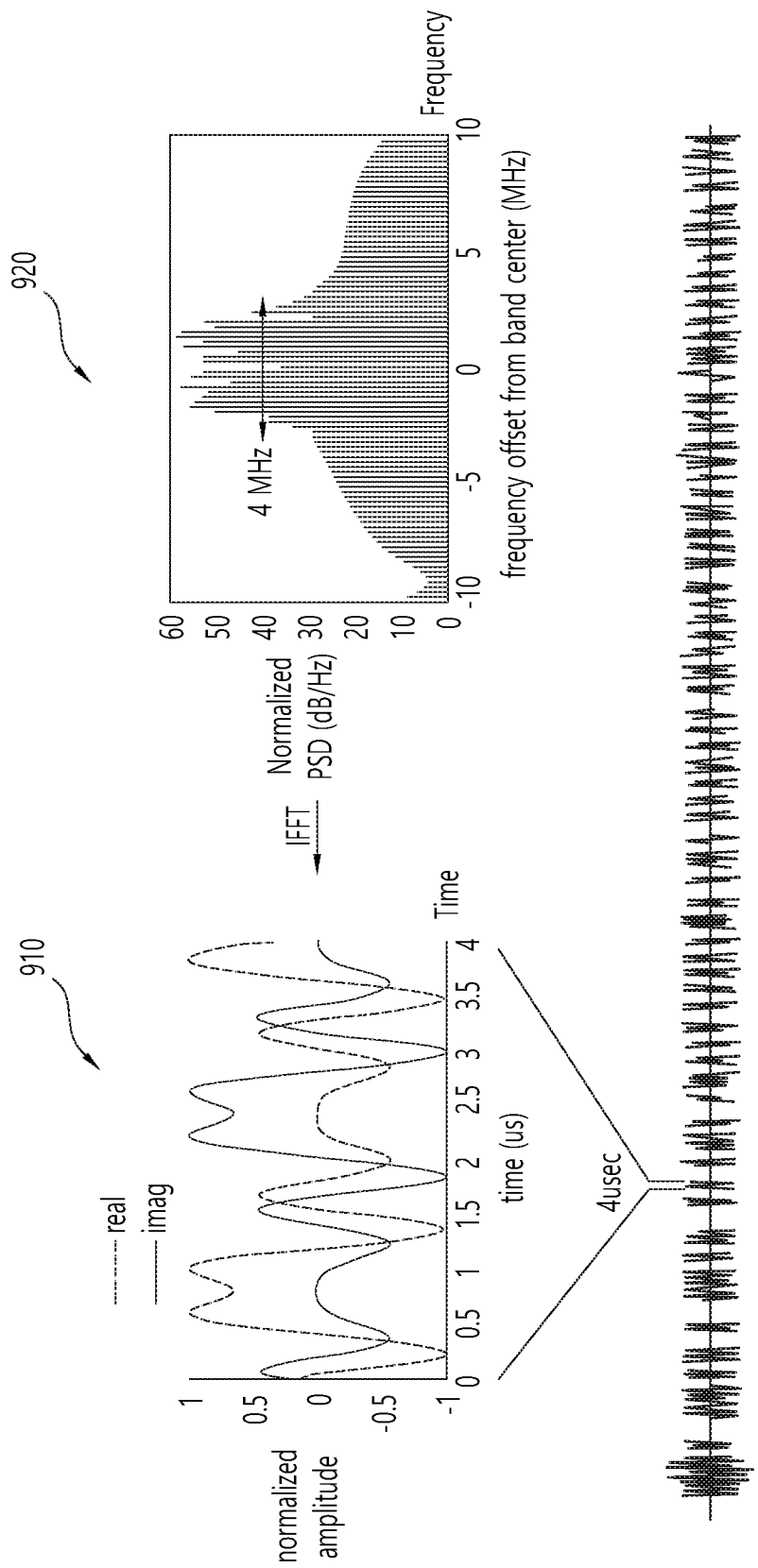
FIG. 9 illustrates a method for designing an OOK pulse according to an exemplary embodiment of this specification.

FIG. 9 illustrates a method for designing an OOK pulse according to an exemplary embodiment of this specification.

In order to generate an OOK pulse, an OFDM transmitting device of 802.11 may be re-used. The transmitting device may generate a sequence having 64 bits by applying 64-point FFT, just as in the legacy 802.11.

The transmitting device should generate the payload of a wake-up packet by performing modulation using the OOK scheme. However, since the wake-up packet is used for low-power communication, the OOK scheme is applied to the ON-signal. Herein, the ON-signal corresponds to/is related with a signal having the actual power value, and an OFF-signal corresponds to/is related with a signal that does not have an actual power value. Although the OOK scheme is also applied to the OFF-signal, since the OFF-signal is not a signal that is generated by using the transmitting device, and, accordingly, since the signal is not actually transmitted, the OFF-signal is not considered when generating the wake-up packet.

In the OOK scheme, Information (bit) 1 may correspond to the ON-signal, and Information (bit) 0 may correspond to the OFF-signal. On the other hand, if the Manchester coding method is applied, it may be indicated that Information 1 is shifted from the OFF-signal to the ON-signal, and that Information 0 is shifted from the ON-signal to the OFF-signal. Conversely, it may also be indicated that Information 1 is shifted from the ON-signal to the OFF-signal, and that Information 0 is shifted from the OFF-signal to the ON-signal. The Manchester coding method will be described later on in detail.

Referring to FIG. 9, as shown in the right side frequency domain graph (920), the transmitting device selects 13 consecutive subcarriers of the reference band, 20 MHz band, as a sample and applies a sequence. In FIG. 9, among the subcarriers of the 20 MHz band, the 13 subcarriers that are located in the middle are selected as the sample. More specifically, among the 64 subcarriers, the transmitting device selects subcarriers having subcarrier indexes ranging from −6 to +6. At this point, since subcarrier index 0 is a DC subcarrier, this subcarrier may be nulled as 0. A specific sequence is configured only in the sample of the selected 13 subcarriers, and all of the remaining subcarriers excluding the 13 selected subcarriers (subcarrier indexes ranging from −32 to −7 and subcarrier indexes ranging from +7 to +31) are set to 0.

Additionally, since subcarrier spacing corresponds to/is related with 312.5 KHz, the 13 subcarriers have a channel bandwidth of approximately 4.06 MHz. More specifically, it may be understood that, in the 20 MHz band of the frequency domain, power exists only in 4.06 MHz. Thus, as described above, by focusing the power to the center, it will be advantageous in that a Signal to Noise Ratio (SNR) may be increased, and that power consumption in an AC/DC converter of the receiving device may be reduced. Additionally, since the sampling frequency band is reduced to 4.06 MHz, the amount of the consumed power may be reduced accordingly.

Additionally, as shown in the left side time domain graph (910), the transmitting device performs 64-point IFFT on the 13 subcarriers, so as to generate one ON-signal in the time domain. One ON-signal has the size of 1 bit. More specifically, a sequence being configured of 13 subcarriers may correspond to 1 bit. Conversely, the transmitting device may bot transmit the OFF-signal at all. By performing IFFT, a symbol of 3.2 us may be generated, and, if a cyclic prefix (CP) (0.8 us) is included, one symbol having the length of 4 us may be generated. More specifically, 1 bit indicating one ON-signal may be loaded in one symbol.

The reason for configuring and transmitting a bit, as described in the above-described exemplary embodiment, is to reduce power consumption in the receiving device by using an envelope detector. Thus, the receiving device may decode a packet with a minimum amount of power.

However, a basic data rate for one information may correspond to 125 Kbps (8 us) or 62.5 Kbps (16 us).

By generalizing the description presented above, a signal being transmitted from the frequency domain is as described below. More specifically, each signal having a length of K within the 20 MHz band may be transmitted by being loaded in K number of consecutive subcarriers, among the total of 64 subcarriers. More specifically, as a number of subcarriers being used for transmitting a signal, the value K may correspond to the bandwidth of an OOK pulse. Coefficients of subcarriers other than the K number of subcarriers are equal to 0. At this point, indexes of the K number of subcarriers being used by a signal corresponding to information 0 and information 1 are the same. For example, a subcarrier index that is being used may be indicated as 33−floor(K/2): 33+ceil(K/2)−1.

At this point, Information 1 and Information 0 may have the following values.

Information 0=zeros (1, K)

Information 1=alpha*ones (1,K)

The alpha is a power normalization factor and may, for example, be equal to 1/sqrt(K).

Figure 10:
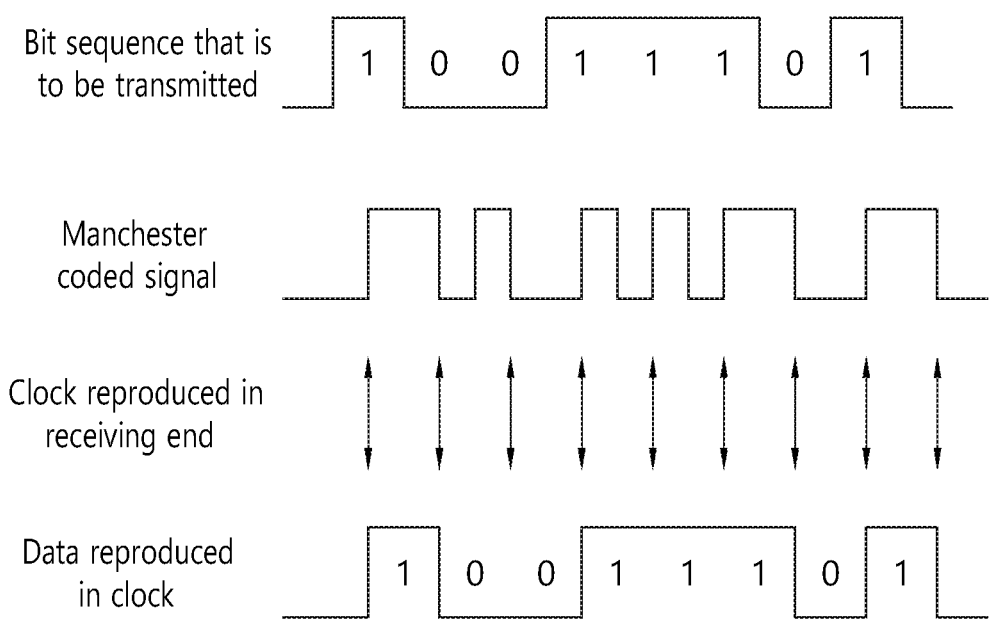
FIG. 10 is a descriptive diagram of a Manchester coding method according to an exemplary embodiment of this specification.

FIG. 10 is a descriptive diagram of a Manchester coding method according to an exemplary embodiment of this specification.

Manchester coding is a type of line coding that corresponds to/is related with a coding method in which a transition in a magnitude value occurs at a midpoint of one bit period. And, information of this method may be indicated as shown below in the following table.

TABLE 1

| Original data | | Clock | | Manchester value |
|---|---|---|---|---|
| 0 | = | 0 | XOR | 0 |
|   |   | 1 |   | 1 |
| 1 |   | 0 |   | 1 |
|   |   | 1 |   | 0 |

More specifically, the Manchester coding method (or technique) refers to a method of converting data from 1 to 01 and from 0 to 10 or from 1 to 10 and from 0 to 01. Table 1 shows an example of data being converted from 1 to 10 and from 0 to 01 by using Manchester coding.

As shown in FIG. 10, from top to bottom, the drawing illustrates a bit sequence that is to be transmitted, a Manchester coded signal, a clock that is reproduced by the receiving end, and data that is reproduced by the clock.

If data is transmitted from the transmitting end by using the Manchester coding method, the receiving end reads the data after a brief moment based on a transition point, wherein transition of 1→0 or 0→1 occurs. Then, after recovering the data and recognizing the transition point of transitioning 1→0 or 0→1 as the transition point of the block, the clock is recovered. Alternatively, when a symbol is divided based on the transition point, a simple decoding may be performed by comparing the power level of the front part of the symbol and the power level of the back part of the symbol based on the midpoint of the symbol.

As shown in FIG. 10, the bit sequence that is to be transmitted corresponds to/is related with 10011101, and the bit sequence that is to be transmitted being processed with Manchester coding corresponds to/is related with 0110100101011001, the clock that is reproduced in the receiving end recognizes a transition point of the Manchester-coded signal as the transition point of the block, and, then, data is recovered by using the clock, which is reproduced as described above.

When using the above-described Manchester coding method, communication may be carried out in a synchronization method by using only a data transmission channel and without using a separate clock.

Additionally, in the above-described, by using only the data transmission channel, a TXD pin may be used for data transmission, and an RXD pin may be used for data reception. Therefore, a synchronized two-way transmission may be performed.

This specification proposes diverse symbol types that can be used in a WUR and the corresponding data rate.

Since STAs requiring robust performance (or capacity) and STAs receiving intense signals from an AP are intermixed, depending upon the situation, supporting an efficient data rate is needed. In order to achieve a reliable and robust performance, a symbol-based Manchester coding method and a symbol repetition method may be used. Additionally, in order to achieve a high data rate, a symbol reduction method may be used.

At this point, each symbol may be generated by using the legacy 802.11 OFDM transmitter. And, the number of subcarriers that are used for generating each symbol may be equal to 13. However, the number of subcarriers will not be limited only to this.

Additionally, each symbol may use OOK modulation, which is configured of an ON-signal and an OFF-signal.

A symbol that is generated for the WUR may be configured of a cyclic prefix (CP) (or a guard interval (GI)) and a signal part indicating actual information. By diversely configuring the lengths of the CP and the actual information signal, or by repeating the CP and the actual information part, a symbol having diverse data rates may be designed.

Diverse example related to the symbol types are shown below.

For example, a basic WUR symbol may be indicated as CP+3.2 us. More specifically, 1 bit is indicated by using a symbol having the same length as the legacy Wi-Fi. Most particularly, the transmitting device performs IFFT after applying a specific sequence to all of the subcarriers that are available for usage (e.g., 13 subcarrier), thereby configuring an information signal part of 3.2 us. At this point, among all of the subcarriers that are available for usage, a coefficient of 0 may be loaded in a DC subcarrier or middle subcarrier index.

Different sequence may be applied to the subcarriers that are available for usage in accordance with a 3.2 us ON-signal and a 3.2 us OFF-signal. The 3.2 us OFF-signal may be generated by applying 0s to all of the coefficients.

The CP may select and use a part corresponding having a specific length at an end part of the information signal 3.2 us that immediately follows the CP. At this point, the CP may correspond to 0.4 us or 0.8 us. This length corresponds to/is related with the same length as the guard interval of 802.11ac.

Therefore, a 1-bit information corresponding to one basic WUR symbol may be indicated as shown below in the following table.

TABLE 2

| Information '0' | Information '1' |
|---|---|
| 3.2 us OFF-signal | 3.2 us ON-signal |

Table 2 does not separately indicate the CP. Actually, when including the CP, CP+3.2 us may indicate one 1-bit information. More specifically, the 3.2 us ON-signal may be regarded as a (CP+3.2 us) ON-signal, and the 3.2 us OFF-signal may be regarded as a (CP+3.2 us) OPP-signal.

For example, a symbol having Manchester coding applied thereto may be indicated as CP+1.6 us+CP+1.6 us or CP+1.6 us+1.6 us. The symbol having Manchester coding applied thereto may be generated as described below.

In an OOK transmission using a Wi-Fi transmitting device, the time period used for transmitting one bit (or symbol) excluding the guard interval of the transmitted signal is equal to 3.2 us. At this point, if Manchester coding is also applied, a shift in the signal size (or magnitude) should occur in 1.6 us. More specifically, each sub-information having a length of 1.6 us should be given a value of 0 or 1, and the corresponding signal may be configured by using the method described below.

Information 0→1 0 (Each may be referred to as sub-information 1 0 or sub-symbol 1 (ON) 0 (OFF).)

First 1.6 us (sub-information 1 or sub-symbol 1): Sub-information 1 may be given a value of beta*ones(1,K). Herein, the beta indicates/is related with a power normalization element and may, for example, be equal to 1/sqrt(ceil(K/2)).

Additionally, in order to generate the symbol having Manchester coding applied thereto, a specific sequence is applied to all subcarriers that are available for usage (e.g., 13 subcarriers) in units of 2 spaces. More specifically, each even-number indexed subcarrier of the specific pattern is nulled by using 0. For example, when it is assumed that an ON-signal is configured by using 13 subcarriers, the specific sequence having a coefficient at an interval of 2 spaces may correspond to {a 0 b 0 c 0 d 0 e 0 f 0 g}, {0 a 0 b 0 c 0 d 0 e 0 f 0}, or {a 0 b 0 c 0 0 0 d 0 e 0 f}. At this point, a, b, c, d, e, f, g may correspond to 1 or −1.

More specifically, among the 64 subcarriers, the transmitting device maps the specific sequence to K number of consecutive subcarriers (e.g., 33-floor(K/2): 33+ceil(K/2)−1) and sets a coefficient of 0 for the remaining subcarriers. Thereafter, the transmitting device performs IFFT. Thus, a time domain signal may be generated. Since the time domain signals has coefficients existing at an interval of 2 spaces within the frequency domain, the time domain signal corresponds to/is related with a 3.2 us-length signal of having a cycle of 1.6 us. One of a first 1.6 us-cycle signal and a second 1.6 us-cycle signal may be selected and used as sub-information 1.

Second 1.6 us (sub-information 0 or sub-symbol 0): Sub-information 0 may be given a value of zeros(1,K). Similarly, among the 64 subcarriers, the transmitting device maps the specific sequence to K number of consecutive subcarriers (e.g., 33-floor(K/2): 33+ceil(K/2)−1) and performs IFFT, thereby generating a time domain signal. Sub-information 0 may correspond to a 1.6 us OFF-signal. The 1.6 us OFF-signal may be generated by setting all of the coefficients to 0.

One of a first 1.6 us-cycle signal and a second 1.6 us-cycle signal of the time domain may be selected and used as sub-information 0. Simply, zero signals (1,32) may also be used as sub-information 0.

Information 1→0 1 (Each may be referred to as sub-information '0', '1' or sub-symbol 0 (OFF) 1 (ON).)

Since Information 1 is also divided into a first 1.6 us (sub-information 0) and a second 1.6 us (sub-information 1), a signal corresponding to each sub-information may be configured by using the same method as the method for generating Information 0.

When performing the method for generating Information 0 and Information 1 by using Manchester coding, a consecutive occurrence of OFF-symbols may be prevented as compared to the legacy method. Accordingly, a problem of coexistence with the legacy Wi-Fi device does not occur. The problem of coexistence refers to a problem that occurs when another device transmits a signal after determining that the channel is in a channel idle state, due to the existence of consecutive OFF-symbols. If the OOK modulation is only used, the sequence may, for example, correspond to 100001, wherein the OFF-symbol occurs consecutively. However, if Manchester coding is used, the sequence may correspond to 100101010110, wherein the OFF-symbols cannot be consecutive.

According to the description provided above, the sub-information may be referred to as a 1.6 us information signal. The 1.6 us information signal may correspond to a 1.6 us ON-signal or a 1.6 OFF-signal. The 1.6 us ON-signal and the 1.6 OFF-signal may have different sequences applied thereto in each subcarrier.

The CP may select and use a part corresponding having a specific length at an end part of the information signal 1.6 us that immediately follows the CP. At this point, the CP may correspond to 0.4 us or 0.8 us. This length corresponds to/is related with the same length as the guard interval of 802.11ac.

Therefore, a 1-bit information corresponding to a symbol having Manchester coding applied thereto may be indicated as shown below in the following table.

TABLE 3

| Information '0' | Information '1' |
|---|---|
| 1.6 us ON-signal + 1.6 us OFF-signal or 1.6 us OFF-signal + 1.6 us ON-signal | 1.6 us OFF-signal + 1.6 us ON-signal or 1.6 us ON-signal + 1.6 us OFF-signal |

Table 3 does not separately indicate the CP. Actually, when including the CP, CP+1.6 us+CP+1.6 us or CP+1.6 us+1.6 us may indicate one 1-bit information. More specifically, in case of the former structure, the 1.6 us ON-signal and the 1.6 us OFF-signal may be respectively regarded as a (CP+1.6 us) ON-signal and a (CP+1.6 us) OFF-signal.

As yet another example, proposed herein is a method for generating a wake-up packet by repeating symbols in order to enhance performance.

A symbol repetition method is applied to a wake-up payload (724). The symbol repetition method refers to a repetition of time signals after IFFT and cyclic prefix (CP) insertion in each symbol. Thus, the length (time (or duration)) of the wake-up payload (724) becomes two times its initial length.

More specifically, a method for generating a wake-up packet by applying a symbol, which indicates information such as Information 0 or Information 1, to a specific sequence and by repeating this process is proposed as described below.

Option 1: Information 0 and Information 1 may be indicated by being repeated as the same symbol.
Information 0→0 0 (Information 0 is repeated 2 times)
Information 1→1 1 (Information 1 is repeated 2 times)
Option 2: Information 0 and Information 1 may be indicated by being repeated as different symbols.
Information 0→0 1 or 1 0 (Information 0 and Information 1 are repeated)
Information 1→1 0 or 0 1 (Information 1 and Information 0 are repeated)

Hereinafter, a method of decoding a signal, by a receiving device, being transmitted from a transmitting device after applying the symbol repetition method will be described in detail.

The transmitted signal may correspond to a wake-up packet, and a method for decoding the wake-up packet may be broadly divided into two different types. A first type corresponds to a non-coherent detection method, and a second type corresponds to a coherent detection method. The non-coherent detection method refers to a method wherein a phase relation between signals of the transmitting device and the receiving device is not fixed. Therefore, the receiving device is not required to measure and adjust the phase of the received signal. Conversely, in the coherent detection method, the phase between the signals of the transmitting device and the receiving device is required to be matched.

The receiving device includes the above-described low-power wake-up receiver. In order to reduce power consumption, the low-power wake-up receiver may decode a packet (wake-up packet), which is transmitted by using the OOK modulation scheme, by using an envelope detector.

The envelope detector uses a method of decoding a received signal by measuring the power or magnitude of the corresponding signal. The receiving device determines in advance a threshold value based on the power or magnitude of the received signal, which is measured by using the envelope detector. Thereafter, when the receiving device decodes the symbol having OOK applied thereto, if the symbol is greater than or equal to the threshold value, the symbol is determined as Information 1, and, if the symbol is smaller than the threshold value, the symbol is determined as Information 0.

A method for decoding a symbol having the symbol repetition method applied thereto is as described below. In the above-described Option 1, the receiving device may calculate the power corresponding to a case where Symbol 1 (symbol including Information 1) is transmitted by using a wake-up preamble (722) and may use the calculated power to determine a threshold value.

More specifically, when an average power level between two symbols is calculated, and, if the calculated average power level is equal to or greater than the threshold value, the symbol is determined as Information 1 (1 1). And, if the calculated average power level is equal to or smaller than the threshold value, the symbol is determined as Information 0 (0 0).

Additionally, in the above-described Option 2, the information may be determined by comparing the power levels of the two symbols without performing the process of determining the threshold value.

More specifically, when it is given that Information 1 is configured of 0 1 and that Information 0 is configured of 1 0, if the power level of a first symbol is greater than the power level of a second symbol, the information is determined as Information 0. Conversely, if the power level of the first symbol is smaller than the power level of the second symbol, the information is determined as Information 1.

The order of the symbols may be reconfigured by an interleaver. Herein, the interleaver may be applied in packet units and units of a specific number of symbols.

Moreover, in addition to two symbols, the symbol repetition may be extended by using n number of symbols, as described below. FIG. 11 illustrates various examples of a symbol repetition method repeating n number of symbols according to an exemplary embodiment of this specification.

Option 1: As described in FIG. 11, Information 0 and Information 1 may be indicated by being repeated n number of times as the same symbol.
Information 0→0 0 . . . 0 (Information 0 is repeated n number of times)
Information 1→1 1 . . . 1 (Information 1 is repeated n number of times)
Option 2: As described in FIG. 11, Information 0 and Information 1 may be indicated by being repeated n number of times as different symbols.
Information 0→0 1 0 1 . . . or 1 0 1 0 . . . (Information 0 and Information 1 are alternately repeated n number of times)
Information 1→1 0 1 0 . . . or 0 1 0 1 . . . (Information 1 and Information 0 are alternately repeated n number of times)
Option 3: As described in FIG. 11, n number of symbols may be indicated by configuring one half of the symbols of Information 0 and by configuring another half of the symbols of Information 1.
Information 0→0 0 . . . 1 1 . . . or 1 1 . . . 0 0 . . . (n/2 number of symbols is configured of Information 0, and the remaining n number of symbols is configured of Information 1)
Information 1→1 1 . . . 0 0 . . . or 0 0 . . . 1 1 . . . (n/2 number of symbols is configured of Information 0, and the remaining n number of symbols is configured of Information 1)
Option 4: As described in FIG. 11, when n is an odd number, a total of n number of symbols may be indicated by differentiating a number of Symbol 1 's (symbol including Information 1) and a number of Symbol 0's (symbols including Information 0) from one another.
Information 0→n number of symbols configured of an odd number of Symbol 1's and an even number of Symbol 0's, or n number of symbols configured of an even number of Symbol 1's and an odd number of Symbol 0's
Information 1→n number of symbols configured of an odd number of Symbol 0's and an even number of Symbol 1's, or n number of symbols configured of an even number of Symbol 0's and an odd number of Symbol 1's Additionally, the order of the symbols may be reconfigured by an interleaver. Herein, the interleaver may be applied in packet units and units of a specific number of symbols.

Moreover, as described above, the receiving device may determine the symbol (or information) as Information 0 or Information 1 by determining the threshold value and comparing the power levels of n number of symbols.

However, if consecutive Symbol 0's (or OFF-signals) are used, a problem of coexistence with the legacy Wi-Fi device and/or another device may occur. The problem of coexistence refers to a problem that occurs when another device transmits a signal after determining that the channel is in a channel idle state, due to the existence of consecutive OFF-symbols. Therefore, in order to resolve the problem of coexistence, since it is preferable to avoid the usage of consecutive OFF-signals, the method proposed in Option 2 may be preferred.

Additionally, this may be extended to a method of expressing m number of information sets by using n number of symbols. In this case, the first or last m number of information sets may be indicated as symbols 0 (OFF) or 1 (ON) in accordance with the corresponding information sets, and n-m number of redundant symbols 0 (OFF) or 1 (ON) may be consecutively configured after or before the first or last m number of information sets.

For example, if a code rate of ¾ is applied to information 010, the information may correspond to 1,010 or 010,1 or 0,010 or 010,0. However, in order to prevent the usage of consecutive OFF symbols, it may be preferable to apply a code rate of ½ or less.

Similarly, in this exemplary embodiment, the order of the symbols may be reconfigured by an interleaver. Herein, the interleaver may be applied in packet units and units of a specific number of symbols.

Hereinafter, various exemplary embodiments of a symbol having the symbol repetition method applied thereto will be described in detail.

Generally, a symbol having the symbol repetition method applied thereto may be indicated as n number of (CP+3.2 us) or CP+n number of (1.6 us).

As shown in FIG. 11, 1 bit is indicated by using n (n>=2) number of information signals (symbols), and, after applying a specific sequence to all of the subcarriers that are available for usage (e.g., 13 subcarriers), IFFT is performed so as to configure an information signal (symbol) of 3.2 us.

Different sequences may be applied to the subcarriers that are available for usage in accordance with a 3.2 us ON-signal and a 3.2 us OFF-signal. The 3.2 us OFF-signal may be generated by applying 0s to all of the coefficients.

The CP may select and use a part corresponding having a specific length at an end part of the information signal 3.2 us that immediately follows the CP. At this point, the CP may correspond to 0.4 us or 0.8 us. This length corresponds to the same length as the guard interval of 802.11ac.

Therefore, a 1-bit information corresponding to a general symbol having the symbol repetition method applied thereto may be indicated as shown below in the following table.

TABLE 4

| Information '0' | Information '1' |
|---|---|
| All 3.2 us OFF-signals or two specific consecutive signals are 3.2 us ON-signal + 3.2 us OFF-signal, and the remaining signals are all ON or all OFF or two specific consecutive signals are 3.2 us OFF-signal + 3.2 us ON-signal, and the remaining signals are all ON or all OFF or a specific number (or ceil(n/2) number or floor(n/2) number) of signals located at specific positions are 3.2 us OFF-signals, and the remaining signals are 3.2 us ON-signals Ex) ON + OFF + ON + OFF . . . | All 3.2 us ON-signals or two specific consecutive signals are 3.2 us OFF-signal + 3.2 us ON-signal, and the remaining signals are all ON or all OFF or two specific consecutive signals are 3.2 us ON-signal + 3.2 us OFF-signal, and the remaining signals are all ON or all OFF or a specific number (or ceil(n/2) number or floor(n/2) number) of signals located at specific positions are 3.2 us ON-signals, and the remaining signals are 3.2 us OFF-signals Ex) OFF + ON + OFF + ON + OFF . . . |

Table 4 does not separately indicate the CP. Actually, when including the CP, n number of (CP+3.2 us) or CP+n number of (3.2 us) may indicate one 1-bit information. More specifically, in case of the n number of (CP+3.2 us), the 3.2 us ON-signal may be regarded as a (CP+3.2 us) ON-signal, and the 3.2 us OFF-signal may be regarded as a (CP+3.2 us) OFF-signal.

As another example, a symbol having the symbol repetition method applied thereto may be indicated as CP+3.2 us+CP+3.2 us or CP+3.2 us+3.2 us.

According to this exemplary embodiment, 1 bit is indicated by using two information signals (symbols), and, after applying a specific sequence to all of the subcarriers that are available for usage (e.g., 13 subcarriers), IFFT is performed so as to configure an information signal (symbol) of 3.2 us.

Different sequences may be applied to the subcarriers that are available for usage in accordance with a 3.2 us ON-signal and a 3.2 us OFF-signal. The 3.2 us OFF-signal may be generated by applying 0s to all of the coefficients.

The CP may select and use a part corresponding having a specific length at an end part of the information signal 3.2 us that immediately follows the CP. At this point, the CP may correspond to 0.4 us or 0.8 us. This length corresponds to the same length as the guard interval of 802.11ac.

Therefore, a 1-bit information corresponding to a symbol having the symbol repetition method applied thereto may be indicated as shown below in the following table.

TABLE 5

| Information '0' | Information '1' |
|---|---|
| 3.2 us OFF-signal + 3.2 us OFF-signal | 3.2 us ON-signal + 3.2 us ON-signal |
| or 3.2 us ON-signal + 3.2 us OFF-signal | or 3.2 us OFF-signal + 3.2 us ON-signal |
| or 3.2 us OFF-signal + 3.2 us ON-signal | or 3.2 us ON-signal + 3.2 us OFF-signal |

Table 5 does not separately indicate the CP. Actually, when including the CP, CP+3.2 us+CP+3.2 us or CP+3.2 us+3.2 us may indicate one 1-bit information. More specifically, in case of CP+3.2 us+CP+3.2 us, the 3.2 us ON-signal may be regarded as a (CP+3.2 us) ON-signal, and the 3.2 us OFF-signal may be regarded as a (CP+3.2 us) OFF-signal.

As yet another example, a symbol having the symbol repetition method applied thereto may be indicated as CP+3.2 us+CP+3.2 us+CP+3.2 us or CP+3.2 us+3.2 us+3.2 us.

According to this exemplary embodiment, 1 bit is indicated by using three information signals (symbols), and, after applying a specific sequence to all of the subcarriers that are available for usage (e.g., 13 subcarriers), IFFT is performed so as to configure an information signal (symbol) of 3.2 us.

Different sequences may be applied to the subcarriers that are available for usage in accordance with a 3.2 us ON-signal and a 3.2 us OFF-signal. The 3.2 us OFF-signal may be generated by applying 0s to all of the coefficients.

The CP may select and use a part corresponding having a specific length at an end part of the information signal 3.2 us that immediately follows the CP. At this point, the CP may correspond to 0.4 us or 0.8 us. This length corresponds to the same length as the guard interval of 802.11ac.

Therefore, a 1-bit information corresponding to a symbol having the symbol repetition method applied thereto may be indicated as shown below in the following table.

TABLE 6

| Information '0' | Information '1' |
|---|---|
| 3.2 us OFF-signal + 3.2 us OFF-signal + 3.2 us OFF-signal | 3.2 us ON-signal + 3.2 us ON-signal + 3.2 us ON-signal |
| or 3.2 us ON-signal + 3.2 us ON-signal + 3.2 us OFF-signal | or 3.2 us OFF-signal + 3.2 us OFF-signal + 3.2 us ON-signal |
| or 3.2 us ON-signal + 3.2 us OFF-signal + 3.2 us ON-signal | or 3.2 us OFF-signal + 3.2 us ON-signal + 3.2 us OFF-signal |
| or 3.2 us ON-signal + 3.2 us OFF-signal + 3.2 us OFF-signal | or 3.2 us OFF-signal + 3.2 us ON-signal + 3.2 us ON-signal + 3.2 us OFF-signal |

Table 6 does not separately indicate the CP. Actually, when including the CP, CP+3.2 us+CP+3.2 us+CP+3.2 us or CP+3.2 us+3.2 us+3.2 us may indicate one 1-bit information. More specifically, in case of CP+3.2 us+CP+3.2 us+CP+3.2 us, the 3.2 us ON-signal may be regarded as a (CP+3.2 us) ON-signal, and the 3.2 us OFF-signal may be regarded as a (CP+3.2 us) OFF-signal.

As yet another example, a symbol having the symbol repetition method applied thereto may be indicated as CP+3.2 us+CP+3.2 us+CP+3.2 us+CP+3.2 us or CP+3.2 us+3.2 us+3.2 us+3.2 us.

According to this exemplary embodiment, 1 bit is indicated by using four information signals (symbols), and, after applying a specific sequence to all of the subcarriers that are available for usage (e.g., 13 subcarriers), IFFT is performed so as to configure an information signal (symbol) of 3.2 us.

Different sequences may be applied to the subcarriers that are available for usage in accordance with a 3.2 us ON-signal and a 3.2 us OFF-signal. The 3.2 us OFF-signal may be generated by applying 0s to all of the coefficients.

The CP may select and use a part corresponding having a specific length at an end part of the information signal 3.2 us that immediately follows the CP. At this point, the CP may correspond to 0.4 us or 0.8 us. This length corresponds to the same length as the guard interval of 802.11ac.

Therefore, a 1-bit information corresponding to a symbol having the symbol repetition method applied thereto may be indicated as shown below in the following table.

TABLE 7

| Information '0' | Information '1' |
|---|---|
| 3.2 us OFF-signal + 3.2 us OFF-signal + 3.2 us OFF-signal + 3.2 us OFF-signal | 3.2 us ON-signal + 3.2 us ON-signal + 3.2 us ON-signal + 3.2 us ON-signal |
| or 3.2 us ON-signal + 3.2 us ON-signal + 3.2 us ON-signal + 3.2 us OFF-signal | or 3.2 us ON-signal + 3.2 us ON-signal + 3.2 us OFF-signal + 3.2 us ON-signal |
| or 3.2 us ON-signal + 3.2 us ON-signal + 3.2 us OFF-signal + 3.2 us ON-signal | or 3.2 us ON-signal + 3.2 us ON-signal + 3.2 us ON-signal + 3.2 us OFF-signal |
| or 3.2 us ON-signal + 3.2 us ON-signal + 3.2 us OFF-signal + 3.2 us ON-signal | or 3.2 us ON-signal + 3.2 us OFF-signal + 3.2 us ON-signal + 3.2 us ON-signal |
| or 3.2 us ON-signal + 3.2 us OFF-signal + 3.2 us ON-signal + 3.2 us ON-signal | or 3.2 us ON-signal + 3.2 us ON-signal + 3.2 us OFF-signal + 3.2 us ON-signal |
| or 3.2 us ON-signal + 3.2 us OFF-signal + 3.2 us ON-signal + 3.2 us ON-signal | or 3.2 us OFF-signal + 3.2 us ON-signal + 3.2 us OFF-signal + 3.2 us ON-signal |
| or 3.2 us ON-signal + 3.2 us ON-signal + 3.2 us OFF-signal + 3.2 us OFF-signal | or 3.2 us OFF-signal + 3.2 us OFF-signal + 3.2 us ON-signal + 3.2 us ON-signal |
| or 3.2 us OFF-signal + 3.2 us OFF-signal + 3.2 us ON-signal + 3.2 us ON-signal | or 3.2 us ON-signal + 3.2 us ON-signal + 3.2 us OFF-signal + 3.2 us OFF-signal |

Table 7 does not separately indicate the CP. Actually, when including the CP, CP+3.2 us+CP+3.2 us+CP+3.2 us+CP+3.2 us or CP+3.2 us+3.2 us+3.2 us+3.2 us may indicate one 1-bit information. More specifically, in case of CP+3.2 us+CP+3.2 us+CP+3.2 us+CP+3.2 us, the 3.2 us ON-signal may be regarded as a (CP+3.2 us) ON-signal, and the 3.2 us OFF-signal may be regarded as a (CP+3.2 us) OFF-signal.

As yet another example, a symbol having Manchester coding applied thereto may be indicated as n number of (CP+1.6 us+CP+1.6 us) or CP+n number of (1.6 us+1.6 us).

According to this exemplary embodiment, 1 bit is indicated by a symbol that is repeated n (n>=2) number of times, and, after applying a specific sequence to all of the subcarriers that are available for usage (e.g., 13 subcarriers) and setting a coefficient of 0 for the remaining subcarriers, IFFT is performed so as to generate a signal (symbol) of 3.2 us having a cycle of 1.6 us. Herein, one of the configured signals is selected and set (or configured) as a 1.6 us information signal (symbol).

A sub-information may be referred to as a 1.6 us information signal. The 1.6 us information signal may correspond to a 1.6 us ON-signal or a 1.6 us OFF-signal. The 1.6 us ON-signal and the 1.6 us OFF-signal may have different sequences applied thereto in each subcarrier. The 1.6 us OFF-signal may be generated by applying 0s to all of the coefficients.

The CP may select and use a part corresponding having a specific length at an end part of the information signal 1.6 us that immediately follows the CP. At this point, the CP may correspond to 0.4 us or 0.8 us. This length corresponds to the same length as the guard interval of 802.11ac.

Therefore, a 1-bit information corresponding to a symbol having Manchester coding applied thereto based on symbol repetition may be indicated as shown below in the following table.

TABLE 8

| Information '0' | Information '1' |
|---|---|
| (1.6 us ON-signal + 1.6 us OFF-signal) is repeated n number of times | (1.6 us OFF-signal + 1.6 us ON-signal) is repeated n number of times |
| or (1.6 us OFF-signal + 1.6 us ON-signal) is repeated n number of times | or (1.6 us ON-signal + 1.6 us OFF-signal) is repeated n number of times |
| (1.6 us ON-signal + 1.6 us OFF-signal) + (1.6 us OFF-signal + 1.6 us ON-signal) is repeated floor(n/2) number of times + (1.6 us ON-signal + 1.6 us OFF-signal) when needed | (1.6 us OFF-signal + 1.6 us ON-signal) + (1.6 us ON-signal + 1.6 us OFF-signal) is repeated floor(n/2) number of times + (1.6 us OFF-signal + 1.6 us ON-signal) when needed |
| (1.6 us OFF-signal + 1.6 us ON-signal) + (1.6 us ON-signal + 1.6 us OFF-signal) is repeated floor(n/2) number of times + (1.6 us OFF-signal + 1.6 us ON-signal) when needed | (1.6 us ON-signal + 1.6 us OFF-signal) + (1.6 us OFF-signal + 1.6 us ON-signal) is repeated floor(n/2) number of times + (1.6 us ON-signal + 1.6 us OFF-signal) when needed |

Table 8 does not separately indicate the CP. Actually, when including the CP, n number of (CP+1.6 us+CP+1.6 us) or CP+n number of (1.6 us+1.6 us) may indicate one 1-bit information. More specifically, in case of the n number of (CP+1.6 us+CP+1.6 us), the 1.6 us ON-signal may be regarded as a (CP+1.6 us) ON-signal, and the 1.6 us OFF-signal may be regarded as a (CP+1.6 us) OFF-signal.

As shown in the above-described exemplary embodiments, by using the symbol repetition method, the range requirement of the low-power wake-up communication may be satisfied. In case of applying only the OOK scheme, the data rate for one symbol is 250 Kbps (4 us). At this point, if the symbol is repeated 2 times by using the symbol repetition method, the data rate may become 125 Kbps (8 us), and, if the symbol is repeated 4 times, the data rate may become 62.5 Kbps (16 us), and, if the symbol is repeated 8 times, the data rate may become 31.25 Kbps (32 us). In case of the low-power communication, if the BCC does not exist, the symbol should be repeated 8 times in order to satisfy the range requirement.

Hereinafter, various embodiments of a symbol subjected/applied to a symbol reduction scheme among symbol types that can be used for a WUR will be described.

Figure 12:
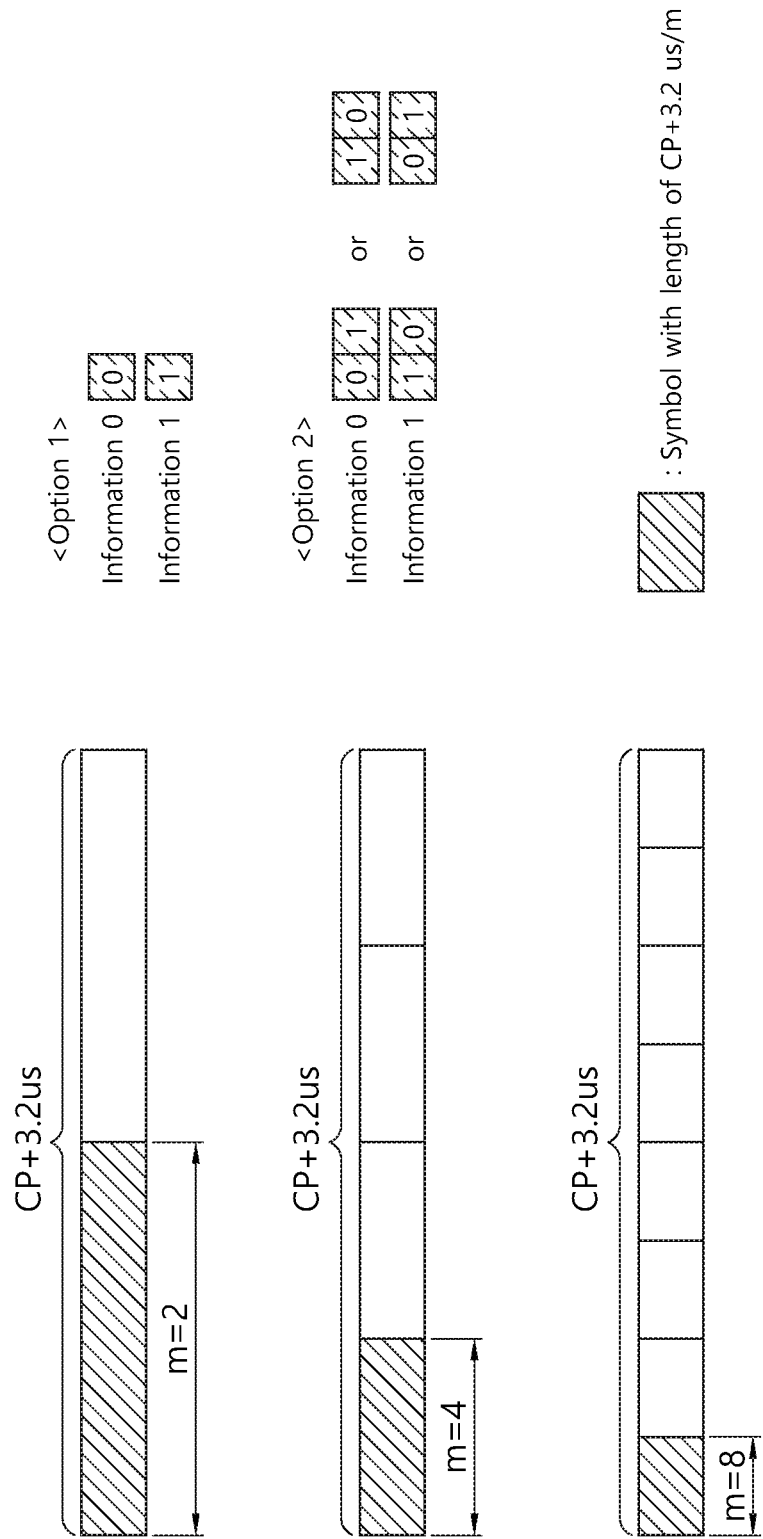
FIG. 12 shows various examples of a symbol reduction scheme according to an embodiment.

FIG. 12 shows various examples of a symbol reduction scheme according to an embodiment.

According to the embodiment of FIG. 12, as m increases, a symbol is reduced, and accordingly the length of a symbol carrying one piece of information is reduced. When m=2, the length of a symbol carrying one piece of information is CP+1.6 us. When m=4, the length of a symbol carrying one piece of information is CP+0.8 us. When m=8, the length of a symbol carrying one piece of information is CP+0.4 us.

The shorter a symbol length is, a higher data rate may be obtained. When only OOK is applied, a data rate for one symbol is 250 Kbps (4 us). In a case where a symbol reduction scheme is applied: when m=2, the data rate may be 500 Kbps (2 us); when m=4, the data rate may be 1 Mbps (1 us); when m=8, the data rate may be 2 Mbps (0.5 us).

For example, a symbol to which a symbol reduction scheme is applied may be represented as CP+3.2 us/m (m=2, 4, 8, 16, 32, . . . ) (Option 1).

As in Option 1 of FIG. 12, one bit is represented using a symbol to which a symbol reduction scheme is applied, a particular sequence is applied to all available subcarriers (for example, 13 subcarriers) by a unit of m subcarriers, and a coefficient of 0 is set for the remaining subcarriers. Then, IFFT is performed on the subcarriers to which the particular sequence is applied, thereby generating 3.2 us signals having a period of 3.2 us/m, one of which is mapped to a 3.2 us/m information signal (information 1).

For example, when a particular sequence is applied to 13 subcarriers by a unit of two subcarriers (m=2), an on signal may be configured as follows.

On signal (information 1); {a 0 b 0 c 0 d 0 e 0 f 0 g} or {0 a 0 b 0 c 0 d 0 e 0 f 0}, where a, b, c, d, e, f, and g are 1 or −1.

In another example, when a particular sequence is applied to 13 subcarriers by a unit of four subcarriers (m=4), an on signal may be configured as follows.

On signal (information 1): {a 0 0 0 b 0 0 0 c 0 0 0 d}, {0 a 0 0 0 b 0 0 0 c 0 0 0}, {0 0 a 0 0 0 b 0 0 0 c 0 0}, {0 0 0 a 0 0 0 b 0 0 0 c 0}, or {0 0 a 0 0 0 0 0 0 0 b 0 0}, where a, b, c, and d are 1 or −1.

In still another example, when a particular sequence is applied to 13 subcarriers by a unit of eight subcarriers (m=8), an on signal may be configured as follows.

On signal (information 1): {a 0 0 0 0 0 0 0 b 0 0 0 0}, {0 a 0 0 0 0 0 0 0 b 0 0 0}, {0 0 a 0 0 0 0 0 0 0 b 0 0}, {0 0 0 a 0 0 0 0 0 0 0 b 0}, or {0 0 0 0 a 0 0 0 0 0 0 0 b}, where a and b is 1 or −1.

A 3.2 us/m information signal is divided into a 3.2 us/m on signal and a 3.2 us/m off signal. Different sequences may be applied to (available) subcarriers for the 3.2 us/m on signal and the 3.2 us/m off signal. The 3.2 us/m off signal may be generated by applying 0 to all coefficients.

A CP may be used by adopting a specified length of the following 3.2 us/m information signal from the back. Here, the CP may be 0.4 us or 0.8 us. This length is the same as the length of a guard interval in 802.11ac. However, when m=8, the CP cannot be 0.8 us. Alternatively, the CP may be 0.1 us or 0.2 us and may be a different value.

Therefore, one-bit information corresponding to a symbol to which a general symbol reduction scheme is applied may be represented as in the following table.

TABLE 9

| Information 0 | Information 1 |
| --- | --- |
| 3.2 us/m OFF-signal | 3.2 us/m ON-signal |

In Table 9, the CP is not indicated. Actually, CP+3.2 us/m including the CP may indicate one one-bit information. That is, the 3.2 us/m on signal may be considered as a CP+3.2 us/m on signal, and the 3.2 us/m off signal may be considered as a CP+3.2 us/m off signal.

In another example, a symbol to which a symbol reduction scheme is applied may be represented as CP+3.2 us/m+CP+3.2 us/m (m=2, 4, 8) (Option 2).

In OOK transmission using a Wi-Fi transmission device, the time used to transmit one bit (or symbol) excluding a guard interval of a transmission signal is 3.2 us. Here, when a symbol reduction scheme is applied, the time used to transmit one bit is 3.2 us/m. However, in this embodiment, the time used to transmit one bit is set to 3.2 us/m+3.2 us/m by repeating a symbol to which the symbol reduction scheme is applied, and transition in signal size between 3.2 us/m signals is allowed to occur using characteristics of Manchester coding. That is, each piece of sub-information having a length of 3.2 us/m needs to have a value of 0 or 1, and a signal may be configured as follows.

Information 0→1 0 (each may be called sub-information 1 or 0, or sub-symbol 1 (ON) or 0 (OFF))

First 3.2 us/m signal (sub-information 1 or sub-symbol 1): A particular sequence is applied by a unit of m spaces to all subcarriers (for example, 13 subcarriers) available to generate a symbol to which a symbol reduction scheme is applied. That is, the particular sequence may have a coefficient at intervals of m spaces.

The transmission device maps particular sequences to K consecutive subcarriers among 64 subcarriers, sets a coefficient of 0 for the remaining subcarriers, and performs IFFT the subcarriers. Accordingly, a time-domain signal may be generated. Since the time-domain signal has a coefficient at intervals of m spaces in the frequency domain, a 3.2 us signal having a period of 3.2 us/m is generated. One of these signals may be adopted and used as a 3.2 us/m on signal (sub-information 1).

Second 3.2 us/m signal (sub-information 0 or sub-symbol 0): Similarly to the first 3.2 us/m signal, the transmission device may map particular sequences to K consecutive subcarriers among 64 subcarriers and may perform IFFT thereon, thereby generating a time-domain signal. Sub-information 0 may correspond to a 3.2 us/m off signal. The 3.2 us/m off signal may be generated by setting all coefficients to 0.

One of the first and second 3.2 us/m periodic signals of the time-domain signals may be selected and used as sub-information 0.

Information 1→0 1 (each may be called sub-information 0 or 1, or sub-symbol 0 (OFF) or 1 (ON))

Since information 1 is also divided into a first 3.2 us/m signal (sub-information 0) and a second 3.2 us/m signal (sub-information 1), a signal corresponding to each sub-information may be configured in the same manner as used for generating information 0.

Information 0 may be configured as 01, and information 1 may be configured as 10.

As in Option 2 of FIG. 12, one-bit information corresponding to a symbol to which a symbol reduction scheme is applied may be represented as in the following table.

TABLE 10

| Information 0 | Information 1 |
|---|---|
| 3.2 us/m OFF-signal + 3.2 us/m ON-signal or | 3.2 us/m ON-signal + 3.2 us/m OFF-signal or |
| 3.2 us/m ON-signal + 3.2 us/m OFF-signal | 3.2 us/m OFF-signal + 3.2 us/m ON-signal |

In Table 10, the CP is not indicated. Actually, CP+3.2 us/m including the CP may indicate one one-bit information. That is, the 3.2 us/m on signal may be considered as a CP+3.2 us/m on signal, and the 3.2 us/m off signal may be considered as a CP+3.2 us/m off signal.

Embodiments of Option 1 and Option 2 in FIG. 12 may be generalized as in the following table.

TABLE 11

| | Information 0 | Information 1 |
|---|---|---|
| Option 1 (m = 2, 4, 8) | 2 us OFF-signal<br>1 us OFF-signal<br>0.5 us OFF-signal | 2 us ON-signal<br>1 us ON-signal<br>0.5 us ON-signal |
| Option 2 (m = 4, 8) | 1 us OFF-signal + 1 us ON-signal or<br>1 us ON-signal + 1 us OFF-signal<br>0.5 us OFF-signal + 0.5 us ON-signal or<br>0.5 us ON-signal + 0.5 us OFF-signal | 1 us ON-signal + 1 us OFF-signal or<br>1 us OFF-signal + 1 us ON-signal<br>0.5 us ON-signal + 0.5 us OFF-signal or<br>0.5 us OFF-signal + 0.5 us ON-signal |

In Table 11, each signal is represented by a length including a CP. That is, CP+3.2 us/m including a CP may indicate one one-bit information.

For example, when m=4 in Option 2, since the length of a symbol carrying one piece of information is CP+0.8 us, a 1 us off signal or 1 us on signal includes a CP (0.2 us)+0.8 us signal. In Option 2, since Manchester coding is applied, a symbol is repeated. Thus, when m=4, data rate for one piece of information may be 500 Kbps.

In another example, when m=8 in Option 2, since the length of a symbol carrying one piece of information is CP+0.4 us, a 0.5 us off signal or a 0.5 us on signal includes a CP (0.1 us)+0.4 us signal. In Option 2, since Manchester coding is applied, a symbol is repeated. Thus, when m=8, data rate for one piece of information may be 1 Mbps.

The following table shows data rates that can be obtainable through the foregoing embodiments.

TABLE 12

| CP | Default symbol (Embodiment 1) (CP + 3.2 us) | Man. Symbol (Embodiment 2) (CP + 1.6 + CP + 1.6) | Man. Symbol (Embodiment 3) (CP + 1.6 + 1.6) |
|---|---|---|---|
| 0.4 us | 277.8 | 250.0 | 277.8 |
| 0.8 us | 250.0 | 208.3 | 250.0 |

TABLE 13

| | Symbol rep. n (CP + 3.2 us) | | | Symbol rep. CP + n (3.2 us) | | | Man. symbol rep. n (CP + 1.6 us + CP + 1.6 us) | | |
|---|---|---|---|---|---|---|---|---|---|
| CP | n = 2 (Embodiment 4) | n = 3 (Embodiment 5) | n = 4 (Embodiment 6) | n = 2 (Embodiment 7) | n = 3 (Embodiment 8) | n = 4 (Embodiment 9) | n = 2 (Embodiment 10) | n = 3 (Embodiment 11) | n = 4 (Embodiment 12) |
| 0.4 us | 138.9 | 92.6 | 69.4 | 147.1 | 100.0 | 75.8 | 125.0 | 83.3 | 62.5 |
| 0.8 us | 125.0 | 83.3 | 62.5 | 138.9 | 96.2 | 73.5 | 104.2 | 69.4 | 52.1 |

TABLE 14

| | Man. symbol rep. CP + n (1.6 us + 1.6 us) | | | Symbol reduction CP + 3.2 us/m | | |
|---|---|---|---|---|---|---|
| CP | n = 2 (Embodiment 13) | n = 3 (Embodiment 14) | n = 4 (Embodiment 15) | m = 2 (Embodiment 16) | m = 4 (Embodiment 17) | m = 8 (Embodiment 18) |
| 0.4 us | 147.1 | 100.0 | 75.8 | 500.0 | 833.3 | 1250.0 |
| 0.8 us | 138.9 | 96.2 | 73.5 | 416.7 | 625.0 | NA |

TABLE 15

| CP | Symbol reduction CP + 3.2 us/m | | Man. symbol rep. w/Man. CP + 3.2 us/m + CP + 3.2 us/m | |
| --- | --- | --- | --- | --- |
| | m = 4 | m = 8 | m = 4 | m = 8 |
| 0.1 us | 1111.1 | 2000 | 555.6 | 1000 |
| 0.2 us | 1000 | 1666.7 | 500 | 833.3 |

Hereinafter, the disclosure proposes a method of configuring sequences with various lengths according to each symbol type in order to minimize PAPR.

When a coefficient of 1 is simply inserted into a subcarrier for an on symbol or an on sub-symbol, a high PAPR is obtained. Therefore, a coefficient to be inserted into a subcarrier in an on symbol in order to reduce a PAPR is proposed, and the number of subcarriers (the number of tones into which a non-zero coefficient is inserted) and a bandwidth are considered as in the following table. A value in parentheses denotes a PAPR [dB] when only a coefficient of 1 is used. However, the PAPR is calculated by applying four-time IFFT (256-point IFFT).

TABLE 16

| BW [MHz] | 2.5 | 4 | 5 | 10 | 20 |
| --- | --- | --- | --- | --- | --- |
| Simple OOK | 8 (9.0309) | 13 (11.1394) | 16 (12.0412) | 32 (15.0515) | 64 (18.0618) |
| OOK w/Manchester coding Or symbol reduction (1.6 us) | 4 (6.0206) | 6/7 (7.7815/8.4510) | 8 (9.0309) | 16 (12.0412) | 32 (15.0515) |

The following methods are proposed for a design of a sequence to minimize a PAPR.
Method 1: Full search
Method 2: Given sequence+insertion of optimal coefficient of 1
Method 3: Reuse of conventional sequence
Method 4: Proposed sequence repetition+phase rotation
<Method 1: Full Search>
A sequence according to the bandwidth and a corresponding PAPR in method 1 may be proposed as follows. In the following table, #Sub denotes the number of subcarriers into which a non-zero coefficient is inserted and applies equally to the following embodiments.

TABLE 17

| BW [MHz] | | 2.5 | 4 |
| --- | --- | --- | --- |
| Simple OOK | #Sub. | 8 | 13 |
| | Sequence | ±{1, 1, 1, -1, 1, -1, -1, 1} | ±{1, 1, 1, -1, -1, -1, 1, 1, -1, 1, 1, -1, 1} |
| | | ±{1, -1, -1, 1, -1, 1, 1, 1} | ±{1, -1, 1, 1, -1, 1, 1, -1, -1, -1, 1, 1, 1} |
| | PAPR [dB] | 2.2011 | 2.0992 |
| OOK w/ Manchester coding Or symbol reduction (1.6 us) | # Sub. | 4 | 6 | 7 |
| | Sequence | ±{1, 0, 1, 0, 1, 0, -1, 0} | ±{0, 1, 0, 1, 0, -1, 0, 1, 0, -1, 0} | ±{1, 0, 1, 0, 1, 0, -1, 0, -1, 0, 1, 0, -1} |
| | | ±{0, 1, 0, 1, 0, 1, 0, -1} | ±{0, -1, 0, -1, 0, 1, 0, -1, 0, 1, 0} | ±{-1, 0, 1, 0, -1, 0, -1, 0, 1, 0, 1, 0, 1} |
| | | ±{-1, 0, 1, 0, 1, 0, 1, 0} | | |
| | | ±{0, -1, 0, 1, 0, 1, 0, 1} | | |
| | PAPR [dB] | 2.4763 | 3.1183 | 1.3846 |

TABLE 18

| BW [MHz] | | 5 | 10 |
| --- | --- | --- | --- |
| Simple OOK | # Sub. | 16 | 32 |
| | Sequence | ±{1, 1, 1, -1, -1, -1, -1, 1, -1, -1, 1, -1, -1, -1, 1, -1} | |
| | | ±{-1, 1, -1, -1, -1, 1, -1, -1, 1, -1, -1, -1, -1, 1, 1, 1} | |
| | PAPR [dB] | 2.3303 | |
| OOK w/ Manchester coding Or symbol reduction (1.6 us) | # Sub. | 8 | 16 |
| | Sequence | ±{1, 0, 1, 0, 1, 0, -1, 0, 1, 0, -1, 0, -1, 0, 1, 0} | ±{1, 0, 1, 0, 1, 0, -1, 0, -1, 0, -1, 0, 1, 0, -1, 0, -1, 0, 1, 0, -1} |
| | | ±{0, 1, 0, 1, 0, 1, 0, -1, 0, 1, 0, -1, 0, -1, 0, 1} | ±{0, -1, 0, -1, 0, 1, 0, -1, 0} |
| | | ±{1, 0, -1, 0, -1, 0, 1, 0, -1, 0, 1, 0, 1, 0, 1, 0} | ±{0, 1, 0, 1, 0, 1, 0, -1, 0, -1, 0, -1, 0, -1, 0, -1, 0, -1, 0, 1, 0, -1} |
| | | ±{0, 1, 0, -1, 0, -1, 0, 1, 0, -1, 0, 1, 0, 1, 0, 1} | ±{-1, 0, 1, 0, -1, 0, -1, 0, -1, 0, 1, 0, -1, 0, -1, 0, 1, 0, -1, 0, -1, 0, 1, 0} |
| | | | ±{0, -1, 0, -1, 0, 1, 0, 1, 0, 1, 0} |

TABLE 18-continued

|  |  | ±{0, −1, 0, 1, 0, −1, 0, −1, 0, −1, 0, 1, 0, −1, 0, −1, 0, 1, 0, −1, 0, −1, 0, −1, 0, −1, 0, 1, 0, 1, 0, 1} |
|---|---|---|
| PAPR [dB] | 2.2011 | 2.3226 |

A sequence for a 0.8 us symbol subjected/applied to a symbol reduction scheme and a sequence for a 0.4 us symbol subjected/applied to a symbol reduction scheme according to method 1 may be proposed as follows.

The sequence for the 0.8 us symbol according to the bandwidth is as follows.

−2.5 MHz

±{1,0,0,0,1,0,0,0}, ±{0,1,0,0,0,1,0,0}, ±{0,0,1,0,0,0,1,0}, ±{0,0,0,1,0,0,0,1},

±{1,0,0,0,−1,0,0,0}, ±{0,1,0,0,0,−1,0,0}, ±{0,0,1,0,0,0,−1,0}, or ±{0,0,0,1,0,0,0,−1}

−4 MHz

±{1,0,0,0,1,0,0,0,1,0,0,0,−1}, ±{−1,0,0,0,1,0,0,0,1,0,0,0,1},

±{0,1,0,0,0,1,0,0,0,−1,0,0,0}, ±{0,0,1,0,0,0,1,0,0,0,−1,0,0}, ±{0,0,0,1,0,0,0,1,0,0,0,−1,0},

±{0,−1,0,0,0,1,0,0,0,1,0,0,0}, ±{0,0,−1,0,0,0,1,0,0,0,1,0,0}, or ±{0,0,0,−1,0,0,0,1,0,0,0,1,0}

−5 MHz

±{1,0,0,0,1,0,0,0,1,0,0,0,−1,0,0,0}, ±{0,1,0,0,0,1,0,0,0,1,0,0,0,−1,0,0}, ±{0,0,1,0,0,0,1,0,0,0,1,0,0,0,−1,0}, ±{0,0,0,1,0,0,0,1,0,0,0,1,0,0,0,−1},

±{−1,0,0,0,1,0,0,0,1,0,0,0,1,0,0,0}, ±{0,−1,0,0,0,1,0,0,0,1,0,0,0,1,0,0}, ±{0,0,−1,0,0,0,1,0,0,0,1,0,0,0,1,0}, or ±{0,0,0,−1,0,0,0,1,0,0,0,1,0,0,0,1}

−10 MHz

±{1,0,0,0,1,0,0,0,1,0,0,0,−1,0,0,0,1,0,0,0,−1,0,0,0,−1,0,0,0},

±{0,1,0,0,0,1,0,0,0,1,0,0,0,−1,0,0,0,1,0,0,0,−1,0,0,0,−1,0,0},

±{0,0,1,0,0,0,1,0,0,0,1,0,0,0,−1,0,0,0,1,0,0,0,−1,0,0,0,−1,0},

±{0,0,0,1,0,0,0,1,0,0,0,1,0,0,0,−1,0,0,0,1,0,0,0,−1,0,0,0,−1},

±{1,0,0,0,−1,0,0,0,−1,0,0,0,1,0,0,0,−1,0,0,0,1,0,0,0,1,0,0,0},

±{0,1,0,0,0,−1,0,0,0,−1,0,0,0,1,0,0,0,−1,0,0,0,1,0,0,0,1,0,0},

±{0,0,1,0,0,0,−1,0,0,0,−1,0,0,0,1,0,0,0,−1,0,0,0,1,0,0,0,1,0}, or

±{0,0,0,1,0,0,0,−1,0,0,0,−1,0,0,0,1,0,0,0,−1,0,0,0,1,0,0,0,1}

−20 MHz

±{1,0,0,0,1,0,0,0,1,0,0,0−1,0,0,0,−1,0,0,0,−1,0,0,0,−1,0, 0,0,1,0,0,0,−1,0,0,0,−1,0,0,0,1,0,0,0,−1,0,0,0,−1,0,0,0,−1,0, 0,0,1,0,0,0,−1,0,0,0},

±{0,1,0,0,0,1,0,0,0,1,0,0,0−1,0,0,0,−1,0,0,0,−1,0,0,0,−1, 0,0,0,1,0,0,0,−1,0,0,0,−1,0,0,0,1,0,0,0,−1,0,0,0,−1,0,0,0,−1, 0,0,0,1,0,0,0,−1,0,0},

±{0,0,1,0,0,0,1,0,0,0,1,0,0,0−1,0,0,0,−1,0,0,0,−1,0,0,0,− 1,0,0,0,1,0,0,0,−1,0,0,0,−1,0,0,0,1,0,0,0,−1,0,0,0,−1,0,0,0,−1,0,0,0,1,0,0,0,−1,0},

±{0,0,0,1,0,0,0,1,0,0,0,1,0,0,0−1,0,0,0,−1,0,0,0,−1,0,0, 0,−1,0,0,0,1,0,0,0,−1,0,0,0,−1,0,0,0,1,0,0,0,−1,0,0,0,−1,0,0, 0,−1,0,0,0,1,0,0,0,−1},

±{−1,0,0,0,1,0,0,0,−1,0,0,0,−1,0,0,0,−1,0,0,0,1,0,0,0,−1, 0,0,0,−1,0,0,0,1,0,0,0,−1,0,0,0,−1,0,0,0,−1,0,0,0,−1,0,0,0,1, 0,0,0,1,0,0,0,1,0,0,0,0},

±{0,−1,0,0,0,1,0,0,0,−1,0,0,0,−1,0,0,0,−1,0,0,0,1,0,0,0,− 1,0,0,0,−1,0,0,0,1,0,0,0,−1,0,0,0,−1,0,0,0,−1,0,0,0,−1,0,0,0, 1,0,0,0,1,0,0,0,1,0,0},

±{0,0,−1,0,0,0,1,0,0,0,−1,0,0,0,−1,0,0,0,−1,0,0,0,1,0,0, 0,−1,0,0,0,−1,0,0,0,1,0,0,0,−1,0,0,0,−1,0,0,0,−1,0,0,0,−1,0, 0,0,1,0,0,0,1,0,0,0,1,0}, or

±{0,0,0,−1,0,0,0,1,0,0,0,−1,0,0,0,−1,0,0,0,−1,0,0,0,1,0, 0,0,−1,0,0,0,−1,0,0,0,1,0,0,0,−1,0,0,0,−1,0,0,0,−1,0,0,0,−1, 0,0,0,1,0,0,0,1,0,0,0,1}

The sequence for the 0.4 us symbol according to the bandwidth is as follow.

−4 MHz

±{1,0,0,0,0,0,0,0,1,0,0,0,0}, ±{0,1,0,0,0,0,0,0,0,1,0,0,0}, ±{0,0,1,0,0,0,0,0,0,0,1,0,0}, ±{0,0,0,1,0,0,0,0,0,0,0,1,0}, ±{0,0,0,0,1,0,0,0,0,0,0,0,1},

±{1,0,0,0,0,0,0,0,−1,0,0,0,0}, ±{0,1,0,0,0,0,0,0,0,−1,0,0,0}, ±{0,0,1,0,0,0,0,0,0,0,−1,0,0}, ±{0,0,0,1,0,0,0,0,0,0,0,−1,0}, or ±{0,0,0,0,1,0,0,0,0,0,0,0,−1}

−5 MHz

±{1,0,0,0,0,0,0,0,1,0,0,0,0,0,0}, ±{0,1,0,0,0,0,0,0,0,1,0,0,0,0,0,0}, ±{0,0,1,0,0,0,0,0,0,0,1,0,0,0,0,0}, ±{0,0,0,1,0,0,0,0,0,0,0,1,0,0,0,0}, ±{0,0,0,0,1,0,0,0,0,0,0,0,1,0,0,0}, ±{0,0,0,0,0,1,0,0,0,0,0,0,0,1,0,0}, ±{0,0,0,0,0,0,1,0,0,0,0,0,0,0,1,0}, ±{0,0,0,0,0,0,0,1,0,0,0,0,0,0,0,1}

±{1,0,0,0,0,0,0,0,−1,0,0,0,0,0,0,0}, ±{0,1,0,0,0,0,0,0,0,−1,0,0,0,0,0,0}, ±{0,0,1,0,0,0,0,0,0,0,−1,0,0,0,0,0}, ±{0,0,0,1,0,0,0,0,0,0,0,−1,0,0,0,0}, ±{0,0,0,0,1,0,0,0,0,0,0,0,−1,0,0,0}, ±{0,0,0,0,0,1,0,0,0,0,0,0,0,−1,0,0}, ±{0,0,0,0,0,0,1,0,0,0,0,0,0,0,−1,0}, or ±{0,0,0,0,0,0,0,1,0,0,0,0,0,0,0,−1}

−10 MHz

±{1,0,0,0,0,0,0,0,1,0,0,0,0,0,0,0,1,0,0,0,0,0,0,0,−1,0,0,0, 0,0,0,0},

±{0,1,0,0,0,0,0,0,0,1,0,0,0,0,0,0,0,1,0,0,0,0,0,0,0,−1,0,0, 0,0,0,0},

±{0,0,1,0,0,0,0,0,0,0,1,0,0,0,0,0,0,0,1,0,0,0,0,0,0,0,−1,0, 0,0,0,0},

±{0,0,0,1,0,0,0,0,0,0,0,1,0,0,0,0,0,0,0,1,0,0,0,0,0,0,0,−1, 0,0,0,0},

±{0,0,0,0,1,0,0,0,0,0,0,0,1,0,0,0,0,0,0,0,1,0,0,0,0,0,0,0,− 1,0,0,0},

±{0,0,0,0,0,1,0,0,0,0,0,0,0,1,0,0,0,0,0,0,0,1,0,0,0,0,0,0,0, 0,−1,0,0},

±{0,0,0,0,0,0,1,0,0,0,0,0,0,0,1,0,0,0,0,0,0,0,1,0,0,0,0,0,0, 0,−1,0},

±{0,0,0,0,0,0,0,1,0,0,0,0,0,0,0,1,0,0,0,0,0,0,0,1,0,0,0,0,0, 0,0,−1},

±{−1,0,0,0,0,0,0,0,1,0,0,0,0,0,0,0,1,0,0,0,0,0,0,0,1,0,0,0, 0,0,0,0},

±{0,−1,0,0,0,0,0,0,0,1,0,0,0,0,0,0,0,1,0,0,0,0,0,0,0,1,0,0, 0,0,0,0},

±{0,0,−1,0,0,0,0,0,0,0,1,0,0,0,0,0,0,0,1,0,0,0,0,0,0,0,1,0, 0,0,0,0},

±{0,0,0,−1,0,0,0,0,0,0,0,1,0,0,0,0,0,0,0,1,0,0,0,0,0,0,0,1, 0,0,0,0},

±{0,0,0,0,−1,0,0,0,0,0,0,0,1,0,0,0,0,0,0,0,1,0,0,0,0,0,0,0, 1,0,0,0},

±{0,0,0,0,0,−1,0,0,0,0,0,0,0,1,0,0,0,0,0,0,0,1,0,0,0,0,0,0, 0,1,0,0,0},

±{0,0,0,0,0,0,-1,0,0,0,0,0,0,0,1,0,0,0,0,0,0,0,0,1,0,0,0,0,0, 0,0,1,0}, or
±{0,0,0,0,0,0,0,-1,0,0,0,0,0,0,0,0,1,0,0,0,0,0,0,0,0,1,0,0,0,0, 0,0,0,1}
 −20 MHz
±{1,0,0,0,0,0,0,0,1,0,0,0,0,0,0,0,0,1,0,0,0,0,0,0,0,0,-1,0,0,0, 0,0,0,0,1,0,0,0,0,0,0,0,0,-1,0,0,0,0,0,0,0,0,-1,0,0,0,0,0,0,0,0,1,0, 0,0,0,0,0,0},
±{0,1,0,0,0,0,0,0,0,1,0,0,0,0,0,0,0,0,1,0,0,0,0,0,0,0,0,-1,0,0, 0,0,0,0,0,1,0,0,0,0,0,0,0,0,-1,0,0,0,0,0,0,0,0,-1,0,0,0,0,0,0,0,0,1, 0,0,0,0,0,0},
±{0,0,1,0,0,0,0,0,0,0,1,0,0,0,0,0,0,0,0,1,0,0,0,0,0,0,0,0,-1,0, 0,0,0,0,0,0,1,0,0,0,0,0,0,0,0,-1,0,0,0,0,0,0,0,0,-1,0,0,0,0,0,0,0,0, 1,0,0,0,0,0},
±{0,0,0,1,0,0,0,0,0,0,0,1,0,0,0,0,0,0,0,0,1,0,0,0,0,0,0,0,0,-1, 0,0,0,0,0,0,0,1,0,0,0,0,0,0,0,0,-1,0,0,0,0,0,0,0,0,-1,0,0,0,0,0,0,0,0, 0,1,0,0,0,0},
±{0,0,0,0,1,0,0,0,0,0,0,0,1,0,0,0,0,0,0,0,0,1,0,0,0,0,0,0,0,0,- 1,0,0,0,0,0,0,0,1,0,0,0,0,0,0,0,0,-1,0,0,0,0,0,0,0,0,-1,0,0,0,0,0,0,0, 0,0,1,0,0,0},
±{0,0,0,0,0,1,0,0,0,0,0,0,0,1,0,0,0,0,0,0,0,0,1,0,0,0,0,0,0,0, 0,-1,0,0,0,0,0,0,0,1,0,0,0,0,0,0,0,0,-1,0,0,0,0,0,0,0,0,-1,0,0,0,0, 0,0,0,1,0,0},
±{0,0,0,0,0,0,1,0,0,0,0,0,0,0,1,0,0,0,0,0,0,0,0,1,0,0,0,0,0,0, 0,-1,0,0,0,0,0,0,0,1,0,0,0,0,0,0,0,0,-1,0,0,0,0,0,0,0,0,-1,0,0,0,0, 0,0,0,1,0},
±{0,0,0,0,0,0,0,1,0,0,0,0,0,0,0,1,0,0,0,0,0,0,0,0,1,0,0,0,0,0, 0,0,-1,0,0,0,0,0,0,0,1,0,0,0,0,0,0,0,0,-1,0,0,0,0,0,0,0,0,-1,0,0,0, 0,0,0,0,1},
±{1,0,0,0,0,0,0,0,-1,0,0,0,0,0,0,0,-1,0,0,0,0,0,0,0,1,0,0, 0,0,0,0,0,-1,0,0,0,0,0,0,0,1,0,0,0,0,0,0,0,1,0,0,0,0,0,0,0,1,0, 0,0,0,0,0,0},
±{0,1,0,0,0,0,0,0,0,-1,0,0,0,0,0,0,0,-1,0,0,0,0,0,0,0,1,0, 0,0,0,0,0,0,-1,0,0,0,0,0,0,0,1,0,0,0,0,0,0,0,1,0,0,0,0,0,0,0,1, 0,0,0,0,0,0},
±{0,0,1,0,0,0,0,0,0,0,-1,0,0,0,0,0,0,0,-1,0,0,0,0,0,0,0,1, 0,0,0,0,0,0,0,-1,0,0,0,0,0,0,0,1,0,0,0,0,0,0,0,1,0,0,0,0,0,0,0, 1,0,0,0,0,0},

±{0,0,0,1,0,0,0,0,0,0,0,-1,0,0,0,0,0,0,0,-1,0,0,0,0,0,0,0, 1,0,0,0,0,0,0,0,-1,0,0,0,0,0,0,0,1,0,0,0,0,0,0,0,1,0,0,0,0,0,0, 0,1,0,0,0,0},
±{0,0,0,0,1,0,0,0,0,0,0,0,-1,0,0,0,0,0,0,0,-1,0,0,0,0,0,0, 0,1,0,0,0,0,0,0,0,-1,0,0,0,0,0,0,0,1,0,0,0,0,0,0,0,1,0,0,0,0,0, 0,0,1,0,0,0},
±{0,0,0,0,0,1,0,0,0,0,0,0,0,-1,0,0,0,0,0,0,0,-1,0,0,0,0,0, 0,0,1,0,0,0,0,0,0,0,-1,0,0,0,0,0,0,0,1,0,0,0,0,0,0,0,1,0,0,0,0, 0,0,0,1,0,0},
±{0,0,0,0,0,0,1,0,0,0,0,0,0,0,-1,0,0,0,0,0,0,0,-1,0,0,0,0, 0,0,0,1,0,0,0,0,0,0,0,-1,0,0,0,0,0,0,0,1,0,0,0,0,0,0,0,1,0,0,0, 0,0,0,0,1,0}, or
±{0,0,0,0,0,0,0,1,0,0,0,0,0,0,0,-1,0,0,0,0,0,0,0,-1,0,0,0, 0,0,0,0,1,0,0,0,0,0,0,0,-1,0,0,0,0,0,0,0,1,0,0,0,0,0,0,0,1,0,0, 0,0,0,0,0,1}

<Method 2: Given Sequence+Insertion of Optimal Coefficient of 1>

A transmission device fixes a first coefficient to 1 or 01 and then determines a second coefficient with a low PAPR. Subsequently, the transmission device determines a third coefficient with a low PAPR and configures a sequence by repeating this process.

The transmission device may obtain a mother sequence having a total length of 64 and may adopt a sequence with a required length from the front of the mother sequence. In Manchester coding, a sequence with a desired length is selected and 0s are inserted at intervals therein. The mother sequence is illustrated below.

±{1,1,-1,1,-1,-1,-1,1,1,-1,1,1,1,1,-1,-1,1,1,1,-1,1,- 1,-1,-1,1,-1,1,-1,-1,1,-1,1,1,1,1,1,1,-1,-1,1,1,1,-1,-1,1,1,1,1, 1,-1,-1,-1,-1,1,-1,1,1,-1,-1,1,1,1,-1,1,-1}

Also, a sequence according to the bandwidth and a corresponding PAPR in method 2 may be proposed as in the following table. Each sequence may be reversed in order. For example, a sequence subjected/applied to simple 2.5 MHz OOK may be ±{1,1,-1,1,-1,-1,-1,1} or may be the reverse thereof, which is ±1,-1,-1,-1,1,-1,1,11.

TABLE 19

| BW [MHz] | | 2.5 | 4 |
|---|---|---|---|
| Simple OOK | # Sub. | 8 | 13 |
| | Sequence | ±{1, 1, -1, 1, -1, -1, -1, 1} | ±{1, 1, -1, 1, -1, -1, -1, 1, 1, -1, 1, 1, 1} |
| | PAPR [dB] | 3.0103 | 3.8793 |
| OOK w/ Manchester coding Or symbol reduction (1.6 us) | # Sub. | 4 | 6 | 7 |
| | Sequence | ±{1, 0, 1, 0, -1, 0, 1, 0} ±{0, 1, 0, 1, 0, -1, 0, 1} | ±{0, 1, 0, 1, 0, -1, 0, 1, 0, -1, 0} | ±{1, 0, 1, 0, -1, 0, 1, 0, -1, 0, -1, 0, -1} |
| | PAPR [dB] | 2.4763 | 3.1183 | 3.2956 |

TABLE 20

| BW [MHz] | | 5 | 10 |
|---|---|---|---|
| Simple OOK | # Sub. | 16 | 32 |
| | Sequence | ±{1, 1, -1, 1, -1, -1, -1, 1, 1, -1, 1, 1, 1, 1, -1, -1} | ±{1, 1, -1, 1, -1, -1, -1, 1, 1, -1, 1, 1, 1, 1, -1, -1, 1, 1, 1, -1, 1, -1, -1, -1, 1, -1, 1, -1, -1, 1, -1, 1} |
| | PAPR [dB] | 4.6511 | 4.4597 |
| OOK w/ Manchester coding Or symbol reduction (1.6 us) | # Sub. | 8 | 16 |
| | Sequence | ±{1, 0, 1, 0, -1, 0, 1, 0, -1, 0, -1, 0, -1, 0, 1, 0} ±{0, 1, 0, 1, 0, -1, 0, 1, 0, -1, 0, -1, 0, -1, 0, 1} | ±{1, 0, 1, 0, -1, 0, 1, 0, -1, 0, -1, 0, -1, 0, 1, 0, 1, 0, 1, 0, 1, 0, -1, 0, 1, 0, 1, 0, 1, 0, -1, 0} ±{0, 1, 0, 1, 0, -1, 0, 1, 0, -1, 0, -1, 0, -1, 0, 1, 0, 1, 0, 1, 0, 1, 0, -1, 0, 1, 0, 1, 0, 1, 0, -1} |
| | PAPR [dB] | 3.0103 | 4.6511 |

TABLE 21

| BW [MHz] | | 20 |
|---|---|---|
| Simple OOK | # Sub. | 64 |
| | Sequence | ±{1, 1, -1, 1, -1, -1, -1, 1, 1, -1, 1, 1, 1, 1, -1, -1, 1, 1, 1, -1, 1, -1, -1, -1, 1, -1, 1, -1, -1, 1, -1, 1, 1, 1, 1, 1, 1, -1, 1, 1, 1, -1, -1, 1, 1, 1, -1, -1, 1, 1, 1, -1, -1, -1, -1, 1, -1, 1, 1, -1, 1, 1, -1, 1, -1} |
| | PAPR [dB] | 4.4137 |
| OOK w/ Manchester coding Or symbol reduction (1.6 us) | # Sub. | 32 |
| | Sequence | ±{1, 0, 1, 0, -1, 0, 1, 0, -1, 0, -1, 0, -1, 0, 1, 0, 1, 0, -1, 0, 1, 0, 1, 0, 1, 0, 1, 0, -1, 0, -1, 0, 1, 0, 1, 0, 1, 0, 1, 0, -1, 0, 1, 0, -1, 0, -1, 0, 1, 0, -1, 0, 1, 0, -1, 0, 1, 0, -1, 0, -1, 0, 1, 0} |
| | | ±{0, 1, 0, 1, 0, -1, 0, 1, 0, -1, 0, -1, 0, -1, 0, 1, 0, 1, 0, -1, 0, 1, 0, 1, 0, 1, 0, 1, 0, -1, 0, -1, 0, 1, 0, 1, 0, 1, 0, 1, 0, -1, 0, -1, 0, 1, 0, -1, 0, -1, 0, 1, 0, -1, 0, 1, 0, -1, 0, 1, 0, -1, 0, 1} |
| | PAPR [dB] | 4.2622 |

A sequence for a 0.8 us symbol subjected/applied to a symbol reduction scheme and a sequence for a 0.4 us symbol subjected/applied to a symbol reduction scheme according to method 2 may be proposed as follows.

The sequence for the 0.8 us symbol according to the bandwidth is as follows.

−2.5 MHz

±{1,0,0,0,1,0,0,0}, ±{0,1,0,0,0,1,0,0}, ±{0,0,1,0,0,0,1,0}, or ±{0,0,0,1,0,0,0,1}

−4 MHz

±{1,0,0,0,1,0,0,0,−1,0,0,0,1}, ±{1,0,0,0,−1,0,0,0,1,0,0,0,1},

±{0,1,0,0,0,1,0,0,0,−1,0,0,0}, ±{0,0,1,0,0,0,1,0,0,0,−1,0,0}, ±{0,0,0,1,0,0,0,1,0,0,0,−1,0},

±{0,−1,0,0,0,1,0,0,0,1,0,0,0}, ±{0,0,−1,0,0,0,1,0,0,0,1,0,0}, or ±{0,0,0,−1,0,0,0,1,0,0,0,1,0}

−5 MHz

±{1,0,0,0,1,0,0,0,−1,0,0,0,1,0,0,0}, ±{0,1,0,0,0,1,0,0,0,−1,0,0,0,1,0,0}, ±{0,0,1,0,0,0,1,0,0,0,−1,0,0,0,1,0}, ±{0,0,0,1,0,0,0,1,0,0,0,−1,0,0,0,1},

±{1,0,0,0,−1,0,0,0,1,0,0,0,1,0,0,0}, ±{0,1,0,0,0,−1,0,0,0,1,0,0,0,1,0,0}, ±{0,0,1,0,0,0,−1,0,0,0,1,0,0,0,1,0}, or ±{0,0,0,1,0,0,0,−1,0,0,0,1,0,0,0,1}

−10 MHz

±{1,0,0,0,1,0,0,0,−1,0,0,0,1,0,0,0,−1,0,0,0,−1,0,0,0,−1,0,0,1,0,0,0},

±{0,1,0,0,0,1,0,0,0,−1,0,0,0,1,0,0,0,−1,0,0,0,−1,0,0,0,−1,0,0,0,1,0,0},

±{0,0,1,0,0,0,1,0,0,0,−1,0,0,0,1,0,0,0,−1,0,0,0,−1,0,0,0,−1,0,0,0,1,0},

±{0,0,0,1,0,0,0,1,0,0,0,−1,0,0,0,1,0,0,0,−1,0,0,0,−1,0,0,0,−1,0,0,0,1},

±{1,0,0,0,−1,0,0,0,−1,0,0,0,−1,0,0,0,1,0,0,0,−1,0,0,0,1,0,0,0,1,0,0,0},

±{0,1,0,0,0,−1,0,0,0,−1,0,0,0,−1,0,0,0,1,0,0,0,−1,0,0,0,1,0,0,0,1,0,0},

±{0,0,1,0,0,0,−1,0,0,0,−1,0,0,0,−1,0,0,0,1,0,0,0,−1,0,0,0,1,0,0,0,1,0}, or

±{0,0,0,1,0,0,0,−1,0,0,0,−1,0,0,0,−1,0,0,0,1,0,0,0,−1,0,0,0,1,0,0,0,1}

−20 MHz

±{1,0,0,0,1,0,0,0,−1,0,0,0, 1,0,0,0,−1,0,0,0,−1,0,0,0,−1,0,0, 1,0,0,0, 1,0,0,0,−1,0,0,0,1,0,0,0,1,0,0,0,1,0,0,0,−1,0,0,0,−1,0,0,0},

±{0,1,0,0,0,1,0,0,0,−1,0,0,0,1,0,0,0,−1,0,0,0,−1,0,0,0,−1,0,0,0,1,0,0,0,1,0,0,0,−1,0,0,0,1,0,0,0,1,0,0,0,1,0,0,0,−1,0,0,0,−1,0,0},

±{0,0,1,0,0,0,1,0,0,0,−1,0,0,0,1,0,0,0,−1,0,0,0,−1,0,0,0,−1,0,0,0,1,0,0,0,1,0,0,0,−1,0,0,0,1,0,0,0,1,0,0,0,1,0,0,0,−1,0,0,0,−1,0},

±{0,0,0,1,0,0,0,1,0,0,0,−1,0,0,0,1,0,0,0,−1,0,0,0,−1,0,0,0,−1,0,0,0,1,0,0,0,1,0,0,0,−1,0,0,0,1,0,0,0,1,0,0,0,1,0,0,0,−1,0,0,0,−1},

±{−1,0,0,0,−1,0,0,0,1,0,0,0,1,0,0,0,1,0,0,0,1,0,0,0,−1,0,0,0,0,1,0,0,0,1,0,0,0,−1,0,0,0,−1,0,0,0,−1,0,0,0,1,0,0,0,−1,0,0,0,1,0,0,0,0,1,0,0,0,1,0,0,0},

±{0,−1,0,0,0,−1,0,0,0,1,0,0,0,1,0,0,0,1,0,0,0,1,0,0,0,−1,0,0,0,−1,0,0,0,−1,0,0,0,1,0,0,0,−1,0,0,0,−1,0,0,0,1,0,0,0},

The sequence for the 0.4 us symbol according to the bandwidth is as follows.

−4 MHz

±{1,0,0,0,0,0,0,1,0,0,0,0}, ±{0,1,0,0,0,0,0,0,0,1,0,0,0}, ±{0,0,1,0,0,0,0,0,0,0,1,0,0}, ±{0,0,0,1,0,0,0,0,0,0,0,1,0}, or ±{0,0,0,0,1,0,0,0,0,0,0,0,1}

−5 MHz

±{1,0,0,0,0,0,0,0,1,0,0,0,0,0,0,0}, ±{0,1,0,0,0,0,0,0,0,1,0,0,0,0,0,0}, ±{0,0,1,0,0,0,0,0,0,0,1,0,0,0,0,0}, ±{0,0,0,1,0,0,0,0,0,0,0,1,0,0,0,0}, ±{0,0,0,0,1,0,0,0,0,0,0,0,1,0,0,0}, ±{0,0,0,0,0,1,0,0,0,0,0,0,0,1,0,0}, ±{0,0,0,0,0,0,1,0,0,0,0,0,0,0,1,0}, or ±{0,0,0,0,0,0,0,1,0,0,0,0,0,0,0,1}

−10 MHz

±{1,0,0,0,0,0,0,1,0,0,0,0,0,0,0,−1,0,0,0,0,0,0,0,1,0,0,0,0,0,0,0},

±{0,1,0,0,0,0,0,0,0,1,0,0,0,0,0,0,−1,0,0,0,0,0,0,0,1,0,0,0,0,0,0},

±{0,0,1,0,0,0,0,0,0,0,1,0,0,0,0,0,0,−1,0,0,0,0,0,0,0,1,0,0,0,0,0,0},

±{0,0,0,1,0,0,0,0,0,0,0,1,0,0,0,0,0,0,−1,0,0,0,0,0,0,0,1,0,0,0,0},

±{0,0,0,0,1,0,0,0,0,0,0,0,1,0,0,0,0,0,0,−1,0,0,0,0,0,0,0,1,0,0,0,0},

±{0,0,0,0,0,1,0,0,0,0,0,0,0,1,0,0,0,0,0,0,−1,0,0,0,0,0,0,0,1,0,0,0},

±{0,0,0,0,0,0,1,0,0,0,0,0,0,0,1,0,0,0,0,0,0,−1,0,0,0,0,0,0,0,1,0,0},

±{0,0,0,0,0,0,0,1,0,0,0,0,0,0,0,1,0,0,0,0,0,0,−1,0,0,0,0,0,0,0,1,0},

±{1,0,0,0,0,0,0,0,−1,0,0,0,0,0,0,0,1,0,0,0,0,0,0,0,1,0,0,0,0,0,0,0},

±{0,1,0,0,0,0,0,0,0,−1,0,0,0,0,0,0,0,1,0,0,0,0,0,0,0,1,0,0,0,0,0,0},

±{0,0,1,0,0,0,0,0,0,0,−1,0,0,0,0,0,0,0,1,0,0,0,0,0,0,0,1,0,0,0,0,0,0},

±{0,0,0,1,0,0,0,0,0,0,0,−1,0,0,0,0,0,0,0,0,1,0,0,0,0,0,0,0,1, 0,0,0,0},

±{0,0,0,0,1,0,0,0,0,0,0,0,−1,0,0,0,0,0,0,0,0,1,0,0,0,0,0,0,0, 1,0,0,0},

±{0,0,0,0,0,1,0,0,0,0,0,0,0,−1,0,0,0,0,0,0,0,0,1,0,0,0,0,0,0, 0,1,0,0},

±{0,0,0,0,0,0,1,0,0,0,0,0,0,0,−1,0,0,0,0,0,0,0,0,1,0,0,0,0,0, 0,0,1,0}, or

±{0,0,0,0,0,0,0,1,0,0,0,0,0,0,0,−1,0,0,0,0,0,0,0,0,1,0,0,0,0, 0,0,0,1}

−20 MHz

±{1,0,0,0,0,0,0,0,1,0,0,0,0,0,0,0,−1,0,0,0,0,0,0,0,1,0,0,0, 0,0,0,0,−1,0,0,0,0,0,0,0,−1,0,0,0,0,0,0,0,−1,0,0,0,0,0,0,0,1, 0,0,0,0,0,0,0},

±{0,1,0,0,0,0,0,0,0,1,0,0,0,0,0,0,0,−1,0,0,0,0,0,0,0,1,0,0, 0,0,0,0,0,−1,0,0,0,0,0,0,0,−1,0,0,0,0,0,0,0,−1,0,0,0,0,0,0,0, 1,0,0,0,0,0,0},

±{0,0,1,0,0,0,0,0,0,0,1,0,0,0,0,0,0,0,−1,0,0,0,0,0,0,0,1,0, 0,0,0,0,0,0,−1,0,0,0,0,0,0,0,−1,0,0,0,0,0,0,0,−1,0,0,0,0,0,0, 0,1,0,0,0,0,0},

±{0,0,0,1,0,0,0,0,0,0,0,1,0,0,0,0,0,0,0,−1,0,0,0,0,0,0,0,1, 0,0,0,0,0,0,0,−1,0,0,0,0,0,0,0,−1,0,0,0,0,0,0,0,−1,0,0,0,0, 0,0,1,0,0,0,0},

±{0,0,0,0,1,0,0,0,0,0,0,0,1,0,0,0,0,0,0,0,−1,0,0,0,0,0,0,0,0, 1,0,0,0,0,0,0,0,−1,0,0,0,0,0,0,0,−1,0,0,0,0,0,0,0,−1,0,0,0,0, 0,0,0,1,0,0,0},

±{0,0,0,0,0,1,0,0,0,0,0,0,0,1,0,0,0,0,0,0,0,−1,0,0,0,0,0,0,0, 0,1,0,0,0,0,0,0,0,−1,0,0,0,0,0,0,0,−1,0,0,0,0,0,0,0,−1,0,0,0, 0,0,0,0,1,0,0},

±{0,0,0,0,0,0,1,0,0,0,0,0,0,0,1,0,0,0,0,0,0,0,−1,0,0,0,0,0, 0,0,0,1,0,0,0,0,0,0,0,−1,0,0,0,0,0,0,0,−1,0,0,0,0,0,0,0,−1,0, 0,0,0,0,0,0,1,0},

±{0,0,0,0,0,0,0,1,0,0,0,0,0,0,0,1,0,0,0,0,0,0,0,−1,0,0,0,0,0,0, 0,1,0,0,0,0,0,0,0,−1,0,0,0,0,0,0,0,−1,0,0,0,0,0,0,0,−1,0,0, 0,0,0,0,0,1,0},

±{0,0,0,0,0,0,0,0,1,0,0,0,0,0,0,0,1,0,0,0,0,0,0,0,−1,0,0,0,0, 0,1,0,0,0,0,0,0,0,−1,0,0,0,0,0,0,0,−1,0,0,0,0,0,0,0,−1,0,0,0,0,0, 0,0,0,1,0,0},

±{0,0,0,0,0,0,1,0,0,0,0,0,0,0,1,0,0,0,0,0,0,0,−1,0,0,0,0, 0,0,1,0,0,0,0,0,0,0,−1,0,0,0,0,0,0,0,−1,0,0,0,0,0,0,0,−1,0,0, 0,0,0,0,0,1,0},

±{0,0,0,0,0,0,1,0,0,0,0,0,0,0,1,0,0,0,0,0,0,0,−1,0,0,0,0,0, 0,0,1,0,0,0,0,0,0,0,−1,0,0,0,0,0,0,0,−1,0,0,0,0,0,0,0,−1,0,0, 0,0,0,0,0,1},

±{0,0,0,0,0,0,1,0,0,0,0,0,0,0,1,0,0,0,0,0,0,0,−1,0,0,0,0, 0,0,0,−1,0,0,0,0,0,0,0,0,1,0,0,0,0,0,0,0,−1,0,0,0,0,0,0,0,0,1,0,0,0, 0,0,0,1},

±{1,0,0,0,0,0,0,0,−1,0,0,0,0,0,0,0,−1,0,0,0,0,0,0,0,−1,0,0, 0,0,0,0,0,1,0,0,0,0,0,0,0,−1,0,0,0,0,0,0,0,1,0,0,0,0,0,0,0,1,0, 0,0,0,0,0,0},

±{0,1,0,0,0,0,0,0,0,−1,0,0,0,0,0,0,0,−1,0,0,0,0,0,0,0,−1,0, 0,0,0,0,0,0,1,0,0,0,0,0,0,0,−1,0,0,0,0,0,0,0,1,0,0,0,0,0,0,0,1, 0,0,0,0,0,0},

±{0,0,1,0,0,0,0,0,0,0,−1,0,0,0,0,0,0,0,0,−1,0,0,0,0,0,0,0,−1, 0,0,0,0,0,0,0,1,0,0,0,0,0,0,0,−1,0,0,0,0,0,0,0,1,0,0,0,0,0,0,0, 1,0,0,0,0,0},

The Golay sequence is {1,1,1,1,1,−1,1,−1,−1,−1,1,1,1,1,− 1,−1,1,1,1,−1,−1,1,−1,−1,−1,−1,−1,−1,1,1,−1,1,−1,1} or {−1,−1,−1,−1,−1,1,−1,1,1,1,1,−1,−1,−1,1,1,1,−1,1,1,1,1,− 1,−1,1,−1,−1,−1,−1,1,−1,1,−1,−1} when the length is 32. The Golay sequence is {−1,−1,1,−1,1,−1,−1,−1,1,1,1,−1,1,1,1,−1,− 1,−1,−1,1,1,−1,1,1,−1,−1,−1,−1,−1,1,1,1,−1,1,1,1,1,−1,−1,1,1,− 1,1,−1,−1,1,1,1,−1,1,1,1,1,−1,−1,−1,−1,1,1,1,1,1,1,1,−1, 1,1,−1,−1,−1} or {1,1,−1,1,−1,1,1,1,1,−1,−1,1,1,−1,−1,−1,1,1,1,1,1,1,1, 1,−1,1,1,−1,1,1,1,1,1,−1,1,1,−1,−1,−1,−1,−1,1,1,−1,1,1,−1,−1,−1,−1, 1,1,−1,1,1,1,−1,1,−1,−1,1,1,1,1,1,−1,−1,1,1,−1,−1,−1,−1,−1,1} when the length is 64.

In the method using the Golay sequence to minimize a PAPR, a sequence according to the bandwidth and a corresponding PAPR may be proposed as in the following table. Each sequence in the table may be reversed in order.

<Method 3: Reuse of Conventional Sequence>

A conventional sequence used in method 3 may be a Barker sequence or a Golay sequence (used in 802.11ad). The Barker sequence may be used for a short sequence length, and the Golay sequence may be used for a long sequence length.

The Barker sequence is {1,1,−1,1} or {1,1,1,−1} when the length is 4. The Barker sequence is {1,1,1,−1,−1,1,−1} when the length is 7. The Barker sequence is {1,1,1,1,1,−1,−1,1, 1,−1,1,−1,1} when the length is 13.

In the method using the Barker sequence to minimize a PAPR, a sequence according to the bandwidth and a corresponding PAPR may be proposed as in the following table. Each sequence in the table may be reversed in order.

TABLE 22

| BW [MHz] | | 2.5 | | 4 |
|---|---|---|---|---|
| Simple OOK | # Sub. | | | 13 |
| | Sequence | | | ±{1, 1, 1, 1, 1, −1, −1, 1, 1, −1, 1, −1, 1} |
| | PAPR [dB] | | | 2.8400 |
| OOK w/ Manchester coding Or symbol reduction (1.6 us) | # Sub. | 4 | 4 | 7 |
| | Sequence | ±{1, 0, 1, 0, −1, 0, 1, 0} ±{0, 1, 0, 1, 0, −1, 0, 1} | ±{1, 0, 1, 0, 1, 0, −1, 0} ±{0, −1, 0, 1, 0, 1, 0, 1} | ±{1, 0, 1, 0, 1, 0, −1, 0, −1, 0, 1, 0, −1} |
| | PAPR [dB] | 2.4763 | 2.4763 | 1.3846 |

TABLE 23

| BW [MHz] | | 10 |
|---|---|---|
| Simple OOK | # Sub. | 32 |
| | Sequence | ±{1, 1, 1, 1, 1, −1, 1, −1, −1, −1, 1, 1, 1, −1, −1, 1, 1, 1, −1, −1, 1, −1, −1, 1, −1, −1, −1, −1, 1, −1, 1, −1} |

TABLE 23-continued

±{−1, −1, −1, −1, −1, 1, −1, 1, 1, 1, −1, −1, −1, 1,
1, −1, 1, 1, −1, −1, 1, −1, −1, 1, −1, −1, −1, −1, 1, −1, 1, −1}

| | | |
|---|---|---|
| | PAPR [dB] | 3.0103 |
| OOK w/ Manchester coding Or symbol reduction (1.6 us) | # Sub. Sequence PAPR [dB] | |

TABLE 24

| | | |
|---|---|---|
| BW [MHz] | | 20 |
| Simple OOK | # Sub. | 64 |
| | Sequence | ±{−1, −1, 1, −1, 1, −1, −1, −1, 1, 1, −1, 1, 1, −1, −1, −1, −1, 1, −1, 1, −1, −1, −1, −1, −1, 1, −1, −1, 1, 1, 1, −1, −1, 1, −1, 1, −1, −1, −1, 1, 1, −1, 1, 1, −1, −1, −1, 1, 1, −1, 1, −1, 1, 1, 1, 1, 1, −1, 1, 1, −1, −1, −1}/ ±{1, 1, −1, 1, −1, 1, 1, 1, −1, −1, 1, −1, −1, 1, 1, 1, 1, 1, −1, 1, −1, 1, 1, 1, 1, −1, 1, 1, 1, −1, −1, −1, −1, −1, 1, −1, 1, −1, −1, −1, 1, 1, −1, 1, 1, −1, −1, −1, 1, 1, −1, 1, 1, 1, 1, 1, −1, 1, 1, −1, −1, −1} |
| | PAPR [dB] | 3.0002/2.9589 |
| OOK w/ Manchester coding Or symbol reduction (1.6 us) | # Sub. Sequence | 32 ±{1, 0, 1, 0, 1, 0, 1, 0, 1, 0, −1, 0, 1, 0, −1, 0, −1, 0, −1, 0, 1, 0, 1, 0, 1, 0, −1, 0, −1, 0, 1, 0, 1, 0, 1, 0, −1, 0, −1, 0, 1, 0, −1, 0, −1, 0, 1, 0, −1, 0, −1, 0, −1, 0, −1, 0, 1, 0, −1, 0, 1, 0, −1, 0} ±{0, 1, 0, 1, 0, 1, 0, 1, 0, 1, 0, −1, 0, 1, 0, −1, 0, −1, 0, −1, 0, 1, 0, 1, 0, 1, 0, −1, 0, −1, 0, 1, 0, 1, 0, −1, 0, −1, 0, 1, 0, 1, 0, 1, 0, −1, 0, −1, 0, 1, 0, −1, 0, −1, 0, 1, 0, −1, 0, 1, 0, −1} ±{−1, 0, −1, 0, −1, 0, −1, 0, −1, 0, 1, 0, −1, 0, 1, 0, 1, 0, 1, 0, −1, 0, −1, 0, −1, 0, 1, 0, 1, 0, −1, 0, −1, 0, −1, 0, 1, 0, 1, 0, −1, 0, 1, 0, 1, 0, −1, 0, 1, 0, 1, 0, 1, 0, 1, 0, −1, 0, 1, 0, −1, 0, 1, 0} ±{0, −1, 0, −1, 0, −1, 0, −1, 0, −1, 0, 1, 0, −1, 0, 1, 0, 1, 0, −1, 0, −1, 0, 1, 0, 1, 0, 1, 0, −1, 0, −1, 0, 1, 0, 1, 0, −1, 0, −1, 0, 1, 0, −1, 0, −1, 0, 1, 0, 1, 0, −1, 0, −1, 0, 1, 0, 1, 0, −1, 0, 1, 0, −1} |
| | PAPR [dB] | 3.0103 |

A sequence for a 0.8 us symbol subjected/applied to a symbol reduction scheme and a sequence for a 0.4 us symbol subjected/applied to a symbol reduction scheme according to method 3 may be proposed as follows.

The sequence for the 0.8 us symbol according to the bandwidth is as follows.

−4 MHz

±{1,0,0,0,1,0,0,0,−1,0,0,0,1}, −±{1,0,0,0,−1,0,0,0,1,0,0,0,1},

−±{1,0,0,0,1,0,0,0,1,0,0,0,−1}, or −±{−1,0,0,0,1,0,0,0,1,0,0,0,1}

−5 MHz

±{1,0,0,0,1,0,0,0,−1,0,0,0,1,0,0,0}, ±{0,1,0,0,0,1,0,0,0,−1,0,0,0,1,0,0}, ±{0,0,1,0,0,0,1,0,0,0,−1,0,0,0,1,0}, ±{0,0,0,1,0,0,0,1,0,0,0,−1,0,0,0,1},

±{1,0,0,0,−1,0,0,0,1,0,0,0,1,0,0,0}, ±{0,1,0,0,0,−1,0,0,0,1,0,0,0,1,0,0}, ±{0,0,1,0,0,0,−1,0,0,0,1,0,0,0,1,0}, ±{0,0,0,1,0,0,0,−1,0,0,0,1,0,0,0,1},

±{1,0,0,0,1,0,0,0,1,0,0,0,−1,0,0,0}, ±{0,1,0,0,0,1,0,0,0,1,0,0,0,−1,0,0}, ±{0,0,1,0,0,0,1,0,0,0,1,0,0,0,−1,0}, ±{0,0,0,1,0,0,0,1,0,0,0,1,0,0,0,−1},

±{−1,0,0,0,1,0,0,0,1,0,0,0,1,0,0,0}, ±{0,−1,0,0,0,1,0,0,0,1,0,0,0,1,0,0}, ±{0,0,−1,0,0,0,1,0,0,0,1,0,0,0,1,0}, or ±{0,0,0,−1,0,0,0,1,0,0,0,1,0,0,0,1}

The sequence for the 0.4 us symbol according to the bandwidth is as follows.

−10 MHz

±{1,0,0,0,0,0,0,0,1,0,0,0,0,0,0,0,−1,0,0,0,0,0,0,0,1,0,0,0, 0,0,0,0},

±{0,1,0,0,0,0,0,0,0,1,0,0,0,0,0,0,0,−1,0,0,0,0,0,0,0,1,0,0, 0,0,0,0},

±{0,0,1,0,0,0,0,0,0,0,1,0,0,0,0,0,0,0,−1,0,0,0,0,0,0,0,1,0, 0,0,0,0},

±{0,0,0,1,0,0,0,0,0,0,0,1,0,0,0,0,0,0,0,−1,0,0,0,0,0,0,0,1, 0,0,0,0},

±{0,0,0,0,1,0,0,0,0,0,0,0,1,0,0,0,0,0,0,0,−1,0,0,0,0,0,0,0, 1,0,0,0},

±{0,0,0,0,0,1,0,0,0,0,0,0,0,1,0,0,0,0,0,0,0,−1,0,0,0,0,0,0, 0,1,0,0},

±{0,0,0,0,0,0,1,0,0,0,0,0,0,0,1,0,0,0,0,0,0,0,−1,0,0,0,0,0, 0,0,1,0},

±{0,0,0,0,0,0,0,1,0,0,0,0,0,0,0,1,0,0,0,0,0,0,0,−1,0,0,0,0, 0,0,0,1},

±{1,0,0,0,0,0,0,0,−1,0,0,0,0,0,0,0,1,0,0,0,0,0,0,0,1,0,0,0, 0,0,0,0},

±{0,1,0,0,0,0,0,0,0,−1,0,0,0,0,0,0,0,1,0,0,0,0,0,0,0,1,0,0, 0,0,0,0},

±{0,0,1,0,0,0,0,0,0,0,−1,0,0,0,0,0,0,0,1,0,0,0,0,0,0,0,1,0, 0,0,0,0},

±{0,0,0,1,0,0,0,0,0,0,0,−1,0,0,0,0,0,0,0,1,0,0,0,0,0,0,0,1, 0,0,0,0},

±{0,0,0,0,1,0,0,0,0,0,0,0,−1,0,0,0,0,0,0,0,1,0,0,0,0,0,0,0, 1,0,0,0},

±{0,0,0,0,0,1,0,0,0,0,0,0,0,−1,0,0,0,0,0,0,0,1,0,0,0,0,0,0, 0,1,0,0},

±{0,0,0,0,0,0,1,0,0,0,0,0,0,0,−1,0,0,0,0,0,0,0,1,0,0,0,0,0, 0,0,1,0},

±{0,0,0,0,0,0,0,1,0,0,0,0,0,0,0,−1,0,0,0,0,0,0,0,1,0,0,0,0, 0,0,0,1},

±{1,0,0,0,0,0,0,0,1,0,0,0,0,0,0,0,1,0,0,0,0,0,0,0,−1,0,0,0, 0,0,0,0},

±{0,1,0,0,0,0,0,0,0,1,0,0,0,0,0,0,0,0,1,0,0,0,0,0,0,0,-1,0,0, 0,0,0,0},

±{0,0,1,0,0,0,0,0,0,0,1,0,0,0,0,0,0,0,0,1,0,0,0,0,0,0,0,-1,0, 0,0,0,0},

±{0,0,0,1,0,0,0,0,0,0,0,1,0,0,0,0,0,0,0,0,1,0,0,0,0,0,0,0,-1, 0,0,0,0},

±{0,0,0,0,1,0,0,0,0,0,0,0,1,0,0,0,0,0,0,0,0,1,0,0,0,0,0,0,0,- 1,0,0,0},

±{0,0,0,0,0,1,0,0,0,0,0,0,0,1,0,0,0,0,0,0,0,0,1,0,0,0,0,0,0,0, 0,-1,0,0},

±{0,0,0,0,0,0,1,0,0,0,0,0,0,0,1,0,0,0,0,0,0,0,0,1,0,0,0,0,0,0, 0,-1,0},

±{0,0,0,0,0,0,0,1,0,0,0,0,0,0,0,1,0,0,0,0,0,0,0,0,1,0,0,0,0,0, 0,0,-1},

±{-1,0,0,0,0,0,0,0,1,0,0,0,0,0,0,0,1,0,0,0,0,0,0,0,0,1,0,0,0, 0,0,0,0},

±{0,-1,0,0,0,0,0,0,0,1,0,0,0,0,0,0,0,1,0,0,0,0,0,0,0,0,1,0,0, 0,0,0,0},

±{0,0,-1,0,0,0,0,0,0,0,1,0,0,0,0,0,0,0,1,0,0,0,0,0,0,0,0,1,0, 0,0,0,0},

±{0,0,0,-1,0,0,0,0,0,0,0,1,0,0,0,0,0,0,0,1,0,0,0,0,0,0,0,0,1, 0,0,0,0},

±{0,0,0,0,-1,0,0,0,0,0,0,0,1,0,0,0,0,0,0,0,1,0,0,0,0,0,0,0,0, 1,0,0,0},

±{0,0,0,0,0,-1,0,0,0,0,0,0,0,1,0,0,0,0,0,0,0,1,0,0,0,0,0,0,0, 0,1,0,0},

±{0,0,0,0,0,0,-1,0,0,0,0,0,0,0,1,0,0,0,0,0,0,0,1,0,0,0,0,0,0, 0,0,1,0}, or

±{0,0,0,0,0,0,0,-1,0,0,0,0,0,0,0,1,0,0,0,0,0,0,0,1,0,0,0,0,0, 0,0,0,1}

<Method 4: Proposed Sequence Repetition+Phase Rotation>

First, a sequence having a length of 4 is repeated to configure a sequence having a length of 8, 16, 32, or 64, on which phase rotation is performed per length of 4 to reduce a PAPR. Here, the sequence having a length of 4 is {1,1, 1,-1} or {1,1,-1,1}.

Also, a sequence having a length of 8 is repeated to configure a sequence having a length of 16, 32, or 64, on which phase rotation is performed per length of 8 to reduce a PAPR. Here, the sequence having a length of 8 is {1,1, 1,-1,1,-1,-1,1}.

Further, a sequence having a length of 16 is repeated to configure a sequence having a length of 32 or 64, on which phase rotation is performed per length of 16 to reduce a PAPR. Here, the sequence having a length of 16 is {1,1,1,- 1,-1,-1,-1,1,-1,-1,1,1,-1,-1,1,-1}.

In addition, a sequence having a length of 32 is repeated to configure a sequence having a length of 64, on which phase rotation is performed per length of 32 to reduce a PAPR. Here, the sequence having a length of 32 is {1,1,1, 1,1,-1,1,-1,-1,-1,1,1,1,-1,-1,1,1,1,1,-1,-1,1,-1,-1,1,- 1,-1,-1,1,-1,-1,-1}.

For example, a sequence having a length of 8 obtained by repeating a sequence having a length of 4, {1,1,1,-1}, and performing phase rotation thereon is {1*[1,1,1,-1], 1*[1,1, 1,-1]}.

A sequence having a length of 16 obtained by repeating a sequence having a length of 4, {1,1,1,-1}, and performing phase rotation thereon is {1*[1,1,1,-1], j*[1,1,1,-1], j*[1,1, 1,-1], 1*[1,1,1,-1]}.

A sequence having a length of 32 obtained by repeating a sequence having a length of 4, {1,1,1,-1}, and performing phase rotation thereon is {1*[1,1,1,-1], -1*[1,1,1,-1], -1* [1,1,1,-1], 1*[1,1,1,-1], 1*[1,1,1,-1], 1*[1,1,1,-1], 1*[1,1, 1,-1], 1*[1,1,1,-1]}.

A sequence obtained by repeating a sequence having a length of 4, {1,1,1,-1}, and performing phase rotation thereon to minimize a PAPR and a corresponding PAPR may be proposed as in the following table. Each sequence in the table may be reversed in order.

TABLE 25

| | BW [MHz] | 2.5 | 5 |
|---|---|---|---|
| Simple OOK | # Sub. | 8 | 16 |
| | Sequence | ±{1, 1, 1, -1, 1, 1, 1, -1} | ±{1, 1, 1, -1, j, j, j, -j, j, j, j, -j, 1, 1, 1, -1} |
| | PAPR [dB] | 3.7319 | 3.4314 |
| OOK w/ Manchester coding Or symbol reduction (1.6 us) | # Sub. | 4 | 8 |
| | Sequence | | ±{1, 0, 1, 0, 1, 0, -1, 0, 1, 0, 1, 0, 1, 0, -1, 0} |
| | | | ±{0, 1, 0, 1, 0, 1, 0, -1, 0, 1, 0, 1, 0, 1, 0, -1} |
| | PAPR [dB] | | 3.7243 |

TABLE 26

| | BW [MHz] | 10 |
|---|---|---|
| Simple OOK | # Sub. | 32 |
| | Sequence | ±{1, 1, 1, -1, -1, -1, -1, 1, -1, -1, -1, 1, 1, 1, -1, 1, 1, 1, -1, 1, 1, 1, -1, 1, 1, 1, -1, 1, 1, 1, -1, 1, 1, 1, -1} |
| | PAPR [dB] | 3.9470 |
| OOK w/ Manchester coding Or symbol reduction (1.6 us) | # Sub. | 16 |
| | Sequence | ±{1, 0, 1, 0, 1, 0, -1, 0, j, 0, j, 0, j, 0, -j, 0, j, 0, j, 0, j, 0, -j, 0, 1, 0, 1, 0, 1, 0, -1, 0} |
| | | ±{0, 1, 0, 1, 0, 1, 0, -1, 0, j, 0, j, 0, j, 0, -j, 0, j, 0, j, 0, j, 0, -j, 0, 1, 0, 1, 0, 1, 0, -1} |
| | PAPR [dB] | 3.4288 |

TABLE 27

| | BW [MHz] | 20 |
|---|---|---|
| Simple OOK | # Sub. | 64 |
| | Sequence | |
| | PAPR [dB] | |
| OOK w/ Manchester coding Or symbol reduction (1.6 us) | # Sub. | 32 |
| | Sequence | ±{1, 0, 1, 0, 1, 0, -1, 0, -1, 0, -1, 0, -1, 0, 1, 0, -1, 0, -1, 0, -1, 0, 1, 0, 1, 0, 1, 0, 1, 0, 1, 0, -1, 0, 1, 0, 1, 0, 1, 0, -1, 0, 1, 0, 1, 0, 1, 0, -1, 0, 1, 0, 1, 0, 1, 0, -1, 0, 1, 0, 1, 0, -1, 0} |
| | | ±{0, 1, 0, 1, 0, 1, 0, -1, 0, -1, 0, -1, 0, -1, 0, 1, 0, -1, 0, -1, 0, -1, 0, 1, 0, 1, 0, 1, 0, 1, 0, 1, 0, -1, 0, 1, 0, 1, 0, 1, 0, -1, 0, 1, 0, 1, 0, 1, 0, -1, 0, 1, 0, 1, 0, 1, 0, -1, 0, 1, 0, 1, 0, -1} |
| | PAPR [dB] | 3.9020 |

A sequence for a 0.8 us symbol subjected/applied to a symbol reduction scheme and a sequence for a 0.4 us symbol subjected/applied to a symbol reduction scheme according to the above method may be proposed as follows.

The sequence for the 0.8 us symbol according to the bandwidth is as follows.

−10 MHz

±{1,0,0,0,1,0,0,0,1,0,0,0,-1,0,0,0,1,0,0,0,1,0,0,0,1,0,0, 0,-1,0,0,0},

±{0,1,0,0,0,1,0,0,0,1,0,0,0,-1,0,0,0,1,0,0,0,1,0,0,0,1,0,0, 0,-1,0,0},

±{0,0,1,0,0,0,1,0,0,0,1,0,0,0,-1,0,0,0,1,0,0,0,1,0,0,0,1,0, 0,0,-1,0},

±{0,0,0,1,0,0,0,1,0,0,0,1,0,0,0,-1,0,0,0,1,0,0,0,1,0,0,0,1, 0,0,0,-1},

±{-1,0,0,0,1,0,0,0,1,0,0,0,1,0,0,0,-1,0,0,0,1,0,0,0,1,0,0, 0,1,0,0,0},

±{0,-1,0,0,0,1,0,0,0,1,0,0,0,1,0,0,0,-1,0,0,0,1,0,0,0,1,0, 0,0,1,0,0},

±{0,0,-1,0,0,0,1,0,0,0,1,0,0,0,1,0,0,0,-1,0,0,0,1,0,0,0,1, 0,0,0,1,0}, or

±{0,0,0,-1,0,0,0,1,0,0,0,1,0,0,0,1,0,0,0,-1,0,0,0,1,0,0,0, 1,0,0,0,1}

−20 MHz

±{1,0,0,0,1,0,0,0,1,0,0,0,-1,0,0,0,j,0,0,0,j,0,0,0,j,0,0,0,-j, 0,0,0,j,0,0,0,j,0,0,0,j,0,0,0,-j,0,0,0,1,0,0,0,1,0,0,0,1,0,0,0,- 1,0,0,0},

±{0,1,0,0,0,1,0,0,0,1,0,0,0,-1,0,0,0,j,0,0,0,j,0,0,0,j,0,0, 0,-j,0,0,0,j,0,0,0,j,0,0,0,j,0,0,0,-j,0,0,0,1,0,0,0,1,0,0,0,1,0,0, 0,-1,0,0},

±{0,0,1,0,0,0,1,0,0,0,1,0,0,0,-1,0,0,0,j,0,0,0,j,0,0,0,j,0,0, 0,-j,0,0,0,j,0,0,0,j,0,0,0,j,0,0,0,-j,0,0,0,1,0,0,0,1,0,0,0,1,0,0, 0,-1,0},

±{0,0,0,1,0,0,0,1,0,0,0,1,0,0,0,-1,0,0,0,j,0,0,0,j,0,0,0,j,0, 0,0,-j,0,0,0,j,0,0,0,j,0,0,0,j,0,0,0,-j,0,0,0,1,0,0,0,1,0,0,0,1,0, 0,0,-1},

±{-1,0,0,0,1,0,0,0,1,0,0,0,1,0,0,0,-j,0,0,0,j,0,0,0,j,0,0,0,j, 0,0,0,-j,0,0,0,j,0,0,0,j,0,0,0,j,0,0,0,-1,0,0,0,1,0,0,0,1,0,0,0, 1,0,0,0},

±{0,-1,0,0,0,1,0,0,0,1,0,0,0,1,0,0,0,-j,0,0,0,j,0,0,0,j,0,0, 0,j,0,0,0,-j,0,0,0,j,0,0,0,j,0,0,0,j,0,0,0,-1,0,0,0,1,0,0,0,1,0,0, 0,1,0,0,0},

±{0,0,-1,0,0,0,1,0,0,0,1,0,0,0,1,0,0,0,-j,0,0,0,j,0,0,0,j,0, 0,0,j,0,0,0,-j,0,0,0,j,0,0,0,j,0,0,0,j,0,0,0,-1,0,0,0,1,0,0,0,1,0, 0,0,1,0}, or

±{0,0,0,-1,0,0,0,1,0,0,0,1,0,0,0,1,0,0,0,-j,0,0,0,j,0,0,0,j, 0,0,0,j,0,0,0,-j,0,0,0,j,0,0,0,j,0,0,0,j,0,0,0,-1,0,0,0,1,0,0,0,1, 0,0,0,1}

The sequence for the 0.4 us symbol according to the bandwidth is as follows.

20 MHz

±{1,0,0,0,0,0,0,0,1,0,0,0,0,0,0,0,1,0,0,0,0,0,0,0,-1,0,0,0, 0,0,0,0,1,0,0,0,0,0,0,0,1,0,0,0,0,0,0,0,1,0,0,0,0,0,0,0,-1,0,0, 0,0,0,0,0},

±{0,1,0,0,0,0,0,0,0,1,0,0,0,0,0,0,0,1,0,0,0,0,0,0,0,-1,0,0, 0,0,0,0,0,1,0,0,0,0,0,0,0,1,0,0,0,0,0,0,0,1,0,0,0,0,0,0,0,-1,0, 0,0,0,0,0,0},

±{0,0,1,0,0,0,0,0,0,0,1,0,0,0,0,0,0,0,1,0,0,0,0,0,0,0,-1,0, 0,0,0,0,0,0,1,0,0,0,0,0,0,0,1,0,0,0,0,0,0,0,1,0,0,0,0,0,0,0,-1, 0,0,0,0,0,0,0},

±{0,0,0,1,0,0,0,0,0,0,0,1,0,0,0,0,0,0,0,1,0,0,0,0,0,0,0,-1, 0,0,0,0,0,0,0,1,0,0,0,0,0,0,0,1,0,0,0,0,0,0,0,1,0,0,0,0,0,0,0,- 1,0,0,0,0},

±{0,0,0,0,1,0,0,0,0,0,0,0,1,0,0,0,0,0,0,0,1,0,0,0,0,0,0,0,- 1,0,0,0,0,0,0,0,1,0,0,0,0,0,0,0,1,0,0,0,0,0,0,0,1,0,0,0,0,0,0,0, 0,-1,0,0,0},

±{0,0,0,0,0,1,0,0,0,0,0,0,0,1,0,0,0,0,0,0,0,1,0,0,0,0,0,0, 0,-1,0,0,0,0,0,0,0,1,0,0,0,0,0,0,0,1,0,0,0,0,0,0,0,1,0,0,0,0,0,0, 0,0,-1,0,0},

±{0,0,0,0,0,0,1,0,0,0,0,0,0,0,1,0,0,0,0,0,0,0,1,0,0,0,0,0,0, 0,-1,0,0,0,0,0,0,0,1,0,0,0,0,0,0,0,1,0,0,0,0,0,0,0,1,0,0,0,0,0,0, 0,0,-1,0},

±{0,0,0,0,0,0,0,1,0,0,0,0,0,0,0,1,0,0,0,0,0,0,0,1,0,0,0,0,0, 0,0,-1,0,0,0,0,0,0,0,1,0,0,0,0,0,0,0,1,0,0,0,0,0,0,0,1,0,0,0,0, 0,0,0,0,-1},

±{-1,0,0,0,0,0,0,0,1,0,0,0,0,0,0,0,1,0,0,0,0,0,0,0,1,0,0,0, 0,0,0,0,-1,0,0,0,0,0,0,0,1,0,0,0,0,0,0,0,1,0,0,0,0,0,0,0,1,0,0, 0,0,0,0,0},

±{0,-1,0,0,0,0,0,0,0,1,0,0,0,0,0,0,0,1,0,0,0,0,0,0,0,1,0,0, 0,0,0,0,0,-1,0,0,0,0,0,0,0,1,0,0,0,0,0,0,0,1,0,0,0,0,0,0,0,1,0, 0,0,0,0,0,0},

±{0,0,-1,0,0,0,0,0,0,0,1,0,0,0,0,0,0,0,1,0,0,0,0,0,0,0,1,0, 0,0,0,0,0,0,-1,0,0,0,0,0,0,0,1,0,0,0,0,0,0,0,1,0,0,0,0,0,0,0,1, 0,0,0,0,0,0,0},

±{0,0,0,-1,0,0,0,0,0,0,0,1,0,0,0,0,0,0,0,1,0,0,0,0,0,0,0,1, 0,0,0,0,0,0,0,-1,0,0,0,0,0,0,0,1,0,0,0,0,0,0,0,1,0,0,0,0,0,0,0, 1,0,0,0,0},

±{0,0,0,0,-1,0,0,0,0,0,0,0,1,0,0,0,0,0,0,0,1,0,0,0,0,0,0,0, 1,0,0,0,0,0,0,0,-1,0,0,0,0,0,0,0,1,0,0,0,0,0,0,0,1,0,0,0,0,0,0, 0,1,0,0,0},

±{0,0,0,0,0,-1,0,0,0,0,0,0,0,1,0,0,0,0,0,0,0,1,0,0,0,0,0,0, 0,1,0,0,0,0,0,0,0,-1,0,0,0,0,0,0,0,1,0,0,0,0,0,0,0,1,0,0,0,0,0,0, 0,1,0,0},

±{0,0,0,0,0,0,-1,0,0,0,0,0,0,0,1,0,0,0,0,0,0,0,1,0,0,0,0,0, 0,0,1,0,0,0,0,0,0,0,-1,0,0,0,0,0,0,0,1,0,0,0,0,0,0,0,1,0,0,0,0, 0,0,0,1,0}, or

±{0,0,0,0,0,0,0,-1,0,0,0,0,0,0,0,1,0,0,0,0,0,0,0,1,0,0,0,0, 0,0,0,1,0,0,0,0,0,0,0,-1,0,0,0,0,0,0,0,1,0,0,0,0,0,0,0,1,0,0,0, 0,0,0,0,1}

In another example, a sequence having a length of 8 obtained by repeating a sequence having a length of 4, {1,1,−1,1}, and performing phase rotation thereon is {1*[1, 1,−1,1], 1*[1,1,−1,1]}.

A sequence having a length of 16 obtained by repeating a sequence having a length of 4, {1,1,−1,1}, and performing phase rotation thereon is {1*[1,1,−1,1], −j*[1,1,−1,1], −j*[1,1,−1,1], 1*[1,1,−1,1]}.

A sequence having a length of 32 obtained by repeating a sequence having a length of 4, {1,1,−1,1}, and performing phase rotation thereon is {1*[1,1,−1,1], 1*[1,1,−1,1], 1*[1, 1,−1,1], 1*[1,1,−1,1], 1*[1,1,−1,1], −1*[1,1,−1,1], −1*[1, 1,−1,1], 1*[1,1,−1,1]}.

A sequence obtained by repeating a sequence having a length of 4, {1,1,−1,1}, and performing phase rotation thereon to minimize a PAPR and a corresponding PAPR may be proposed as in the following table. Each sequence in the table may be reversed in order.

TABLE 28

| | BW [MHz] | 2.5 | 5 |
|---|---|---|---|
| Simple OOK | # Sub. | 8 | 16 |
| | Sequence | ±{1, 1, −1, 1, 1, 1, −1, 1} | ±{1, 1, −1, 1, −j, −j, j, −j, −j, −j, j, j, −j, 1, 1, −1, 1} |
| | PAPR [dB] | 3.7319 | 3.4314 |
| OOK w/ Manchester coding Or symbol reduction (1.6 us) | # Sub. | 4 | 8 |
| | Sequence | | ±{1, 0, 1, 0, −1, 0, 1, 0, 1, 0, 1, 0, −1, 0, 1, 0} |
| | | | ±{0, 1, 0, 1, 0, −1, 0, 1, 0, 1, 0, 1, 0, −1, 0, 1} |
| | PAPR [dB] | | 3.7243 |

TABLE 29

| | BW [MHz] | 10 |
|---|---|---|
| Simple OOK | # Sub. | 32 |
| | Sequence | ±{1, 1, −1, 1, 1, 1, −1, 1, 1, 1, −1, 1, 1, 1, −1, 1, 1, 1, −1, 1, −1, −1, 1, −1, −1, −1, 1, −1, 1, 1, −1, 1} |
| | PAPR [dB] | 3.9470 |
| OOK w/ Manchester coding Or symbol reduction (1.6 us) | # Sub. | 16 |
| | Sequence | ±{1, 0, 1, 0, −1, 0, 1, 0, −j, 0, −j, 0, j, 0, −j, 0, −j, 0, −j, 0, j, 0, −j, 0, 1, 0, 1, 0, −1, 0, 1, 0} |
| | | ±{0, 1, 0, 1, 0, −1, 0, 1, 0, −j, 0, −j, 0, j, 0, −j, 0, −j, 0, −j, 0, j, 0, −j, 0, 1, 0, 1, 0, −1, 0, 1} |
| | PAPR [dB] | 3.4288 |

TABLE 30

| | BW [MHz] | 20 |
|---|---|---|
| Simple OOK | # Sub. | 64 |
| | Sequence | |
| | PAPR [dB] | |

TABLE 30-continued

| OOK w/ Manchester coding Or symbol reduction (1.6 us) | # Sub. Sequence | 32 ±{1, 0, 1, 0, -1, 0, 1, 0, 1, 0, 1, 0, -1, 0, 1, 0, 1, 0, 1, 0, -1, 0, 1, 0, 1, 0, 1, 0, -1, 0, 1, 0, 1, 0, 1, 0, -1, 0, 1, 0, -1, 0, -1, 0, 1, 0, -1, 0, -1, 0, -1, 0, 1, 0, -1, 0, 1, 0, 1, 0, -1, 0, 1, 0} ±{0, 1, 0, 1, 0, -1, 0, 1, 0, 1, 0, 1, 0, -1, 0, 1, 0, 1, 0, 1, 0, -1, 0, 1, 0, 1, 0, 1, 0, -1, 0, 1, 0, 1, 0, 1, 0, -1, 0, 1, 0, -1, 0, 1, 0, -1, 0, 1, 0, -1, 0, -1, 0, -1, 0, 1, 0, -1, 0, 1, 0, 1, 0, -1, 0, 1} |
|---|---|---|
| | PAPR [dB] | 3.9020 |

A sequence for a 0.8 us symbol subjected/applied to a symbol reduction scheme and a sequence for a 0.4 us symbol subjected/applied to a symbol reduction scheme according to the above method may be proposed as follows.

The sequence for the 0.8 us symbol according to the bandwidth is as follows.

–10 MHz

±{1,0,0,0,1,0,0,0,-1,0,0,0,1,0,0,0,1,0,0,0,1,0,0,0,-1,0,0,0,1,0,0,0},

±{0,1,0,0,0,1,0,0,0,-1,0,0,0,1,0,0,0,1,0,0,0,1,0,0,0,-1,0,0,0,1,0,0},

±{0,0,1,0,0,0,1,0,0,0,-1,0,0,0,1,0,0,0,1,0,0,0,1,0,0,0,-1,0,0,0,1,0},

±{0,0,0,1,0,0,0,1,0,0,0,-1,0,0,0,1,0,0,0,1,0,0,0,1,0,0,0,-1,0,0,0,1},

±{1,0,0,0,-1,0,0,0,1,0,0,0,1,0,0,0,1,0,0,0,-1,0,0,0,1,0,0,0,1,0,0,0},

±{0,1,0,0,0,-1,0,0,0,1,0,0,0,1,0,0,0,1,0,0,0,-1,0,0,0,1,0,0,0,1,0,0},

±{0,0,1,0,0,0,-1,0,0,0,1,0,0,0,1,0,0,0,1,0,0,0,-1,0,0,0,1,0,0,0,1,0}, or

±{0,0,0,1,0,0,0,-1,0,0,0,1,0,0,0,1,0,0,0,1,0,0,0,-1,0,0,0,1,0,0,0,1}

–20 MHz

±{1,0,0,0,1,0,0,0,-1,0,0,0,1,0,0,0,-j,0,0,0,-j,0,0,0,j,0,0,0,-j,0,0,0,-j,0,0,0,-j,0,0,0,j,0,0,0,-j,0,0,0,1,0,0,0,1,0,0,0,-1,0,0,0,1,0,0,0},

–±{0,1,0,0,0,1,0,0,0,-1,0,0,0,1,0,0,0,-j,0,0,0,-j,0,0,0,j,0,0,0,-j,0,0,0,-j,0,0,0,-j,0,0,0,j,0,0,0,-j,0,0,0,1,0,0,0,1,0,0,0,-1,0,0,0,1,0,0},

±{0,0,1,0,0,0,1,0,0,0,-1,0,0,0,1,0,0,0,-j,0,0,0,-j,0,0,0,j,0,0,0,-j,0,0,0,-j,0,0,0,-j,0,0,0,j,0,0,0,-j,0,0,0,1,0,0,0,1,0,0,0,-1,0,0,0,1,0},

±{0,0,0,1,0,0,0,1,0,0,0,-1,0,0,0,1,0,0,0,-j,0,0,0,-j,0,0,0,j,0,0,0,-j,0,0,0,-j,0,0,0,-j,0,0,0,j,0,0,0,-j,0,0,0,1,0,0,0,1,0,0,0,-1,0,0,0,1},

±{1,0,0,0,-1,0,0,0,1,0,0,0,1,0,0,0,-j,0,0,0,j,0,0,0,-j,0,0,0,-j,0,0,0,-j,0,0,0,j,0,0,0,-j,0,0,0,-j,0,0,0,1,0,0,0,-1,0,0,0,1,0,0,0,1,0,0,0},

±{0,1,0,0,0,-1,0,0,0,1,0,0,0,1,0,0,0,-j,0,0,0,j,0,0,0,-j,0,0,0,-j,0,0,0,-j,0,0,0,j,0,0,0,-j,0,0,0,-j,0,0,0,1,0,0,0,-1,0,0,0,1,0,0,0,1,0,0},

±{0,0,1,0,0,0,-1,0,0,0,1,0,0,0,1,0,0,0,-j,0,0,0,j,0,0,0,-j,0,0,0,-j,0,0,0,-j,0,0,0,j,0,0,0,-j,0,0,0,-1,0,0,0,1,0,0,0,1,0,0,0,1,0,0}, or

±{0,0,0,1,0,0,0,-1,0,0,0,1,0,0,0,1,0,0,0,-j,0,0,0,j,0,0,0,-j,0,0,0,-j,0,0,0,-j,0,0,0,j,0,0,0,-j,0,0,0,1,0,0,0,-1,0,0,0,1,0,0,0,1}

The sequence for the 0.4 us symbol according to the bandwidth is as follows.

–20 MHz

±{1,0,0,0,0,0,0,0,1,0,0,0,0,0,0,0,-1,0,0,0,0,0,0,0,1,0,0,0,0,0,0,0,0,0,0,0,1,0,0,0,0,0,0,0,0,0,1,0,0,0,0,0,0,0,0,0,-1,0,0,0,0,0,0,0,1,0,0,0,0,0,0,0},

±{0,1,0,0,0,0,0,0,0,1,0,0,0,0,0,0,0,-1,0,0,0,0,0,0,0,1,0,0,0,0,0,0,0,0,0,0,0,1,0,0,0,0,0,0,0,0,0,1,0,0,0,0,0,0,0,0,0,-1,0,0,0,0,0,0,0,1,0,0,0,0,0,0},

±{0,0,1,0,0,0,0,0,0,0,1,0,0,0,0,0,0,0,-1,0,0,0,0,0,0,0,1,0,0,0,0,0,0,0,0,0,0,0,1,0,0,0,0,0,0,0,0,0,1,0,0,0,0,0,0,0,0,0,-1,0,0,0,0,0,0,0,1,0,0,0,0,0},

±{0,0,0,1,0,0,0,0,0,0,0,1,0,0,0,0,0,0,0,-1,0,0,0,0,0,0,0,1,0,0,0,0,0,0,0,0,0,0,0,1,0,0,0,0,0,0,0,0,0,1,0,0,0,0,0,0,0,0,0,-1,0,0,0,0,0,0,0,1,0,0,0,0},

±{0,0,0,0,1,0,0,0,0,0,0,0,1,0,0,0,0,0,0,0,-1,0,0,0,0,0,0,0,1,0,0,0,0,0,0,0,0,0,0,0,1,0,0,0,0,0,0,0,0,0,1,0,0,0,0,0,0,0,0,0,-1,0,0,0,0,0,0,0,1,0,0,0},

±{0,0,0,0,0,1,0,0,0,0,0,0,0,1,0,0,0,0,0,0,0,-1,0,0,0,0,0,0,0,1,0,0,0,0,0,0,0,0,0,0,0,1,0,0,0,0,0,0,0,0,0,1,0,0,0,0,0,0,0,0,0,-1,0,0,0,0,0,0,0,1,0,0},

±{0,0,0,0,0,0,1,0,0,0,0,0,0,0,1,0,0,0,0,0,0,0,-1,0,0,0,0,0,0,0,1,0,0,0,0,0,0,0,0,0,0,0,1,0,0,0,0,0,0,0,0,0,1,0,0,0,0,0,0,0,0,0,-1,0,0,0,0,0,0,0,1,0},

±{0,0,0,0,0,0,0,1,0,0,0,0,0,0,0,1,0,0,0,0,0,0,0,-1,0,0,0,0,0,0,0,1,0,0,0,0,0,0,0,0,0,0,0,1,0,0,0,0,0,0,0,0,0,1,0,0,0,0,0,0,0,0,0,-1,0,0,0,0,0,0,0,1},

±{1,0,0,0,0,0,0,0,-1,0,0,0,0,0,0,0,0,1,0,0,0,0,0,0,0,1,0,0,0,0,0,0,0,0,0,0,-1,0,0,0,0,0,0,0,1,0,0,0,0,0,0,0,0,0,0,0},

±{0,1,0,0,0,0,0,0,0,-1,0,0,0,0,0,0,0,0,1,0,0,0,0,0,0,0,1,0,0,0,0,0,0,0,0,0,0,-1,0,0,0,0,0,0,0,1,0,0,0,0,0,0,0,0,0,0},

±{0,0,1,0,0,0,0,0,0,0,-1,0,0,0,0,0,0,0,0,1,0,0,0,0,0,0,0,1,0,0,0,0,0,0,0,0,0,0,-1,0,0,0,0,0,0,0,1,0,0,0,0,0,0,0,0,0},

±{0,0,0,1,0,0,0,0,0,0,0,-1,0,0,0,0,0,0,0,0,1,0,0,0,0,0,0,0,1,0,0,0,0,0,0,0,0,0,0,-1,0,0,0,0,0,0,0,1,0,0,0,0,0,0,0,0},

±{0,0,0,0,1,0,0,0,0,0,0,0,-1,0,0,0,0,0,0,0,1,0,0,0,0,0,0,0,0,0,0,0,1,0,0,0,0,0,0,0,0,0,0,0,-1,0,0,0,0,0,0,0,0,0,1,0,0,0,0,0,0,0,0,0,0,01,

±{0,0,0,0,0,1,0,0,0,0,0,0,0,-1,0,0,0,0,0,0,0,1,0,0,0,0,0,0,0,1,0,0,0,0,0,0,0,0,0,0,-1,0,0,0,0,0,0,0,1,0,0,0,0,0,0,0,0,0,0,0,1,0,0,0},

±{0,0,0,0,0,0,1,0,0,0,0,0,0,0,-1,0,0,0,0,0,0,0,1,0,0,0,0,0,0,0,1,0,0,0,0,0,0,0,0,0,0,-1,0,0,0,0,0,0,0,1,0,0,0,0,0,0}, or

±{0,0,0,0,0,0,0,1,0,0,0,0,0,0,0,-1,0,0,0,0,0,0,0,1,0,0,0,0,0,0,0,1,0,0,0,0,0,0,0,0,0,0,-1,0,0,0,0,0,0,0,1,0,0,0,0,0,0,0,0,0,1}

In still another example, a sequence having a length of 16 obtained by repeating a sequence having a length of 8, {1,1,1,-1,1,-1,-1,1}, and performing phase rotation thereon is 1*[1,1,1,-1,1,-1,-1,1].

A sequence having a length of 32 obtained by repeating a sequence having a length of 8, {1,1,1,-1,1,-1,-1,1}, and performing phase rotation thereon is {1*[1,1,1,-1,1,-1,-1,1], 1*[1,1,1,-1,1,-1,-1,1], 1*[1,1,1,-1,1,-1,-1,1], -1*[1,1,1,-1,1,-1,-1,1]}.

A sequence having a length of 64 obtained by repeating a sequence having a length of 8, {1,1,1,-1,1,-1,-1,1}, and performing phase rotation thereon is {1*[1,1,1,-1,1,-1,-1,1], -1*[1,1,1,-1,1,-1,-1,1], -1*[1,1,1,-1,1,-1,-1,1], 1*[1,1,1,-1,1,-1,-1,1], -1*[1,1,1,-1,1,-1,-1,1], 1*[1,1,1,-1,1,-1,-1,1], 1*[1,1,1,-1,1,-1,-1,1], 1*[1,1,1,-1,1,-1,-1,1]}.

A sequence obtained by repeating a sequence having a length of 8, {1,1,1,-1,1,-1,-1,1}, and performing phase rotation thereon to minimize a PAPR and a corresponding PAPR may be proposed as in the following table. Each sequence in the table may be reversed in order.

TABLE 31

| | BW [MHz] | 5 |
|---|---|---|
| Simple OOK | # Sub. | 16 |
| | Sequence | ±{1, 1, 1, -1, 1, -1, -1, 1, 1, 1, 1, -1, 1, -1, -1, 1} |
| | PAPR [dB] | 4.7712 |
| OOK w/ Manchester coding Or symbol reduction (1.6 us) | # Sub. Sequence PAPR [dB] | 8 |

TABLE 32

| | BW [MHz] | 10 |
|---|---|---|
| Simple OOK | # Sub. | 32 |
| | Sequence | ±{1, 1, 1, -1, 1, -1, -1, 1, 1, 1, 1, -1, 1, -1, -1, 1, 1, 1, 1, -1, 1, -1, -1, 1, 1, -1, -1, -1, 1, -1, 1, 1, -1} |
| | PAPR [dB] | 4.3257 |
| OOK w/ Manchester coding Or symbol reduction (1.6 us) | # Sub. Sequence | 16<br>±{1, 0, 1, 0, 1, 0, -1, 0, 1, 0, -1, 0, -1, 0, 1, 0, 1, 0, 1, 0, 1, 0, -1, 0, 1, 0, -1, 0, -1, 0, 1, 0}<br>±{0, 1, 0, 1, 0, 1, 0, -1, 0, 1, 0, -1, 0, -1, 0, 1, 0, 1, 0, 1, 0, 1, 0, -1, 0, 1, 0, -1, 0, -1, 0, 1} |
| | PAPR [dB] | 4.7712 |

TABLE 33

| | BW [MHz] | 20 |
|---|---|---|
| Simple OOK | # Sub. | 64 |
| | Sequence | ±{1, 1, 1, -1, 1, -1, -1, 1, -1, -1, -1, 1, -1, 1, 1, -1, -1, -1, -1, 1, -1, 1, 1, -1, 1, 1, 1, -1, 1, -1, -1, 1, -1, -1, -1, 1, -1, 1, 1, -1, 1, -1, 1, 1, -1, 1, -1, -1, 1, 1, 1, 1, -1, 1, -1, -1, 1, 1, 1, 1, -1, 1, -1, -1, 1} |
| | PAPR [dB] | 4.2624 |
| OOK w/ Manchester coding Or symbol reduction (1.6 us) | # Sub. Sequence | 32<br>±{1, 0, 1, 0, 1, 0, -1, 0, 1, 0, -1, 0, -1, 0, 1, 0, 1, 0, 1, 0, 1, 0, -1, 0, 1, 0, -1, 0, -1, 0, 1, 0, 1, 0, 1, 0, 1, 0, -1, 0, 1, 0, -1, 0, -1, 0, 1, 0, 0, 1, 0, -1, 0, -1, 0, 1, 0, -1, 0, 1, 0, -1, 0, 1, 0, -1}<br>±{0, 1, 0, 1, 0, 1, 0, -1, 0, 1, 0, -1, 0, -1, 0, 1, 0, 1, 0, 1, 0, 1, 0, -1, 0, 1, 0, -1, 0, -1, 0, 1, 0, 1, 0, 1, 0, 1, 0, -1, 0, 1, 0, -1, 0, -1, 0, 1, 1, 0, -1, 0, -1, 0, 1, 0, -1, 0, 1, 0, -1, 0, 1, 0, -1} |
| | PAPR [dB] | 4.1400 |

A sequence for a 0.8 us symbol subjected/applied to a symbol reduction scheme and a sequence for a 0.4 us symbol subjected/applied to a symbol reduction scheme according to the above method may be proposed as follows.

The sequence for the 0.8 us symbol according to the bandwidth is as follows.

–20 MHz

±{1,0,0,0,1,0,0,0,1,0,0,0,-1,0,0,0,1,0,0,0,-1,0,0,0,-1,0,0,0, 0,1,0,0,0,1,0,0,0,1,0,0,0,1,0,0,0,-1,0,0,0,1,0,0,0,-1,0,0,0,-1,0,0,0,1,0,0,0,1,0,0,0},

±{0,1,0,0,0,1,0,0,0,1,0,0,0,-1,0,0,0,1,0,0,0,-1,0,0,0,-1,0, 0,0,1,0,0,0,1,0,0,0,1,0,0,0,1,0,0,0,-1,0,0,0,1,0,0,0,-1,0,0, 0,-1,0,0,0,1,0,0},

±{0,0,1,0,0,0,1,0,0,0,1,0,0,0,-1,0,0,0,1,0,0,0,-1,0,0,0,-1, 0,0,0,1,0,0,0,1,0,0,0,1,0,0,0,1,0,0,0,-1,0,0,0,1,0,0,0,-1,0,0, 0,-1,0,0,0,1,0},

±{0,0,0,1,0,0,0,1,0,0,0,1,0,0,0,-1,0,0,0,1,0,0,0,-1,0,0,0,- 1,0,0,0,1,0,0,0,1,0,0,0,1,0,0,0,1,0,0,0,-1,0,0,0,1,0,0,0,-1,0, 0,0,-1,0,0,0,1},

±{1,0,0,0,-1,0,0,0,-1,0,0,0,1,0,0,0,-1,0,0,0,1,0,0,0,1,0,0, 0,1,0,0,0,1,0,0,0,-1,0,0,0,-1,0,0,0,1,0,0,0,-1,0,0,0,1,0,0,0, 1,0,0,0,1,0,0,0},

±{0,1,0,0,0,-1,0,0,0,-1,0,0,0,1,0,0,0,-1,0,0,0,1,0,0,0,1,0, 0,0,1,0,0,0,1,0,0,0,-1,0,0,0,-1,0,0,0,1,0,0,0,-1,0,0,0,1,0,0, 0,1,0,0,0,1,0,0},

±{0,0,1,0,0,0,-1,0,0,0,-1,0,0,0,1,0,0,0,-1,0,0,0,1,0,0,0,1, 0,0,0,1,0,0,0,1,0,0,0,-1,0,0,0,-1,0,0,0,1,0,0,0,-1,0,0,0,1,0, 0,0,1,0,0,0,1,0}, or

±{0,0,0,1,0,0,0,-1,0,0,0,-1,0,0,0,1,0,0,0,-1,0,0,0,1,0,0,0, 1,0,0,0,1,0,0,0,1,0,0,0,-1,0,0,0,-1,0,0,0,1,0,0,0,-1,0,0,0,1, 0,0,0,1,0,0,0,1}

In yet another example, a sequence having a length of 32 obtained by repeating a sequence having a length of 16, {1,1,1,-1,-1,-1,-1,1,-1,-1,1,-1,-1,-1,1,1,-1}, and performing phase rotation thereon is {1*[1,1,1,-1,-1,-1,-1,1,-1,-1,1,1,-1,-1,-1,1,1,-1], –j*[1,1,1,-1,-1,-1,-1,1,-1,-1,1,1,-1,-1,-1,1,1,-1]}.

A sequence having a length of 64 obtained by repeating a sequence having a length of 16, {1,1,1,-1,-1,-1,-1,1,-1,-1,1,1,-1,-1,-1,1,1,-1}, and performing phase rotation thereon is {1*[1,1,1,-1,-1,-1,-1,1,-1,-1,1,1,-1,-1,-1,1,1,-1], –1*[1,1,1,-1,-1,-1,-1,1,-1,-1,1,1,-1,-1,-1,1,1,-1], 1*[1,1,1,-1,-1,-1,-1,1,-1,-1,1,1,-1,-1,-1,1,1,-1], 1*[1,1,1,-1,-1,-1,-1,1,-1,-1,1,1,-1,-1,-1,1,1,-1], 1*[1,1,1,-1,-1,-1,-1,1,-1,-1,1,1,-1,-1,-1,1,1,-1]}.

A sequence obtained by repeating a sequence having a length of 16, {1,1,1,-1,-1,-1,-1,1,-1,-1,1,1,-1,-1,-1,1,1,-1}, and performing phase rotation thereon to minimize a PAPR and a corresponding PAPR may be proposed as in the following table. Each sequence in the table may be reversed in order.

TABLE 34

| | BW [MHz] | 10 |
|---|---|---|
| Simple OOK | # Sub. | 32 |
| | Sequence | ±{1, 1, 1, -1, -1, -1, -1, 1, -1, -1, 1, -1, -1, 1, -1, -j, -j, -j, j, j, j, -j, j, j, -j, j, j, -j, j} |
| | PAPR [dB] | 5.0440 |
| OOK w/ Manchester coding Or symbol reduction (1.6 us) | # Sub. Sequence PAPR [dB] | 16 |

TABLE 35

| | BW [MHz] | 20 |
|---|---|---|
| Simple OOK | # Sub. | 64 |
| | Sequence | ±{1, 1, 1, -1, -1, -1, -1, 1, -1, -1, 1, -1, -1, 1, -1, -1, -1, -1, -1, 1, 1, 1, 1, -1, 1, 1, -1, 1, 1, -1, 1, 1, 1, -1, -1, -1, -1, 1, -1, -1, 1, 1, -1, -1, -1, 1, -1, -1, 1, -1, -1, -1, 1, -1, -1, -1, 1, -1, -1, -1, 1, -1, -1, -1, 1, -1} |
| | PAPR [dB] | 4.3999 |
| OOK w/ Manchester coding Or symbol reduction (1.6 us) | # Sub. Sequence | 32<br>±{1, 0, 1, 0, 1, 0, -1, 0, -1, 0, -1, 0, 1, 0, -1, 0, -1, 0, 1, 0, 1, 0, -1, 0, -1, 0, -1, 0, 1, 0, 1, 0, -1, 0, -j, 0, -j, 0, -j, 0, j, 0, j, 0, j, 0, j, 0, -j, 0, j, 0, j, 0, j, 0, -j, 0, j, 0}<br>±{0, 1, 0, 1, 0, 1, 0, -1, 0, -1, 0, -1, 0, -1, 0, 1, 0, -1, 0, -1, 0, 1, 0, 1, 0, -1, 0, -1, 0, -1, 0, 1, 0, 1, 0, -j, 0, -j, 0, -j, 0, j, 0, j, 0, j, 0, j, 0, -j, 0, j, 0, j, 0, j, 0, -j, 0, j} |
| | PAPR [dB] | 5.0440 |

In yet another example, a sequence having a length of 64 obtained by repeating a sequence having a length of 32, {1,1,1,1,1,−1,1,−1,−1,−1,1,1,1,−1,−1,1,1,1,−1,−1,1,1,−1,−1, 1,−1,−1,−1,−1,1,1,−1,1,1,−1}, and performing phase rotation thereon is {1*[1, 1,1,1,1, −1,1, −1,−1, −1,1, 1,1,−1,−1,1,1, 1,−1,−1,1,1,−1,1,−1,−1,−1,−1,1,1,−1,1,1,−1], j*[1,1,1,1,1,−1, 1,−1,−1,−1,1,1,1,−1,−1,1,1,1,−1,−1,1,1,−1,−1,1,−1,−1,−1,−1,1, 1,−1,1,−1]}.

A sequence obtained by repeating a sequence having a length of 32, {1,1,1,1,1,−1,1,−1,−1,−1,1,1,1,1,−1,−1,1,1,1,1,−1, 1,−1,1,−1,−1,1,−1,−1,−1,−1,1,−1,1,−1}, and performing phase rotation thereon to minimize a PAPR and a corresponding PAPR may be proposed as in the following table. Each sequence in the table may be reversed in order.

TABLE 36

| | BW [MHz] | 20 |
|---|---|---|
| Simple OOK | # Sub. | 64 |
| | Sequence | ±{1, 1, 1, 1, 1, −1, 1, −1, −1, −1, 1, 1, 1, −1, −1, 1, 1, 1, −1, −1, 1, −1, −1, 1, −1, j, j, j, j, −j, j, −j, −j, −j, j, j, j, −j, −j, j, j, j, −j, −j, j, j, −j, j, −j, −j, −j, −j, j, −j, j, −j} |
| | PAPR [dB] | 5.8988 |
| OOK w/ Manchester coding Or symbol reduction (1.6 us) | # Sub. Sequence PAPR [dB] | 32 |

In still another example, a sequence having a length of 64 obtained by repeating a sequence having a length of 32, {−1,−1,−1,−1,−1,1,−1,1,1,1,−1,−1,−1,1,1,−1,−1,1,1,−1,−1,1,1,− 1,−1,1,1,−1,−1,−1,−1,1,−1,1,1,−1}, and performing phase rotation thereon is {1*[−1,−1,−1,−1,−1,1,−1,1,1,1,1,−1,−1,−1,1,1, 1,−1,1,1,−1,−1,1,1,−1,−1,1,−1,1,1,−1,−1,−1,−1,1,1,−1,1,1,−1], j*[−1,− 1,−1,−1,−1,1,−1,1,1,1,−1,−1,−1,1,1,1,−1,1,1,−1,−1,1,1,−1,−1,1,−1,1, 1,−1,−1,−1,−1,−1,1,1,−1,1,1,−1]}.

A sequence obtained by repeating a sequence having a length of 32, {−1,−1,−1,−1,−1,1,1,−1,1,1,1,1,−1,−1,1,1,1,1,−1,1,1, 1,−1,1,−1,−1,1,−1,−1,−1,−1,1,−1,1,−1}, and performing phase rotation thereon to minimize a PAPR and a corresponding PAPR may be proposed as in the following table. Each sequence in the table may be reversed in order.

TABLE 37

| | BW [MHz] | 20 |
|---|---|---|
| Simple OOK | # Sub. | 64 |
| | Sequence | ±{−1, −1, −1, −1, −1, 1, −1, 1, 1, 1, −1, −1, −1, 1, 1, −1, 1, 1, −1, −1, 1, −1, −1, 1, −1, −1, −1, −1, 1, −1, 1, −1, −j, −j, −j, j, j, j, −j, j, −j, −j, j, −j, j, j, −j, −j, j, −j, −j, j, −j, −j, −j, −j, j, −j, j, j, −j, −j, −j, j, −j} |

TABLE 37-continued

| | | −j, j, −j, j, j, j, −j, −j, −j, j, j, −j, j, j, −j, −j, j, −j, −j, j, −j, −j, −j, −j, j, −j, j, j, −j} | |
|---|---|---|---|
| | PAPR [dB] | 5.8988 | |
| OOK w/ Manchester coding Or symbol reduction (1.6 us) | # Sub. Sequence PAPR [dB] | 32 | |

In yet another example, when an on symbol is configured using a central band of 20 MHz, the symbol may be configured by nullifying a DC tone. In addition, proposed is the configuration of sequences where 2.5 MHz (8 tones), 4 MHz (13 tones), and 8 MHz (16 tones) are used.

Here, it is assumed that the index of a tone in the 20 MHz band ranges from −32 to 31.

The following tone indexes may be used for each band.

−2.5 MHz (8 tones): −4:1:3, −3:1:4

−4 MHz (13 tones): −6:1:6

−8 MHz (16 tones): −8:1:7, −7:1:8

When Manchester coding is applied, the same sequences as proposed in the foregoing four methods may be used. Here, a sequence that maps a coefficient of 0 to DC needs to be used.

For example, in the 4 MHz band of method 1, ±{0,1,0, 1,0,−1,0,1,0,−1,0,−1,0} or ±{0,−L0,−1,0,1,0,−1,0,1,0,1,0} may be applied to a tone index of −6:1:6.

In another example, in the 2.5 MHz band of method 1, ±{1,0,1,0,1,0,−1,0} or ±{−1,0,1,0,1,0,1,0} may be applied to a tone index of −3:1:4, and −±10,1,0,1,0,1,0,−11 or −±10,−1,0,1,0,1,0,11 may be applied to a tone index of −4:1:3.

When a symbol reduction scheme is applied, the same sequences as proposed in method 1 may also be used. Likewise, a sequence that maps a coefficient of 0 to DC needs to be used. When Manchester coding is applied, a sequence in a form of {a,0,b,0,c,0,0,0,d,0,e,0,f} may be further proposed for the 4 MHz band.

An on-symbol sequence in which a DC tone is nullified and a corresponding PAPR may be proposed as in the following table.

TABLE 38

| | BW [MHz] | 2.5 | 4 | |
|---|---|---|---|---|
| Simple OOK | # Sub. | 7 | 12 | |
| | Sequence | −4:1:3 ±{1, 1, −1, −1, 0, −1, 1, −1} −3:1:4 ±{1, 1, 1, 0, 1, −1, −1, 1} | ±{1, 1, 1, −1, −1, −1, 0, −1, 1, −1, −1, 1, −1} ±{1, −1, 1, 1, −1, 1, 0, 1, 1, 1, −1, −1, −1} | |
| | PAPR [dB] | 2.2902 | 2.0589 | |
| OOK w/ Manchester coding Or symbol reduction (1.6 us) | # Sub. Sequence | 4 −3:1:4 ±{1, 0, 1, 0, 1, 0, −1, 0} ±{−1, 0, 1, 0, 1, 0, 1, 0} | 6 ±{0, 1, 0, 1, 0, −1, 0, 1, 0, −1, 0, −1, 0} ±{0, −1, 0, −1, 0, 1, 0, −1, 0, 1, 0, 1, 0} | 7 ±{1, 0, −1, 0, 1, 0, 0, 0, −1, 0, −1, 0, −1} ±{1, 0, 1, 0, 1, 0, 0, 0, −1, 0, 1, 0, −1} |

TABLE 38-continued

|  | −4:1:3 ±{0, 1, 0, 1, 0, 1, 0, −1} ±{0, −1, 0, 1, 0, 1, 0, 1} | | |
|---|---|---|---|
| PAPR [dB] | 2.4763 | 3.1183 | 2.2377 |

TABLE 39

| | BW [MHz] | 5 |
|---|---|---|
| Simple OOK | # Sub. | 15 |
| | Sequence | −8:1:7 |
| | | ±{1, −1, 1, −1, 1, −1, −1, 1, 0, −1, 1, 1, −1, −1, −1, −1} |
| | | −7:1:8 |
| | | ±{1, 1, 1, 1, −1, −1, 1, 0, −1, 1, 1, −1, 1, −1, 1, −1} |
| | PAPR [dB] | 2.2185 |
| OOK w/ Manchester coding Or symbol reduction (1.6 us) | # Sub. | 8 |
| | Sequence | −7:1:8 |
| | | ±{1, 0, 1, 0, 1, 0, −1, 0, 1, 0, −1, 0, −1, 0, 1, 0} |
| | | ±{1, 0, −1, 0, −1, 0, 1, 0, −1, 0, 1, 0, 1, 0, 1, 0} |
| | | −8:1:7 |
| | | ±{0, 1, 0, 1, 0, 1, 0, −1, 0, 1, 0, −1, 0, −1, 0, 1} |
| | | ±{0, 1, 0, −1, 0, −1, 0, 1, 0, −1, 0, 1, 0, 1, 0, 1} |
| | PAPR [dB] | 2.2011 |

Figure 13:
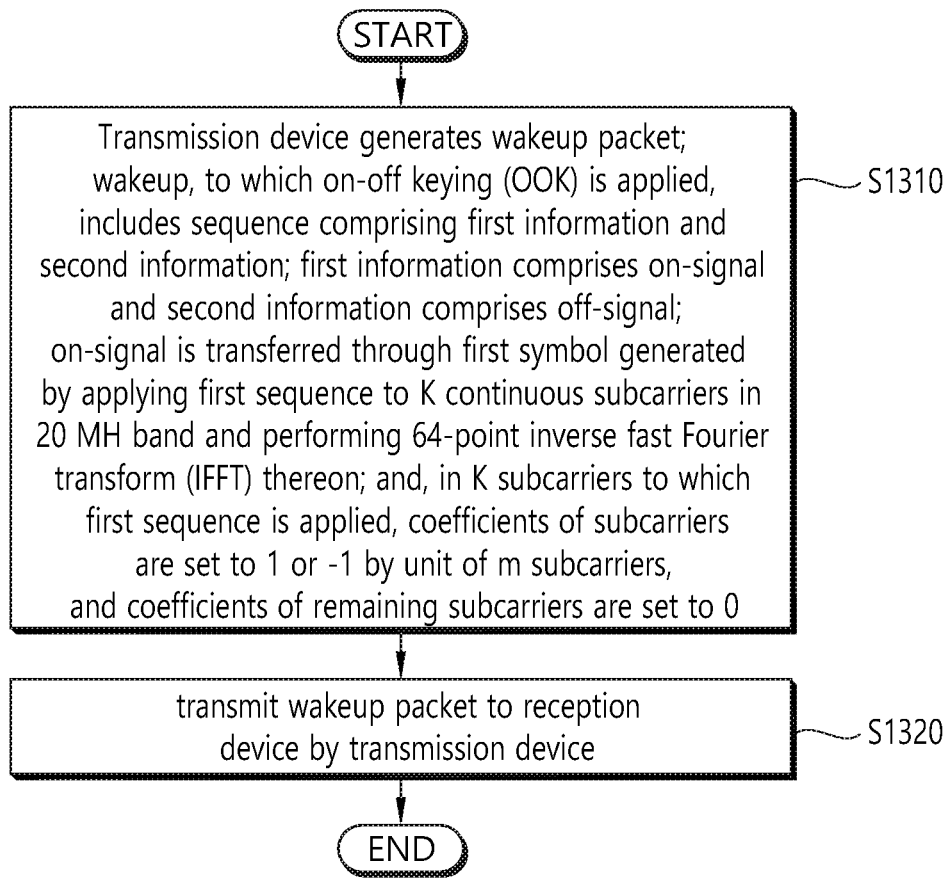
FIG. 13 is a flowchart illustrating a procedure for transmitting a signal by applying OOK or a symbol reduction scheme according to an embodiment.

FIG. 13 is a flowchart illustrating a procedure for transmitting a signal by applying OOK or a symbol reduction scheme according to an embodiment.

An example illustrated in FIG. 13 is performed by a transmission device. A reception device may correspond to a low-power wake-up receiver, and the transmission device may correspond to an AP.

First, terms are defined. An on signal may correspond to a signal having an actual power value. An off signal may correspond to a signal having no actual power value. First information may correspond to information 1, and second information may correspond to information 0.

In step S1310, a transmission device configures/generates a wake-up packet.

In step S1320, the transmission device transmits the wake-up packet to a reception device.

The wake-up packet is configured/generated as follows.

The wake-up packet, to which on-off keying (OOK) is applied, includes a sequence including first information and second information.

The first information includes an on signal, and the second information includes an off signal.

The on signal is transferred through a first symbol generated by applying a first sequence to K consecutive subcarriers in a 20 MHz band and performing 64-point inverse fast Fourier transform (IFFT) thereon. That is, the on signal may be transmitted through one symbol generated by performing IFFT on one bit. Here, K is a natural number. The first symbol may correspond to an on symbol.

In the K subcarriers to which the first sequence is applied, coefficients of subcarriers are set to 1 or −1 by a unit of m subcarriers, and coefficients of the remaining subcarriers are set to 0. That is, when m=2, the first sequence may be applied to subcarriers of which a coefficient exists by a unit of two subcarriers. When m=4, the first sequence may be applied to subcarriers of which a coefficient exists by a unit of four subcarriers. When m=8, the first sequence may be applied to subcarriers of which a coefficient exists by a unit of eight subcarriers. m is a natural number and may be an even number for reducing a symbol.

This is to generate an information signal (or symbol) to which a symbol reduction scheme is applied. When the first sequence is applied to the K subcarriers of which a subcarrier coefficient exists by a unit of m subcarriers and IFFT is performed thereon, 3.2 us signals having a period of 3.2 us/m are generated, one of which may be used to configure/generate a 3.2 us/m on signal. The 3.2 us/m on signal may be transmitted through the first symbol. Therefore, the first symbol may have a length of 3.2 us/m excluding a CP. Accordingly, compared to the existing OOK scheme, a symbol length may be reduced and data rate may be increased.

In addition, when m=1, it may be considered that OOK is simply applied; when m=2, it may be considered that Manchester coding is applied. That is, the first information and the second information may be considered to have features of an information signal to which Manchester coding is applied and features of an information signal to which the symbol reduction scheme is applied.

Hereinafter, various examples of the first sequence applied to configure/generate the on signal (or on symbol) according to K and m are proposed. When coefficients of the first sequence inserted in the K subcarriers are all 1, a PAPR value is considerably high. Therefore, the first sequence is defined hereinafter to minimize PAPR according to K and m.

When K is 13 and m is 1, the first sequence may be ±{1,1,1,−1,−1,−1,1,1,−1,1,1,−1,1} or ±{1,−1,1,1,−1,1,1,−1,−1,1,1,1}, in which OOK is merely applied to a wake-up packet.

When K is 13 and m is 2, the first sequence may be ±{0,1,0,1,0,−1,0,1,0,−1,0,−1,0}, ±{0,−1,0,−1,0,1,0,−1,0,1, 0,1,0}, ±{1,0,1,0,1,0,−1,0,−1,0,1,0,−1}, or ±{−1,0,1,0,−1, 0,−1,0,1,0,1,0,1}, in which Manchester coding or a symbol reduction scheme using a sequence in which a coefficient exists at intervals of two subcarriers is applied to a wake-up packet.

When K is 13 and m is 4, the first sequence may be ±{1,0,0,0,1,0,0,0,1,0,0,0,−1}, ±{−1,0,0,0,1,0,0,0,1,0,0,0,1}, ±{0,1,0,0,0,1,0,0,0,−1,0,0,0}, ±{0,0,1,0,0,0,1,0,0,0,−1,0,0}, ±{0,0,0,1,0,0,0,1,0,0,0,−1,0}, ±{0,−1,0,0,0,1,0,0,0,1,0,0,0}, ±{0,0,−1,0,0,0,1,0,0,0,1,0,0}, or ±{0,0,0,−1,0,0,0,1,0,0,0,1, 0}, in which a symbol reduction scheme using a sequence in which a coefficient exists at intervals of four subcarriers is applied.

When K is 13 and m is 8, the first sequence may be ±{1,0,0,0,0,0,0,0,1,0,0,0,0}, ±{0,1,0,0,0,0,0,0,0,1,0,0,0}, ±{0,0,1,0,0,0,0,0,0,0,1,0,0}, ±{0,0,0,1,0,0,0,0,0,0,0,1,0}, ±{0,0,0,0,1,0,0,0,0,0,0,0,1}, ±{1,0,0,0,0,0,0,0,−1,0,0,0,0}, ±{0,1,0,0,0,0,0,0,0,−1,0,0,0}, ±{0,0,1,0,0,0,0,0,0,0,−1,0,0}, ±{0,0,0,1,0,0,0,0,0,0,0,−1,0}, or ±{0,0,0,0,1,0,0,0,0,0,0,0,−1}, in which a symbol reduction scheme using a sequence in which a coefficient exists at intervals of eight subcarriers is applied.

The on signal (or on symbol) may include K subcarriers located in a central band including a DC subcarrier.

Specifically, when the K subcarriers are allocated in the central band of the 20 MHz band, the DC subcarrier of the K subcarriers may be nullified. In addition, the subcarrier indexes of the K subcarriers may be arranged at one-subcarrier intervals from the lowest subcarrier having −6 to the highest subcarrier having +6.

For example, when K is 13 and m is 1, the first sequence may be ±{1,1,1,−1,−1,−1,0,−1,1,−1,−1,1,−1} or ±{1,−1,1,1,−1,1,0,1,1,1,−1,−1,−1}, in which OOK is merely applied to a wake-up packet and the DC subcarriers is nullified.

When K is 13 and m is 2, the first sequence may be ±{0,1,0,1,0,−1,0,1,0,−1,0,−1,0}, ±{0,−1,0,−1,0,1,0,−1,0,1,0,1,0}, ±{1,0,−1,0,1,0,0,0,−1,0,−1,0,−1}, or ±{1,0,1,0,1,0,0,0,−1,0,1,0,−1}, in which Manchester coding or a symbol reduction scheme using a sequence in which a coefficient exists at intervals of two subcarriers is applied to a wake-up packet and the DC subcarriers is nullified.

The off signal may be transferred through a second symbol generated by applying a second sequence to K consecutive subcarriers in the 20 MHz band and performing 64-point IFFT thereon. The first sequence and the second sequence may be different. In the K subcarriers to which the second sequence is applied, coefficients of all subcarriers may be set to 0.

Also, in the off signal, when the second sequence is applied to the K subcarriers all coefficients of which are set to 0 and IFFT is performed thereon, 3.2 us signals having a period of 3.2 us/m are generated, one of which may be used to configure/generate a 3.2 us/m off signal. The 3.2 us/m off signal may be transmitted through the second symbol. Therefore, the second symbol may have a length of 3.2 us/m excluding a CP.

According to this symbol reduction scheme, a wake-up packet (particularly, a wake-up payload) is configured/generated by reducing a symbol, thereby meeting a high data rate required for low-latency communication.

For example, when m is 4, the data rate of the wake-up payload may be 500 Kbps. When m is 8, the data rate of the wake-up payload may be 1 Mbps. When the symbol reduction scheme is applied, it is possible to more easily achieve a high data rate required for low-latency communication than applying only OOK.

Also, even though a symbol is divided m times, the first information and the second information each correspond to one-bit information.

The K subcarriers may correspond/relate to a subband of the 20 MHz band. For example, assuming that K=13 and 20 MHz is a reference band, even though 64 subcarriers (or bit sequences) can be used, only 13 subcarriers are sampled and are subjected/applied to IFFT, and the 13 subcarriers may correspond to a band of about 4.06 MHz. That is, a particular sequence (first sequence or second sequence) is set only for 13 subcarriers selected as samples, and the remaining subcarriers other than the 13 subcarriers are set to 0. That is, it may be considered that there is power only for 4.06 MHz in the 20 MHz band in a frequency domain.

The subcarrier spacing of each of the K subcarriers may be 312.5 KHz. When m is 4, the first symbol and the second symbol may have a length of 0.8 us. When m is 8, the first symbol and the second symbol may have a length of 0.4 us.

A cyclic prefix (CP) may be inserted at the front of each symbol to reduce or prevent the occurrence of inter-symbol interference (ISI).

For example, the first information and the second information may include a CP. The CP may be inserted at the front of each of the first symbol and the second symbol. When m is 4, the CP may have a length of 0.2 us. When m is 8, the CP may have a length of 0.1 us. This embodiment may be effective when the impact of ISI is exerted in the middle of a signal since the CP is inserted in the middle of the signal.

Further, the transmission device may configure/generate the first information and the second information, having information about the power values of the on signal and the off signal in advance. The reception device may decode the first information and the second information using an envelope detector, thus reducing power consumed for decoding.

Figure 14:
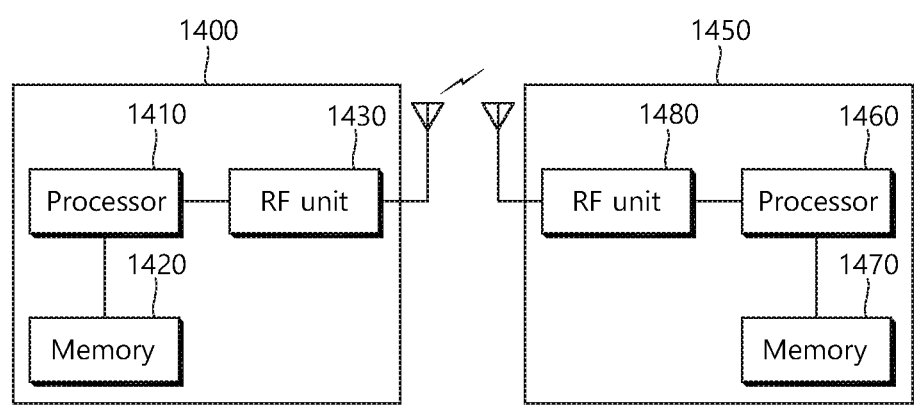
FIG. 14 is a block view illustrating a wireless device to which the exemplary embodiment of the present invention can be applied.

FIG. 14 is a block view illustrating a wireless device to which the exemplary embodiment of the present invention can be applied.

Referring to FIG. 14, as an STA that can implement the above-described exemplary embodiment, the wireless device may correspond to an AP or a non-AP station (STA). The wireless device may correspond to the above-described user or may correspond to a transmission device transmitting a signal to the user.

The AP 1400 includes a processor 1410, a memory 1420, and a radio frequency (RF) unit 1430.

The RF unit 1430 is connected to the processor 1410, thereby being capable of transmitting and/or receiving radio signals.

The processor 1410 implements the functions, processes, and/or methods proposed in the present invention. For example, the processor 1410 may be implemented to perform the operations according to the above-described exemplary embodiments of the present invention. More specifically, among the operations that are disclosed in the exemplary embodiments of FIG. 1 to FIG. 13, the processor 1410 may perform the operations that may be performed by the AP.

The non-AP STA 1450 includes a processor 1460, a memory 1470, and a radio frequency (RF) unit 1480.

The RF unit 1480 is connected to the processor 1460, thereby being capable of transmitting and/or receiving radio signals.

The processor 1460 implements the functions, processes, and/or methods proposed in the present invention. For example, the processor 1460 may be implemented to perform the operations of the non-AP STA according to the above-described exemplary embodiments of the present invention. The processor may perform the operations of the non-AP STA, which are disclosed in the exemplary embodiments of FIG. 1 to FIG. 13.

The processor 1410 and 1460 may include an application-specific integrated circuit (ASIC), another chip set, a logical circuit, a data processing device, and/or a converter converting a baseband signal and a radio signal to and from one another. The memory 1420 and 1470 may include a read-only memory (ROM), a random access memory (RAM), a flash memory, a memory card, a storage medium, and/or another storage device. The RF unit 1430 and 1480 may include one or more antennas transmitting and/or receiving radio signals.

When the exemplary embodiment is implemented as software, the above-described method may be implemented as a module (process, function, and so on) performing the above-described functions. The module may be stored in the memory 1420 and 1470 and may be executed by the processor 1410 and 1460. The memory 1420 and 1470 may be located inside or outside of the processor 1410 and 1460 and may be connected to the processor 1410 and 1460 through a diversity of well-known means.

What is claimed is:

1. A method for transmitting a wake-up packet in a wireless local area network (WLAN) system, the method comprising:
   generating, by a transmission device, a wake-up packet based on an on-off keying (OOK) scheme; and
   transmitting, by the transmission device, the wake-up packet, to a reception device,
   wherein the wake-up packet comprises first information and second information,
   wherein the first information and the second information are configured of an on signal and an off signal,
   wherein the on signal is transferred through a first symbol generated based on K consecutive subcarriers in a 20 MHz band and 64-point inverse fast Fourier transform (IFFT),
   wherein a coefficient of the K subcarriers is determined based on a first sequence,
   wherein a coefficient of subcarriers in the K subcarriers is set to 1 or −1, the subcarriers being separated by a unit of m subcarriers, and a coefficient of remaining subcarriers in the K subcarriers is set to 0,
   wherein, when K is 13 and m is 1, the first sequence is ±{1,1,1,−1,−1,−1,0,−1,1,−1,−1,1,−1}, and
   wherein a direct current (DC) subcarrier of the K subcarriers is nullified.

2. The method of claim 1, wherein, when K is 13 and m is 1, the first sequence is ±{1,1,1,−1,−1,−1,1,1,1,−1,1,1,−1,1} or ±{1,−1,1,1,−1,1,1,1,−1,−1,−1,1,1,1}.

3. The method of claim 1, wherein, when K is 13 and m is 2, the first sequence is ±{0,1,0,1,0,−1,0,1,0,−1,0,−1,0}, ±{0,−1,0,−1,0,1,0,−1,0,1,0,1,0}, ±{1,0,1,0,1,0,−1,0,−1,0,1,0,−1}, or ±{−1,0,1,0,−1,0,−1,0,1,0,1,0,1}.

4. The method of claim 1, wherein, when K is 13 and m is 4, the first sequence is ±{1,0,0,0,1,0,0,0,1,0,0,0,−1}, ±{−1,0,0,0,1,0,0,0,1,0,0,0,1}, ±{0,1,0,0,0,1,0,0,0,−1,0,0,0}, ±{0,0,1,0,0,0,1,0,0,0,−1,0,0}, ±{0,0,0,1,0,0,0,1,0,0,0,−1,0}, ±{0,−1,0,0,0,1,0,0,0,1,0,0,0}, ±{0,0,−1,0,0,0,1,0,0,0,1,0,0}, or ±{0,0,0,−1,0,0,0,1,0,0,0,1,0}.

5. The method of claim 1, wherein, when K is 13 and m is 8, the first sequence is ±{1,0,0,0,0,0,0,0,1,0,0,0,0}, ±{0,1,0,0,0,0,0,0,0,1,0,0,0}, ±{0,0,1,0,0,0,0,0,0,0,1,0,0}, ±{0,0,0,1,0,0,0,0,0,0,0,1,0}, ±{0,0,0,0,1,0,0,0,0,0,0,0,1}, ±{1,0,0,0,0,0,0,0,−1,0,0,0,0}, ±{0,1,0,0,0,0,0,0,0,−1,0,0,0}, ±{0,0,1,0,0,0,0,0,0,0,−1,0,0}, ±{0,0,0,1,0,0,0,0,0,0,0,−1,0}, or ±{0,0,0,0,1,0,0,0,0,0,0,0,−1}.

6. The method of claim 1, wherein the K subcarriers are allocated in a central band of the 20 MHz band, and
   wherein subcarrier indexes of the K subcarriers are arranged at one-subcarrier intervals from a lowest subcarrier having −6 to a highest subcarrier having +6.

7. The method of claim 6, wherein K is 13 and m is 2, the first sequence is ±{1,0,1,0,1,0,0,0,−1,0,1,0,−1}.

8. The method of claim 1, wherein the off signal is transferred through a second symbol generated by applying a second sequence to K consecutive subcarriers in the 20 MHz band and performing 64-point IFFT, and coefficients of all of the K subcarriers to which the second sequence is applied are set to 0.

9. The method of claim 8, wherein the K subcarriers relates to a subband of the 20 MHz band, a subcarrier spacing of each of the K subcarriers is 312.5 KHz, the first symbol and the second symbol have a length of 0.8 us when m is 4, and the first symbol and the second symbol have a length of 0.4 us when m is 8.

10. The method of claim 8, wherein the first information and the second information comprise a cyclic prefix (CP), and the CP is inserted at a front of each of the first symbol and the second symbol.

11. The method of claim 10, wherein the CP has a length of 0.2 us when m is 4, and the CP has a length of 0.1 us when m is 8.

12. A transmission device transmitting a wake-up packet in a wireless local area network (WLAN) system, the transmission device comprising:
   a radio frequency (RF) unit configured to transmit or receive a radio signal; and a processor configured to control the RF unit,
   wherein the processor generates a wake-up packet based on an on-off keying (OOK) scheme and transmits the wake-up packet, to a reception device,
   wherein the wake-up packet comprises first information and second information,
   wherein the first information and the second information are configured of an on signal and an off signal,
   wherein the on signal is transferred through a first symbol generated based on K consecutive subcarriers in a 20 MHz band and 64-point inverse fast Fourier transform (IFFT),
   wherein a coefficient of the K subcarriers is determined based on a first sequence, wherein a coefficient of subcarriers in the K subcarriers is set to 1 or −1, the subcarriers being separated by a unit of m subcarriers, and
   a coefficient of remaining subcarriers in the K subcarriers is set to 0,
   wherein, when K is 13 and m is 1, the first sequence is ±{1,1,1,−1,−1,−1,0,−1,1,−1,−1,1,−1}, and wherein a direct current (DC) subcarrier of the K subcarriers is nullified.

* * * * *